United States Patent
Mitchell et al.

(10) Patent No.: US 12,204,677 B2
(45) Date of Patent: Jan. 21, 2025

(54) DATA SAFE

(71) Applicant: www.TrustScience.com Inc., Edmonton (CA)

(72) Inventors: Jeremy Mitchell, Cumming, GA (US); Andrew T. Oliver, Redwood, CA (US)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 0 days.

(21) Appl. No.: 17/816,631

(22) Filed: Aug. 1, 2022

(65) Prior Publication Data

US 2022/0366079 A1    Nov. 17, 2022

Related U.S. Application Data

(63) Continuation of application No. 16/555,800, filed on Aug. 29, 2019, now abandoned.
(Continued)

(51) Int. Cl.
*G06F 21/62*     (2013.01)
*G06F 16/182*    (2019.01)
(Continued)

(52) U.S. Cl.
CPC ...... *G06F 21/6245* (2013.01); *G06F 16/1824* (2019.01); *H04L 9/0819* (2013.01);
(Continued)

(58) Field of Classification Search
None
See application file for complete search history.

(56) References Cited

U.S. PATENT DOCUMENTS 9,954,684 B2    4/2018  Popa et al.
9,992,022 B1    6/2018  Chapman et al.
(Continued)

OTHER PUBLICATIONS

Wang et al.; A blockchain-Based Framework for Data Sharing With Fine-Grained Access Control in Decentralized Storage Systems; 2018; retrieved from the Internet https://ieeexplore.ieee.org/document/8400511; pp. 1-14, as printed. (Year: 2018).*
(Continued)

*Primary Examiner* — Michael W Chao
(74) *Attorney, Agent, or Firm* — Amin, Turocy & Watson, LLP

(57) ABSTRACT

The disclosure facilitates creating and using a data safe for user personal information via creating block chains of personal information in a distributed file system (DFS), based on a determined category of use of each of the block chains, and/or transmitting an authorization to access a set of the block chains based on the determined category of use associated with a request for authorization. The disclosure also facilitates storing machine-executable code associated with an offer, wherein the block chains are based on a determined category of use of personal information in the block chains, determining the determined category of use of personal information, and/or transmitting a request for authorization to access personal information and the determined category of use associated with the request for authorization, receiving a cryptographic hash associated with a last block of a block chain and a link to the block chain stored in DFS.

17 Claims, 26 Drawing Sheets

Related U.S. Application Data

(60) Provisional application No. 62/724,989, filed on Aug. 30, 2018.

(51) Int. Cl.
*H04L 9/08* (2006.01)
*H04L 9/32* (2006.01)
*H04L 67/06* (2022.01)
*H04L 9/00* (2022.01)

(52) U.S. Cl.
CPC ............ *H04L 9/3236* (2013.01); *H04L 67/06* (2013.01); *H04L 9/50* (2022.05)

(56) References Cited

U.S. PATENT DOCUMENTS

| | | | |
|---|---|---|---|
| 10,387,684 B2 | 8/2019 | Carey et al. | |
| 10,790,982 B2 | 9/2020 | Clements | |
| 10,880,089 B2* | 12/2020 | Brown | G06F 21/6218 |
| 10,990,693 B1* | 4/2021 | Newman | G06F 21/602 |
| 10,999,061 B2* | 5/2021 | Guo | H04L 9/3213 |
| 11,170,092 B1 | 11/2021 | Liang | |
| 11,190,338 B1 | 11/2021 | Corey et al. | |
| 11,626,986 B1* | 4/2023 | Horoszczak | H04L 9/088 |
| | | | 705/51 |
| 11,626,997 B2* | 4/2023 | Semenovskiy | G06Q 20/363 |
| | | | 713/176 |
| 11,631,077 B2* | 4/2023 | Zappier | H04L 63/065 |
| | | | 705/71 |
| 11,734,296 B2* | 8/2023 | Opferman | H04L 9/50 |
| | | | 707/602 |
| 11,764,946 B2* | 9/2023 | Das | H04L 63/123 |
| 11,862,304 B1* | 1/2024 | Klein | G16H 40/67 |
| 11,995,647 B2* | 5/2024 | Padmanabhan | G06Q 20/3829 |
| 2017/0286717 A1 | 10/2017 | Khi et al. | |
| 2017/0364699 A1 | 12/2017 | Goldfarb et al. | |
| 2017/0364701 A1 | 12/2017 | Struttmann | |
| 2018/0025442 A1 | 1/2018 | Isaacson et al. | |
| 2018/0048461 A1 | 2/2018 | Jutla et al. | |
| 2018/0225660 A1 | 8/2018 | Chapman et al. | |
| 2018/0270065 A1 | 9/2018 | Brown et al. | |
| 2018/0285839 A1 | 10/2018 | Yang et al. | |
| 2018/0300382 A1* | 10/2018 | Madisetti | H04L 9/3234 |
| 2018/0307859 A1* | 10/2018 | LaFever | H04L 63/20 |
| 2018/0315141 A1* | 11/2018 | Hunn | G06F 9/547 |
| 2019/0065764 A1* | 2/2019 | Wood | H04L 9/0637 |
| 2019/0081789 A1* | 3/2019 | Madisetti | H04L 9/0637 |
| 2019/0087603 A1 | 3/2019 | Dror et al. | |
| 2019/0140848 A1 | 5/2019 | Dontov et al. | |
| 2019/0149633 A1 | 5/2019 | Evans et al. | |
| 2019/0190696 A1 | 6/2019 | Singh | |
| 2019/0213333 A1 | 7/2019 | Williams et al. | |
| 2019/0236598 A1* | 8/2019 | Padmanabhan | G06Q 20/389 |
| 2019/0303920 A1* | 10/2019 | Balaraman | H04L 67/1042 |
| 2019/0317936 A1* | 10/2019 | Keskar | G06F 16/1734 |
| 2019/0342095 A1 | 11/2019 | Simons | |
| 2019/0370866 A1 | 12/2019 | Lawbaugh et al. | |
| 2020/0007317 A1* | 1/2020 | Thompson | G06F 16/2255 |
| 2020/0159891 A1* | 5/2020 | Patel | G06F 21/16 |
| 2020/0394207 A1* | 12/2020 | Chakraborty | H04L 9/0637 |
| 2021/0160080 A1* | 5/2021 | Struttmann | G06F 16/9024 |
| 2021/0234702 A1 | 7/2021 | Bekiyants | |
| 2022/0261882 A1* | 8/2022 | Youb | G06Q 20/065 |
| 2023/0205929 A1* | 6/2023 | Nation | G06F 16/1805 |
| | | | 726/27 |
| 2023/0246844 A1* | 8/2023 | Beecham | H04L 9/3242 |
| | | | 709/227 |

OTHER PUBLICATIONS

Leimgruber et al., "Bloom Protocol—Decentralized credit scoring powered by Ethereum and IPFS", Early Community Draft Version 0.3, Last updated Jan. 27, 2018, 19 pages.

Non-Final Office Action received for U.S. Appl. No. 16/555,800 dated May 26, 2021, 33 pages.

Wang et al., A Blockchain-Based Framework for Data Sharing With Fine-Grained Access Control in Decentralized Storage Systems, 2018, https://ieeexplore.ieee.org/abstract/document/8400511, pp. 1-14.

Final Office Action received for U.S. Appl. No. 16/555,800 dated Feb. 2, 2022, 45 pages.

* cited by examiner

PERSONAL ID INFO 302

NAME
ADDRESS
SOCIAL SECURITY NUMBER
DATE OF BIRTH
PHONE NUMBER
EMAIL ADDRESS
EMERGENCY CONTACT
EMERGENCY PHONE NUMBER
E-SIGNATURE
URI TO IDENTITY FILE OF
VERIFICATION ENTITY

INCOME INFO 304

PAYSTUB URL
USERNAME
PASSWORD
PAYROLL PROVIDER

EMPLOYMENT INFO 306

CURRENT EMPLOYER
EMPLOYMENT START DATE
PREVIOUS EMPLOYER
START AND END DATES

INVESTMENT INFO 308

401(K) URL
USERNAME
PASSWORD

BROKERAGE1 URL
USERNAME
PASSWORD

BROKERAGE2 URL
USERNAME
PASSWORD

BANKING INSTITUTION1
BANK ACCOUNT NUMBER
USERNAME
PASSWORD

BANKING INSTITUTION2
BANK ACCOUNT NUMBER
USERNAME
PASSWORD

CREDIT CARD INFO 310

CARD1 ACCOUNT NUMBER
CARD1 EXPIRATION DATE
CARD1 CVV

CARD2 ACCOUNT NUMBER
CARD2 EXPIRATION DATE
CARD2 CVV

MEDICAL HISTORY INFO 312

INSURANCE PROVIDER
POLICY NUMBER

FAMILY DISEASE HISTORY

CURRENT PRESCRIPTIONS
PAST TREATMENTS AND EVENTS

PRIMARY CARE PHYSICIAN

ACCOUNT/LOGIN INFO 314

SITE1 URL
SITE1 USERNAME
SITE1 PASSWORD

SITE2 URL
SITE2 USERNAME
SITE2 PASSWORD

PAYMENT INFO 316

PAYPAL USERNAME
PAYPAL PASSWORD

MOBILE PAYMENT SERVICE
USERNAME
MOBILE PAYMENT SERVICE
PASSWORD

BLOCKCHAIN USERNAME
BLOCKCHAIN PASSWORD

METAMASK USERNAME
METAMASK PASSWORD

FIG. 4

Fifth page

DATA SAFE

This patent application is a continuation of U.S. patent application Ser. No. 16/555,800, filed Aug. 29, 2019, entitled "DATA SAFE," which claims priority to U.S. Provisional Patent Application Ser. No. 62/724,989, filed Aug. 30, 2018, entitled "DATA SAFE," which applications are incorporated by reference herein in their entireties.

TECHNICAL FIELD

The subject disclosure is directed to software applications and services and, more specifically, relates to data storage, use, protection, and authorization, such as by algorithms, methods, and platforms that enable creating, managing, authorizing the use of, and using user data in a distributed, secure, and controlled fashion.

BACKGROUND

Public and private entity data breaches are now an accepted, if unfortunate, aspect of modern life. Once a user's data security becomes compromised, it is a difficult if not impossible situation to rectify. More generally, users have come to expect a certain level of availability, use, and/or perceived misuse of their personal information. Identity theft costs victims on the order of $15 billion per year, in addition to lost time, loss of productivity, reduced trust, and personal well-being. Moreover, identity theft can negatively impact credit scores, further exacerbating the impacts, as a result of increased credit costs, and can result in increased fraud prevention and protection costs for entities.

Unfortunately, conventional solutions focus primarily on treating the symptoms, rather than the causes, and/or they may introduce further costs of doing business in a modern digital world. For example, in the event of identity theft or a data breach, a standard solution is to offer credit monitoring or to lock a user's credit. These costs may be borne by the institution that was initially victimized in the data breach, or more broadly by taxpayers in the event of a public entity data breach, in addition to increased processing time and/or user effort required to conduct further business, for example, such as in making or answering inquiries about the identity theft or breach.

Furthermore, such conventional solutions may be inappropriate and/or inadequate to address user concerns over use and/or misuse of user information, for example, such as in the situation where a user has provided user information to a first entity, subject to an end user license agreement (EULA), but where the user would prefer that use of such user information is restricted. For example, a user might agree to a EULA that allows a first entity uses of such user information beyond that which the user contemplates, only to find out subsequently that their information is being used in a manner in which they object, if they had conceived of such usage at the time they agreed to the EULA. For instance, social media companies are increasingly facing user push back for the ways in which political organizations, accessed their user information. In such situations, there is no breach or identity theft, however, the user has no control over which information is shared and/or the manner in which it is being used.

Moreover, there exists an opportunity to streamline the conduct of digital business, which can create heretofore unseen efficiencies for users and businesses in the conduct of ordinary businesses. For example, every entity has particular forms, layouts, schedules of data that they require, in order to conduct business. For example, a prospective employer requires particular employment history and right to work credentials, such as an social security number or individual taxpayer identification number, in addition to basic personal identification information. A medical service provider may require a subset of such information as well as other information not applicable to the prospective employer. An insurer might require subsets of both as all as well as other information not applicable to either the prospective employer or the medical service provider.

Conventionally, a user provides each in turn, separately filling out required forms, duplicating efforts, potentially making errors of omission, or otherwise, and keeping the required records or listings of details, making return trips or efforts to ensure all pertinent details are provided. For its part, each entity is responsible for verifying the user details and data completeness, screening for fraud, eligibility, risk, etc., in order to meet the entity business goals and specified processes. All of these duplicative and time consuming efforts raise add up to a cost of doing business, especially in an era when public and private entity data breaches are now an accepted, if unfortunate, aspect of modern life.

Thus, while conventional processes for handling user information and/or solutions for misuse or potential misuse provide some measure of security, user control, and/or rectification for data breaches, such efforts fail to provide meaningful solutions for increased user control and/or security of user information, and/or are subject to further costs or drawbacks, etc., among other deficiencies. The above-described deficiencies of user data provision and security are merely intended to provide an overview of some of the problems of conventional systems and methods, and are not intended to be exhaustive. Other problems with conventional systems and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

Thus, in non-limiting embodiments, the disclosed subject matter relates to software and services and, more specifically, relates to software and services that facilitate creating and using a data safe for user personal information, and so on. In one non-limiting aspect, the disclosed subject matter can comprise storing personal information associated with a user in a distributed file system (DFS). In further non-limiting aspects, the disclosed subject matter can comprise creating block chains of personal information, based on a determined category of use of each of the block chains. In still further non-limiting aspects, the disclosed subject matter can comprise transmitting an authorization to access a set of the block chains based on the determined category of use associated with a request for authorization.

To the foregoing and related ends, systems, devices, and methods are disclosed that can facilitate creating and using a data safe for user personal information according to various aspects of the disclosed subject matter, among other related functions. For instance, according to various non-limiting embodiments, the disclosed subject matter can comprise a storage component configured to store personal information associated with a user in a distributed file system (DFS). According to further non-limiting implementations, the disclosed subject matter can comprise a data management component configured to create block chains of personal information, based on a determined category of use of each of the plurality of block chains. According to still further non-limiting implementations, the disclosed subject matter can comprise an authorization component configured to transmit an authorization to access a set of the block chains based on the determined category of use associated with a request for authorization.

In addition, non-limiting embodiments of the disclosed subject matter can provide exemplary methods that facilitate creating and using a data safe for user personal information. For example, in further non-limiting implementations, exemplary methods can comprise storing machine-executable code associated with an offer, wherein the offer is contingent upon access to personal information stored in a set of block chains, wherein the block chains are based on a determined category of use of personal information in the block chains, determining the determined category of use of personal information, transmitting a request for authorization to access personal information and the determined category of use associated with the request for authorization, receiving a cryptographic hash associated with a last block of a block chain and a link to the block chain stored in DFS.

In other non-limiting embodiments, the disclosed subject matter can comprise a storage component configured to store machine-executable code associated with an offer, wherein the offer is contingent upon access to personal information stored in block chains, wherein the block chains are based on a determined category of use of personal information in each of the block chains. According to further non-limiting implementations, the disclosed subject matter can comprise a data management component configured to determine the determined category of use of personal information. According to still further non-limiting implementations, the disclosed subject matter can comprise an authorization component configured to transmit a request for authorization to access personal information and the determined category of use associated with the request for authorization, wherein the authorization component is further configured to a cryptographic hash associated with a last block of a block chain and a link to the last block of the block chain stored in DFS.

In addition, further exemplary implementations are directed to other exemplary methods, and associated systems, devices and/or other articles of manufacture that facilitate creating and using a data safe for user personal information, as further detailed herein.

These and other features of the disclosed subject matter are described in more detail below.

BRIEF DESCRIPTION OF THE DRAWINGS

The devices, components, systems, and methods of the disclosed subject matter are further described with reference to the accompanying drawings in which:

FIG. 4 illustrates non-limiting examples of user information about a user that can be employed in the provision, collection, use, distribution, and so on, of user information about the user, in accordance with various embodiments of an exemplary data safe or user data safe;

DETAILED DESCRIPTION OF ILLUSTRATIVE EMBODIMENTS

As described above, conventional processes for handling user information and/or solutions for misuse or potential misuse provide some measure of security, user control, and/or rectification for data breaches, such efforts fail to provide meaningful solutions for increased user control and/or security of user information, and/or are subject to further costs or drawbacks, etc., among other deficiencies.

Figure 1:
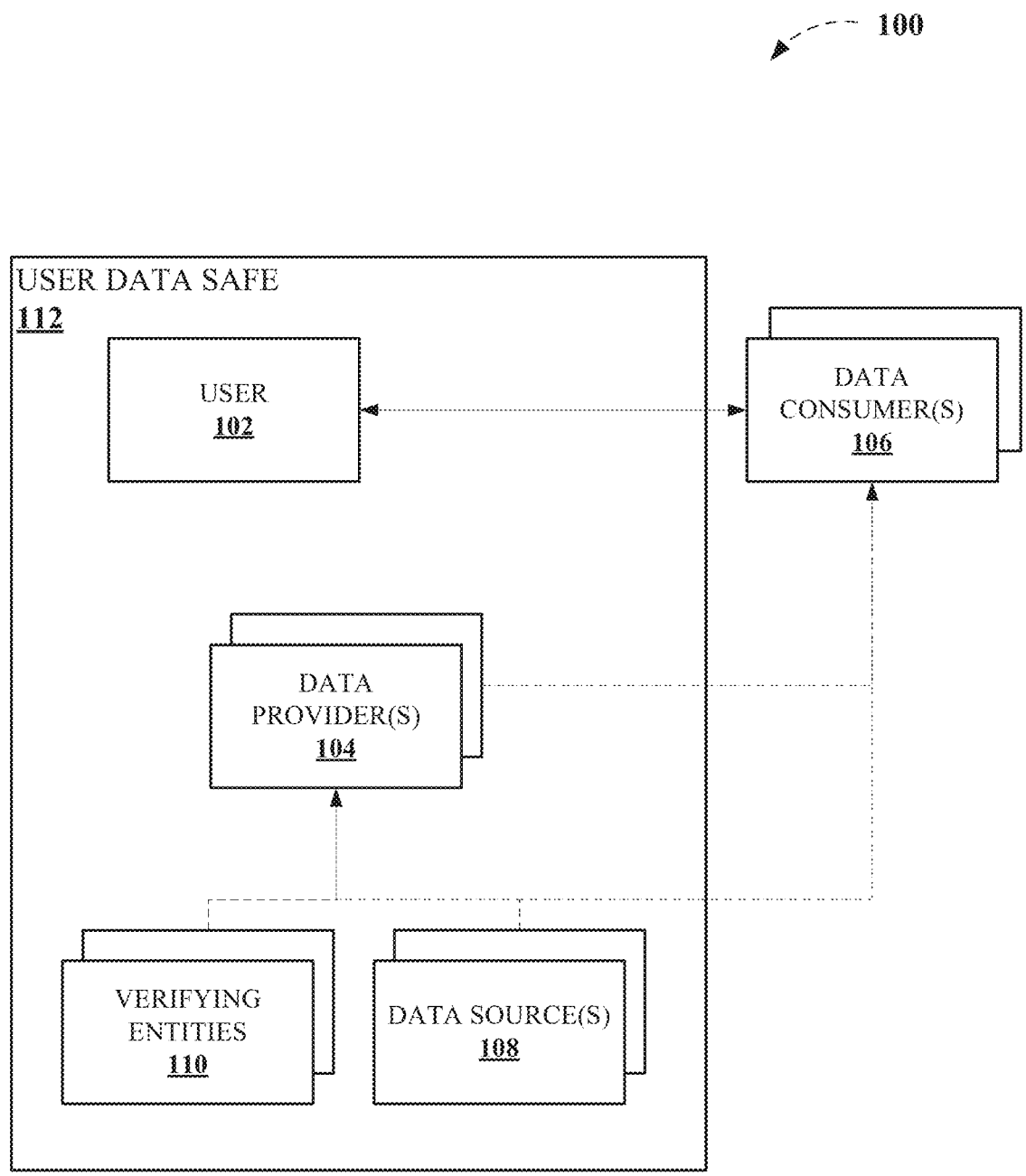
FIG. 1 depicts a functional block diagram illustrating an exemplary environment suitable for use with aspects of the disclosed subject matter.

FIG. 1 depicts a functional block diagram illustrating an exemplary environment 100 suitable for use with aspects of the disclosed subject matter. For instance, depicts an exemplary set of parties or participants communicatively coupled to each other and involved in the provision, collection, use, and distribution of user information. For example, a user 102 can provide information to other parties, for example, such as data provider(s) 104 and data consumer(s) 106. As another example, data provider(s) 104 and/or data consumer(s) 106 can comprise or be associated with data source(s) 108 and/or verifying entities 110, to facilitate the provision of information about user 102, according to data provider(s)' 104 business structures and models, and to facilitate the consumption of information about user 102, according to data consumer(s)' 106 business structures and models.

As a non-limiting example, data consumer 106 can comprise a prospective employer for which it seeks user information about user 102. In this non-limiting example, user 102 comprise a prospective employee, and as part of the prospective employer's business processes, data consumer(s) 106 would require the submission of user information by user 102 in the form of a job application package. In addition, data consumer 106 may contract with other participants, including one or more of data provider(s) 104, data source(s) 108, and/or verifying entities 110. For instance, one or more of data provider(s) 104, data source(s) 108, and/or verifying entities 110 can be associated with credit reporting entities, other rating entities, background check entities, employment verification, government agencies, depending on various business structures or models, with which data consumer 106 may contract or communicate with to facilitate the consumption of information about user 102, according to data consumer's 106 business processes and hiring goals.

As described above, beyond the basic job application submission process user 102 has little no control over the provision, collection, use, and distribution of user information about user 102, other than a take it or leave it approach to whatever policy is in place with data consumer 106. In addition, the retention of such information by data consumer 106 leaves user 102 relatively helpless to prevent against data breaches and/or any subsequent identity theft or misuse of such user information. Moreover, each prospective employer, e.g., data consumer 106, may have its own user information requirements, retention policies, privacy policies, and so on, as further exacerbates the problems of efficiently providing such user information, controlling the proliferation thereof, and protecting against data breaches, which further complicates efforts at achieving efficiencies in the proper or authorized provision, collection, use, and distribution of user information about user 102.

Various embodiments of the disclosed subject matter facilitate creating and using a data safe or user data safe 112 for user information or user personal information, as further described herein. Non-limiting embodiments of data safe or user data safe 112 as described herein can facilitate enhanced user 102 control over the provision, collection, use, distribution, and so on, of user information about user 102 and can facilitate providing further benefits from achieving efficiencies in the proper or authorized provision, collection, use, distribution, and so on, of user information about user 102. For instance, rather than each of data consumer(s) 106 being required to separately form likely different policies, processes, and infrastructure for the provision, collection, use, and/or distribution of user information about user 102, being required to verify or authenticate such pieces of user information about user 102, and/or being required to form and/or manage relationships between data consumer(s) 106 and one or more of data provider(s) 104, data source(s) 108, and/or verifying entities 110, to facilitate the provision, collection, use, and/or distribution of user information about user 102, each of data consumer(s) 106 can be communicatively coupled to data safe or user data safe 112 to facilitate the provision, collection, use, and/or distribution of user information about user 102, in various embodiments as described herein.

As indicated in FIG. 1, and as further described herein, one or more of data provider(s) 104, data source(s) 108, and/or verifying entities 110 can be communicatively coupled to the data safe or user data safe 112 to facilitate the provision, collection, use, distribution, and so on, of user information about user 102, according to their respective business structures and models. Thus, the traditional roles of such participants can be preserved, while allowing further opportunities to facilitate the provision, collection, use, distribution, and so on, of user information about user 102. As a non-limiting example, exemplary data safe or user data safe 112 can comprise an application program interface (API) and/or one or more management mechanisms to facilitate controlling which data consumer(s) 106 may access user information about user 102 via exemplary data safe or user data safe 112. In other non-limiting implementations, exemplary data safe or user data safe 112 can comprise or be associated with functionality for the provision of self-executing contracts, which can, on behalf of one or more participants in exemplary environment 100, facilitate the provision, collection, use, distribution, and so on, of user information about user 102. Such self-executing contracts may be implemented as, for example, software contracts in the manner of smart contracts on a block chain such as the Ethereum block chain or similar block chains that permit the implementation of self-executing contracts.

As described above, an exemplary user 102 can comprise an individual human person, properly authorized and authenticated to use data safe or user data safe 112 to facilitate the provision, collection, use, distribution, and so on, of user information about user 102, and/or one or more computer-executable components acting on behalf of exemplary user 102. However, in other non-limiting implementations, exemplary user 102 can comprise any of a number of real or intangible entities about which user information is desired by one or more data consumer(s) 106. As non-limiting examples, exemplary user 102 can comprise any of a person, an entity, an organization, a legal structure (e.g., trusts, etc.), or otherwise, without limitation, about which user information about user 102 is desired by one or more data consumer(s) 106. As further described above, exemplary data consumer(s) 106 can comprise prospective employers. In further non-limiting implementations, exemplary data consumer(s) 106 can comprise any of a number of entities that desire user information about user 102, including a service provider, whether online or otherwise, such as a cell phone provider, a health care provider such as a doctor, a merchant such as an automobile dealer, a rental agency, an insurance firm, a governmental organization such as a school, a tax authority, other users 102, and so on, without limitation.

As indicated in FIG. 1, one or more of data provider(s) 104, data source(s) 108, and/or verifying entities 110 can be communicatively coupled to the data safe or user data safe 112 to facilitate the provision, collection, use, distribution, and so on, of user information about user 102, according to their respective business structures and models. Accordingly, exemplary data provider(s) 104 can comprise any of a number of entities whose mission or business involves or is associated with one or more of the provision, collection, use, distribution, and so on, of user information about user 102, such as, for example, a ratings agency, such as a credit rating agency, a background check agency, a polling firm, a marketing firm, a government agency, and so on, without limitation, an actuarial firm, without limitation. In further non-limiting aspects, exemplary data source(s) 108 can comprise any of a number of data sources from which user information about user 102 may be accessed, whether public or private, whether freely accessible or fee-based, whether governmental or private-owned, whether automated or otherwise, and so on without limitation. In other non-limiting aspects, exemplary verifying entities 110 can comprise any of a number of entities whose mission or business involves or is associated with the validation or verification of user information about user 102 to facilitate one or more of the provision, collection, use, distribution, and so on, of user information about user 102, such as, for example, a ratings agency, such as a credit rating agency, a background check agency, a certification authority, an authentication entity, and so on without limitation.

As described above, in a non-limiting aspect, one or more computer-executable components can act on behalf of exemplary user 102 in exemplary data safe or user data safe 112. Similarly, in further non-limiting aspects, one or more computer-executable components can act on behalf of one or more of data provider(s) 104, data source(s) 108, and/or verifying entities 110 in association with the data safe or user data safe 112 to facilitate the provision, collection, use, distribution, and so on, of user information about user 102, according to their respective business structures and models.

Figure 2:
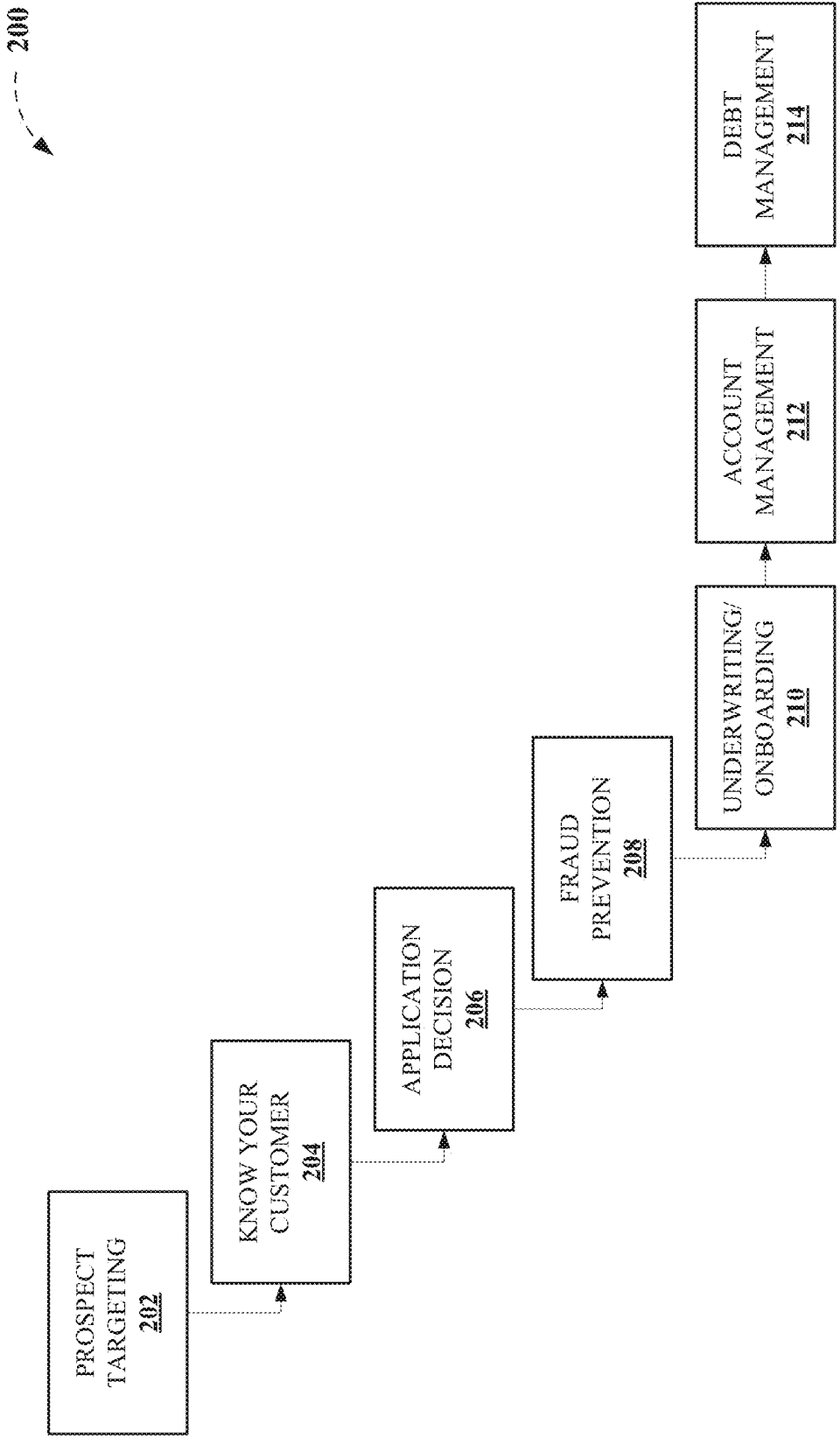
FIG. 2 illustrates an exemplary block diagram showing non-limiting aspects of embodiments of the disclosed subject matter.

FIG. 2 illustrates an exemplary block diagram 200 showing non-limiting aspects of embodiments of the disclosed subject matter. For instance, block diagram 200 depicts activities or events associated with a user or customer (e.g., user 102) in the life cycle of an interaction of the user or customer (e.g., user 102) with an institution, business, etc. (e.g., data consumer 106). These activities or events rely heavily, not only on the provision, collection, use, distribution, and so on, of user information about user 102, but they also rely on the validation, verification, authentication, and proper protection and control of such user information about user 102, to ensure smooth, efficient, and cost-effective business processes, and therefore, in turn, attractive prices on the offered goods and services.

While for purposes of illustration, FIG. 2 is discussed in terms of an exemplary credit lending process, it is understood that that various embodiments as described herein are not so limited. For instance, similar analyses regarding a medical service provider and his or her patient, regarding an employer and his or her employee, regarding an insurer and his or her insured, and so on can be performed and reveal similar opportunities to improve the provision, collection, use, distribution, and so on, of user information about user 102, as well as the validation, verification, authentication, and proper protection and control of such user information about user 102.

As a non-limiting example, from the perspective of an exemplary user or customer (e.g., user 102), in terms of Prospect Targeting 202, user information about user or customer (e.g., user 102) may be solicited, provided, collected, used, distributed, and so on, to determine one or more of a product qualification process, a study of in-market propensity, determination of proper or most efficient contact channel(s), effective messaging technologies or techniques, optional product offering(s), timing of offers, intensity of contacts, character of messaging including pre-approvals versus invitations to apply, and so on associated with exemplary user or customer (e.g., user 102).

In terms of Know Your Customer 204, user information about user or customer (e.g., user 102) may be solicited, provided, collected, used, distributed, and so on, to determine the existence of synthetic identity risks, for the verification and/or authentication of identities and credentials employed therefor, compliance with regulatory schemes (e.g., Gramm-Leach-Bliley Act, U.S.A. Patriot Act, etc.), and so on associated with exemplary user or customer (e.g., user 102).

Regarding the Application Decision 206, user information about user or customer (e.g., user 102) may be solicited, provided, collected, used, distributed, and so on, to determine, track, prevent, and/or mitigate one or more of repayment risk, bankruptcy, loss severity, such as by determining or verifying, ability to pay, income, employment, employing conditional approvals (e.g., with terms attached), and so on associated with exemplary user or customer (e.g., user 102).

In terms of Fraud Prevention 208, user information about user or customer (e.g., user 102) may be solicited, provided, collected, used, distributed, and so on, to determine, track, prevent, and/or mitigate first party fraud (e.g., lack of intent to repay, bust-out), third party fraud (e.g., identity theft, synthetic identity), and so on associated with exemplary user or customer (e.g., user 102).

Regarding Underwriting/Onboarding 210, user information about user or customer (e.g., user 102) may be solicited, provided, collected, used, distributed, and so on, to determine one or more of offer pricing, offer terms, opportunities to cross-sell and/or up-sell, lifetime value of the offer, possible product add-ons, and so on associated with exemplary user or customer (e.g., user 102).

In terms of Account Management 212, user information about user or customer (e.g., user 102) may be solicited, provided, collected, used, distributed, and so on, to determine the value of an offered credit line, possibility for and risk associated with increases or decreases, over limit authorization, retention, usage, opportunities for cross-sell and/or up-sell, existence of account takeover fraud events, existence of account bust-out fraud likelihood or events, and so on associated with exemplary user or customer (e.g., user 102).

Regarding Debt Management 214, user information about user or customer (e.g., user 102) may be solicited, provided, collected, used, distributed, and so on, to determine internal considerations of the possibility of early account collections, external considerations of early collections such as pricing and agency selection, the likelihood or preventative measures for repossession and/or foreclosure, and so on associated with exemplary user or customer (e.g., user 102).

All of such activities or events of block diagram 200 associated with user or customer (e.g., user 102) incur some costs of the provision, collection, use, distribution, and so on, of user information about user 102, as well as with the validation, verification, authentication, and proper protection and control of such user information about user 102, to ensure smooth, efficient, and cost-effective business processes. For example, from the perspective of an exemplary data consumer 106, in terms of Prospect Targeting 202, availability, costs, efficiencies, etc. regarding user information associated with exemplary user or customer (e.g., user 102) can be useful in efficiently determining one or more of budget, product mix, capabilities, portfolio quality, and so on associated with exemplary data consumer 106.

In terms of Know Your Customer 204, user information about user or customer (e.g., user 102) solicited, provided, collected, used, distributed, and so on, as well as costs and efficiencies therewith can facilitate efficiently satisfying regulatory requirements, setting staff budgets, determining turndown rates, and so on associated with exemplary data consumer 106.

In terms of Application Decision 206, user information about user or customer (e.g., user 102) solicited, provided, collected, used, distributed, and so on, as well as costs and efficiencies therewith can facilitate efficiently determining portfolio quality, approval rate, Basel standards (e.g., loss given default, exposure at default, etc.,), etc., improving customer experiences, and so on associated with exemplary data consumer 106.

Regarding Fraud Prevention 208, user information about user or customer (e.g., user 102) solicited, provided, collected, used, distributed, and so on, as well as costs and efficiencies therewith can facilitate efficiently determining exposure or risk of fraud, turndown rates, staff budget, capabilities, and so on associated with exemplary data consumer 106.

Regarding Underwriting/Onboarding 210, user information about user or customer (e.g., user 102) solicited, provided, collected, used, distributed, and so on, as well as costs and efficiencies therewith can facilitate efficiently determining available product mix, reserve requirements, product competitiveness, and so on associated with exemplary data consumer 106.

In terms of Account Management 212, user information about user or customer (e.g., user 102) solicited, provided, collected, used, distributed, and so on, as well as costs and efficiencies therewith can facilitate efficiently performing comprehensive capital analysis and review, portfolio bundling, determining marketing budget, improving customer experience, determining depth of wallet, and so on associated with exemplary data consumer 106.

In terms of Debt Management 214, user information about user or customer (e.g., user 102) solicited, provided, collected, used, distributed, and so on, as well as costs and efficiencies therewith can facilitate efficiently determining internal staff budget, recovery rates, capabilities, and so on associated with exemplary data consumer 106. As can be seen from the analysis of the activities or events of block diagram 200 associated with user or customer (e.g., user 102), user information about user or customer (e.g., user 102) solicited, provided, collected, used, distributed, and so on, can have costs and efficiencies associated, and can have a direct impact on the business operations.

Moreover, it can be understood that once user information about user or customer (e.g., user 102) is out of the possession of user or customer (e.g., user 102) and within the business structure and processes of exemplary data consumer 106, it can be complicated or virtually impossible for user or customer (e.g., user 102) to detect or correct errors with the business structure and processes of exemplary data consumer 106. While interests of user or customer (e.g., user 102) and exemplary data consumer 106 may be aligned as to the veracity and completeness of the user information about user or customer (e.g., user 102), there may be no communication process between exemplary data consumer 106 and user or customer (e.g., user 102) established for proactive detection and correction. The default may be only error correction on detection, and detection only in the event of active business activity between exemplary data consumer 106 and user or customer (e.g., user 102). In other words, barring a profitable business opportunity, there is no motive for either of exemplary data consumer 106 or user or customer (e.g., user 102) to proactively control and correct user information about user or customer (e.g., user 102), notwithstanding the lack of an ability for user or customer (e.g., user 102) to control user information about user or customer (e.g., user 102) within the business structure and processes of exemplary data consumer 106.

As a result, such situations give rise to the problems of the proliferation of relatively cheap and/or easy access to user information about user or customer (e.g., user 102), with the business processes and structure historically developed, with attendant costs associated with risk mitigation, to focus primarily on the verification of the cheap and/or easy access to user information. Such costs include fraud detection and prevention, information security, underwriting, account monitoring and management, and so on, as described regarding FIG. 2. Accordingly, various embodiments of the disclosed subject matter facilitate creating and using a data safe or user data safe 112 for user information or user personal information, as further described herein. Non-limiting embodiments of data safe or user data safe 112 as described herein can facilitate enhanced user 102 control over the provision, collection, use, distribution, and so on, of user information about user 102 and can facilitate providing further benefits from achieving efficiencies in the proper or authorized provision, collection, use, distribution, and so on, of user information about user 102.

Figure 3:
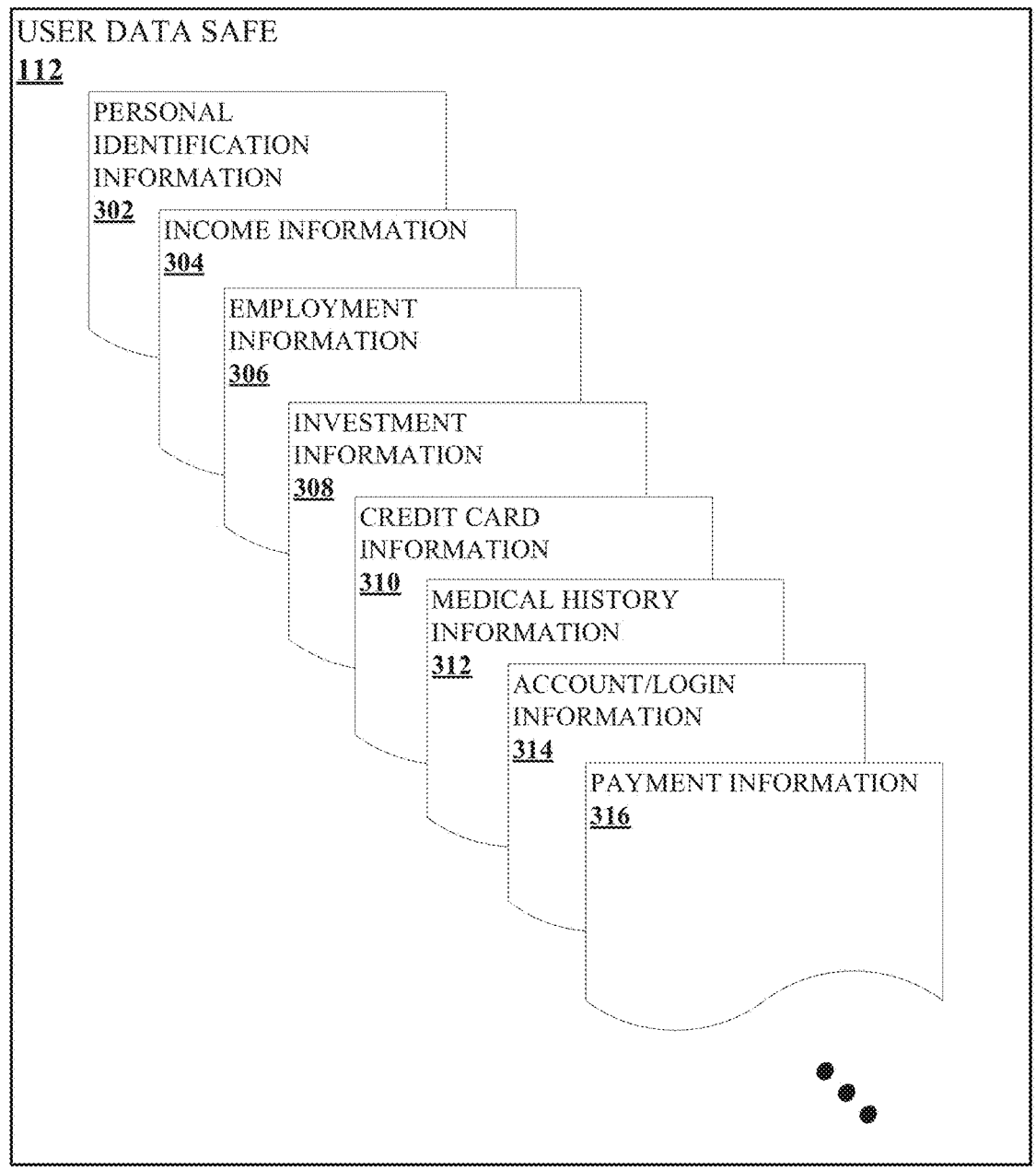
FIG. 3 illustrates an exemplary block diagram showing further non-limiting aspects of embodiments of the disclosed subject matter.

FIG. 3 illustrates an exemplary block diagram 300 showing further non-limiting aspects of embodiments of the disclosed subject matter. As described, various embodiments of data safe or user data safe 112 as described herein can facilitate enhanced user 102 control over the provision, collection, use, distribution, and so on, of user information about user 102 and can facilitate providing further benefits from achieving efficiencies in the proper or authorized provision, collection, use, distribution, and so on, of user information about user 102. For example, exemplary data safe or user data safe 112 can facilitate enhanced user 102 control over the provision, collection, use, distribution, and so on, of user information about user 102 comprising or associated with one or more of personal identification information 302, income information 304, employment information 306, investment information 308, credit card information 310, medical history information 312, account/login information 314, payment information 316, etc., without limitation.

For example, FIG. 4 illustrates non-limiting examples of user information about a user that can be employed in the provision, collection, use, distribution, and so on, of user information about the user, in accordance with various embodiments of an exemplary data safe or user data safe 112 as described herein.

Exemplary non-limiting examples of personal identification information 302 can comprise or be associated with one or more of name, address, Social Security number (SSN), date of birth, phone number, email address, emergency contact, emergency phone number, an electronic signature, a uniform resource identifier (URI) to identity file of verification entity (e.g., verifying entity 110), and so on, without limitation, in non-limiting aspects.

In further non-limiting aspects, exemplary non-limiting examples of income information 304 can comprise or be associated with one or more of a paystub URI or uniform resource locator (URL), a username, password, a payroll provider, and so on, without limitation.

Exemplary non-limiting examples of employment information 306 can comprise or be associated with one or more of current employer, employment start date, previous or prior employer, start and end dates, and so on, without limitation, in still other non-limiting aspects.

In addition, exemplary non-limiting examples of investment information 308 can comprise or be associated with one or more of 401(k) URL, brokerage1 URL, brokerage2 URL, banking institution1, username(s), password(s), account number(a), and so on, without limitation, in non-limiting aspects.

In still other non-limiting embodiments, exemplary non-limiting examples of credit card information 310 can comprise or be associated with one or more of card or account number(s), expiration date(s), card verification value(s) (CVV), and so on, without limitation, in non-limiting aspects, as illustrated in FIG. 4.

Exemplary non-limiting examples of medical history information 312 can comprise or be associated with one or more of insurance provider, policy number, family disease history, current prescriptions, past treatments and events, primary care physician, service provider, and so on, without limitation, in still further non-limiting aspects.

More generally, exemplary non-limiting examples of account/login information 314 can comprise or be associated with one or more of site URL(s), same username(s), site password(s) and so on, without limitation, in further non-limiting aspects.

In addition, exemplary non-limiting examples of payment information 316 can comprise or be associated with one or more of a payment entity username, a payment entity password, a PayPal username, a PayPal password, a mobile payment service, username, a mobile payment service password, a block chain username, a block chain password, a meta-mask username, a meta-mask, password, and so on, without limitation, in non-limiting aspects.

As described, various embodiments of data safe or user data safe 112 as described herein can facilitate enhanced user 102 control over the provision, collection, use, distribution, and so on, of user information about user 102, as well as facilitate the validation, verification, authentication, and proper protection and control of such user information about user 102, to ensure smooth, efficient, and cost-effective business processes. Accordingly, various embodiments as described herein can provide further benefits from achieving efficiencies in the proper or authorized provision, collection, use, distribution, and so on, of user information about user 102.

As used herein, user information about user 102 can be referred to as personal information, without limitation, regardless of whether an exemplary user 102 comprises an individual human person, properly authorized and authenticated to use data safe or user data safe 112, whether exemplary user 102 comprises any of a number of real or intangible entities about which user information is desired by one or more data consumer(s) 106, or whether one or more computer-executable components acting on behalf of exemplary user 102.

As depicted in FIGS. 3 and 4, personal information can comprise personal identification information (PII), and/or other personal information (OPI), according to various non-limiting aspects. Exemplary PII or personal identification information 302, as used herein, can comprise or be associated with information or combinations of information that resolve to a unique user 102. Thus, in a non-limiting aspect, user information comprising PII or personal identification information 302 can be determined to be PII or personal identification information 302, based in part on such information or combinations of information resolving to a unique user 102 beyond a predetermined threshold confidence level. In a non-limiting aspect, one combination of information, such as name and mailing address ZIP Code may resolve to user 102 with a first level of confidence, which may meet or exceed a first predetermined threshold confidence level. In another non-limiting aspect, another combination of information, such as name, current address, and date of birth may resolve to user 102 with a second level of confidence, which may meet or exceed a second predetermined threshold confidence level. In still another non-limiting aspect, another combination of information, such as name and SSN may resolve to user 102 with a third level of confidence, which may meet or exceed a third predetermined threshold confidence level.

In still further non-limiting examples, it can be understood that exemplary PII or personal identification information 302 can comprise or be associated with further categories of personal information, such as but not limited to, biometric information associated with user 102, including, but not limited to fingerprint data, facial recognition, data, retinal scan data, DNA information, and so on, one or more authentication factors in a multifactor authentication process, cryptographic tokens, digital certificates, radiofrequency identification (RFID) and/or near field communication (NFC) information or packets, and so on, whether self-verified such as via entry of personal information on a digital form, or whether one or more verifying entities 110 are employed to enhance the confidence in the subject personal information. Accordingly, while particular non-limiting examples of personal identification information 302 are described above, for the purposes of illustration, it can be understood that PII or personal identification information 302, is not limited by the scope of embodiments described herein.

As described, personal information can comprise personal identification information such as personal identification information 302, and/or other personal information (OPI), according to various non-limiting aspects. As contrasted with PII or personal identification information 302, OPI can comprise information or combinations of information that do not resolve to a unique user 102 beyond the predetermined threshold confidence level, for example, without more. A non-limiting example might be a doctor's record or an account balance, that without additional information such as a patient ID, account number, entity, etc., cannot be used to resolve whether the information comprising OPI relates to or is associated with unique user 102 beyond the predetermined threshold confidence level.

As further described herein, for example, regarding FIGS. 5-14, 15-19, etc., various embodiments of data safe or user data safe 112 can facilitate enhanced user 102 control over the provision, collection, use, distribution, and so on, of user information about user 102 as well as facilitate the validation, verification, authentication, and proper protection and control of such user information about user 102, to ensure smooth, efficient, and cost-effective business processes, by employing further non-limiting examples of information associated with user 102 (e.g., categories of use, supplemental information, other information, other authorization information, etc.).

Figure 5:
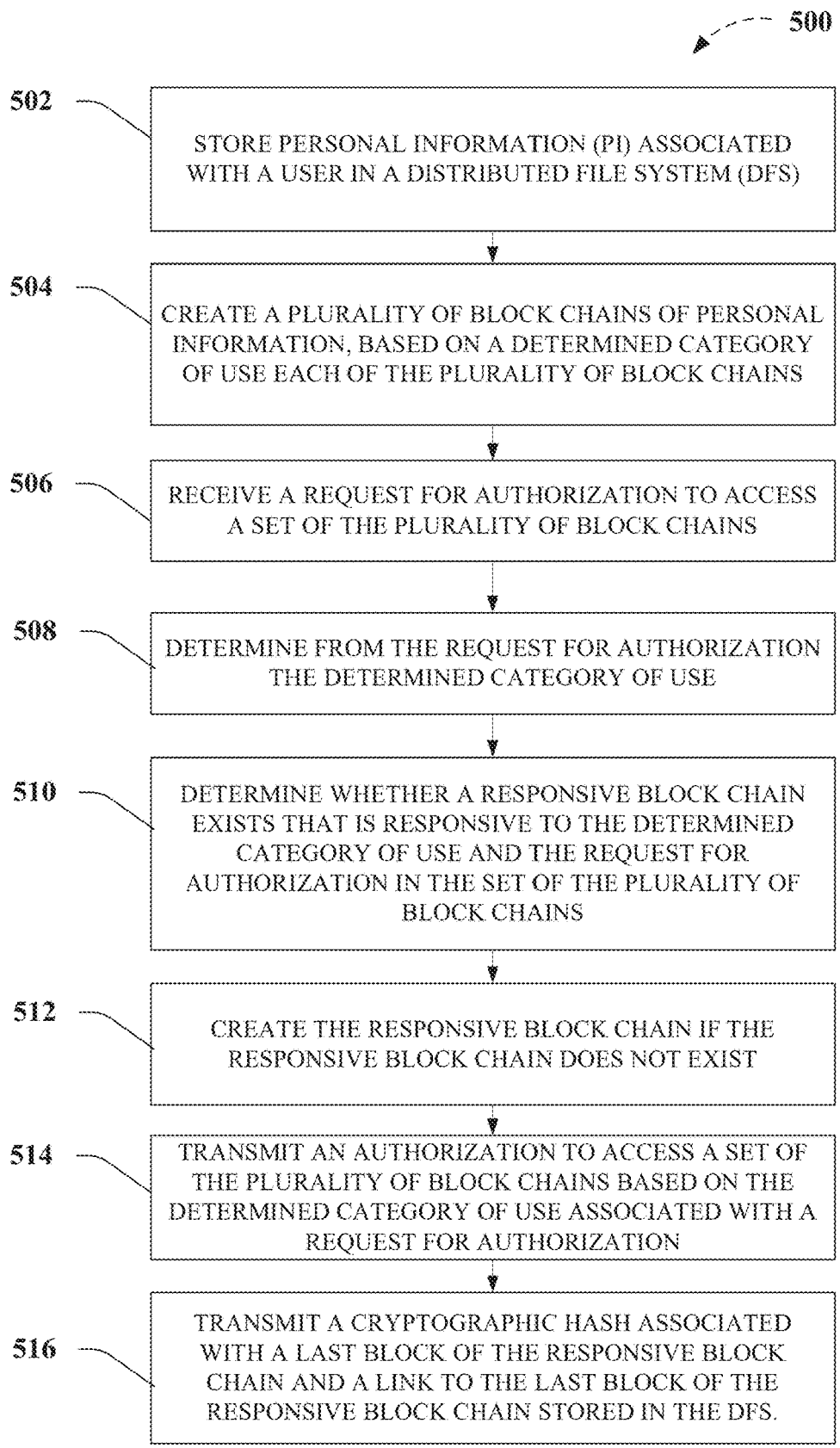
FIG. 5 illustrates an exemplary flow diagram of methods directed to creation of user information or data block chains according non-limiting aspects of embodiments of the disclosed subject matter.

FIG. 5 illustrates an exemplary flow diagram of methods 500 directed to creation of user information or data block chains according non-limiting aspects of embodiments of the disclosed subject matter.

As a non-limiting example, exemplary methods 500 can comprise, at 502, storing, by a device comprising a processor (e.g., device or system 2000, 2200, 2300, portions thereof, etc.) personal information associated with a user in a distributed file system (DFS), as further described herein, regarding FIGS. 6-14, 15-19, and 20-26, for example. For instance, in a non-limiting aspect of exemplary methods 500, the storing the personal information can comprise encrypting, via the device (e.g., device or system 2000, 2200, 2300, portions thereof, etc.), the personal information with supplemental information to facilitate creation of one or more block chain(s) of the plurality of block chains, determination an applicability status of the request for authorization, and so on. In a further non-limiting aspect of exemplary methods 500, the storing the personal information in DFS can comprise storing, via the device (e.g., device or system 2000, 2200, 2300, portions thereof, etc.), the personal information in inter-planetary file system (IPFS).

In another non-limiting aspect of exemplary methods 500, the encrypting the personal information with supplemental information can comprise encrypting, via the device (e.g., device or system 2000, 2200, 2300, portions thereof, etc.), a plurality of a cryptographic hash of a prior block of personal information in the one or more block chain(s), a link to the prior block of personal information in the one or more block chain(s) stored in the DFS, a verifying entity associated with the personal information, a digital signature associated with the verifying entity, information associated with an encryption key or decryption key, or other authorization information associated with the set of the plurality of block chains, as further described herein, regarding FIGS. 6-14, 15-19, and 20-26, for example. For example, in a further non-limiting aspect of exemplary methods 500, the encrypting the other authorization information associated with the set of the plurality of block chains can comprise encrypting, via the device (e.g., device or system 2000, 2200, 2300, portions thereof, etc.), one or more term of use determined by the user. As a further non-limiting example according to further aspects of exemplary methods 500, the encrypting the link to the prior block of personal information in the one or more block chain(s) can comprise encrypting, via the device (e.g., device or system 2000, 2200, 2300, portions thereof, etc.), an encrypted link to the prior block of personal information in the one or more block chain(s).

In another non-limiting example, exemplary methods 500 can comprise, at 504, creating, by the device (e.g., device or system 2000, 2200, 2300, portions thereof, etc.), a plurality of block chains of personal information, based on a determined category of use of each of the plurality of block chains, as further described herein, regarding FIGS. 6-14, 15-19, and 20-26, for example.

As a non-limiting example, exemplary methods 500 can further comprise creating the plurality of block chains of personal information which can comprise determining, via the device (e.g., device or system 2000, 2200, 2300, portions thereof, etc.), whether the personal information is personal identification information or other personal information, wherein the personal identification information is defined as information or combinations of information that resolve to a unique user, meeting or exceeding a predetermined threshold confidence level, and wherein the other personal information is defined as other information or combinations of other information that does not resolve to the unique user, by failing to meet or exceed the predetermined threshold confidence level, and creating the plurality of block chains based on at least the personal identification information.

In addition, exemplary methods 500 can further comprise, at 506, receiving, via the device (e.g., device or system 2000, 2200, 2300, portions thereof, etc.), the request for authorization, as further described herein, regarding FIGS. 6-14, 15-19, and 20-26, for example.

In yet another non-limiting example, exemplary methods 500 can comprise, at 508, determining, via the device (e.g., device or system 2000, 2200, 2300, portions thereof, etc.), from the request for authorization the determined category of use, as further described herein, regarding FIGS. 6-14, 15-19, and 20-26, for example.

In still another non-limiting example, exemplary methods 500 can comprise, at 510, determining, via the device (e.g., device or system 2000, 2200, 2300, portions thereof, etc.), whether one or more responsive block chain exists that is responsive to the determined category of use and the request for authorization in the set of the plurality of block chains, as further described herein, regarding FIGS. 6-14, 15-19, and 20-26, for example.

In further non-limiting examples, exemplary methods 500 can comprise, at 512, creating, via the device (e.g., device or system 2000, 2200, 2300, portions thereof, etc.), the one or more responsive block chain if the one or more responsive block chain does not exist, as further described herein, regarding FIGS. 6-14, 15-19, and 20-26, for example.

As a non-limiting example, exemplary methods 500 can comprise, at 514, transmitting an authorization, by the device (e.g., device or system 2000, 2200, 2300, portions thereof, etc.), to access a set of the plurality of block chains based on the determined category of use associated with a request for authorization, as further described herein, regarding FIGS. 6-14, 15-19, and 20-26, for example.

In another non-limiting example, exemplary methods 500 can comprise, at 516 transmitting the authorization comprising transmitting, via the device (e.g., device or system 2000, 2200, 2300, portions thereof, etc.), one or more cryptographic hash associated with a last block of the one or more responsive block chain and a link to the last block of the one or more responsive block chain stored in the DFS, as further described herein, regarding FIGS. 6-14, 15-19, and 20-26, for example.

For instance, in another non-limiting aspect of exemplary methods 500, the transmitting the one or more cryptographic hash associated with the last block of the one or more responsive block chain and the link to the last block of the one or more responsive block chain stored in the DFS can comprise encrypting, via the device (e.g., device or system 2000, 2200, 2300, portions thereof, etc.), the one or more cryptographic hash associated with the last block of the one or more responsive block chain and the link to the last block of the one or more responsive block chain with a requester encryption key.

In another non-limiting example, exemplary methods 500 can comprise determining, via the device (e.g., device or system 2000, 2200, 2300, portions thereof, etc.), the one or more term of use, comprising one or more of an expiration term for one or more of the authorization or the personal information, a validity term associated with the personal information, one or more of a payee or a requested fee associated with the one or more of the authorization or the personal information, one or more of a transmission limit or a storage limit associated with the one or more of the authorization or the personal information, or a restriction associated with the one or more of the authorization or the personal information on a third party, as further described herein, regarding FIGS. 6-14, 15-19, and 20-26, for example.

FIGS. 6-14 illustrates a flow diagram of non-limiting aspects of an exemplary process for creation of user information or data block chains according non-limiting aspects of embodiments of the disclosed subject matter.

Figure 6:
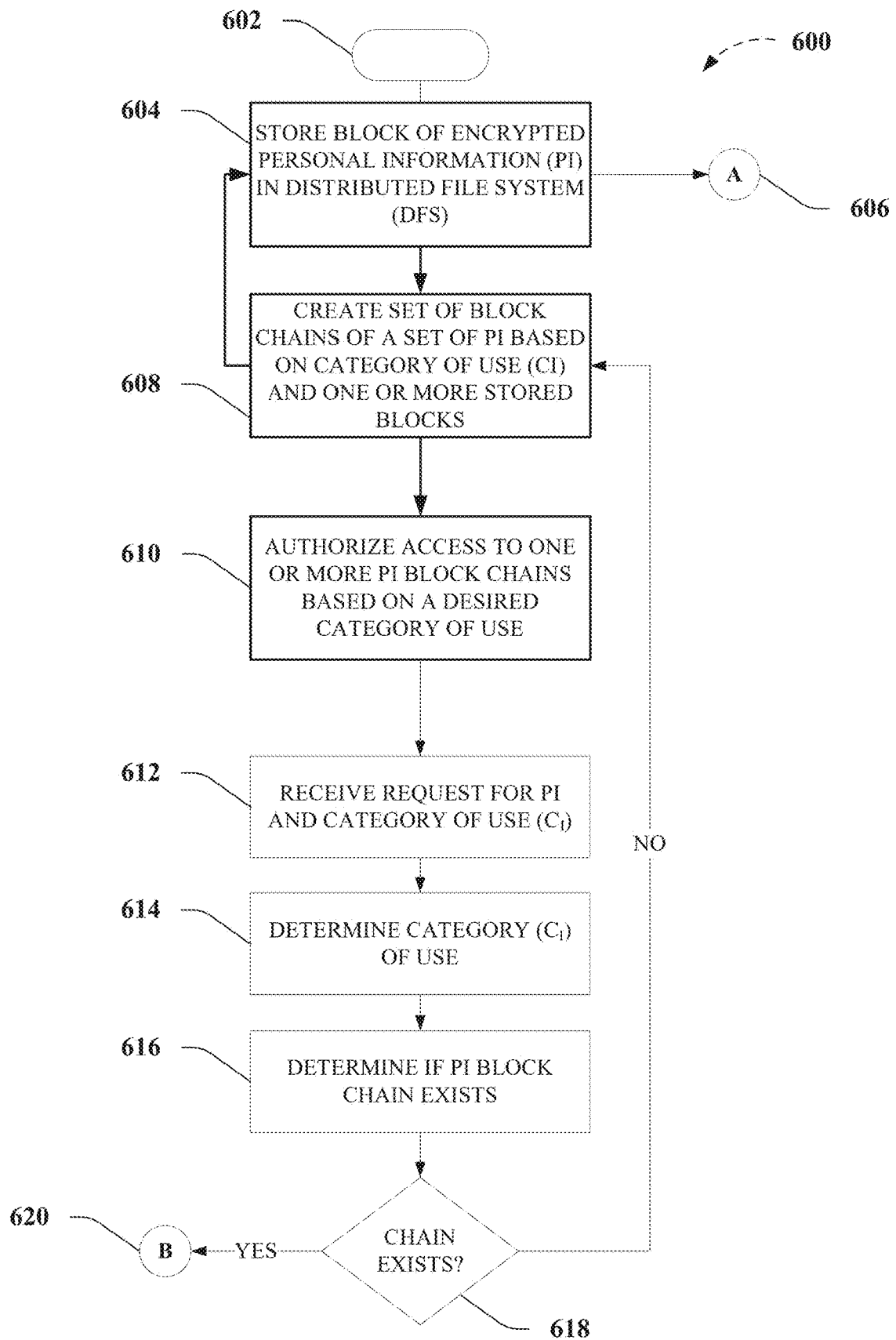
FIGS. 6-14 illustrates flow diagrams of non-limiting aspects of exemplary processes for creation of user information or data block chains according non-limiting aspects of embodiments of the disclosed subject matter.

FIG. 6 illustrates a flow diagram of non-limiting aspects of exemplary processes 600 for creation of user information or data block chains and/or use thereof according non-limiting aspects of embodiments of the disclosed subject matter.

For instance, FIG. 6 depicts exemplary processes 600 for creation of user information or data block chains and/or use thereof, beginning at 602. As further described herein regarding FIGS. 5 and 8-10, exemplary processes 600 can comprise, at 604, storing, by a device comprising a processor (e.g., device or system 2000, 2200, 2300, portions thereof, etc.) personal information (PI) associated with a user in a distributed file system (DFS), as further described herein. In another non-limiting aspect, at 608, exemplary processes 600 can comprise creating, by the device (e.g., device or system 2000, 2200, 2300, portions thereof, etc.), a plurality of block chains of personal information, based on a determined category of use of each of the plurality of block chains, as further described herein, regarding FIGS. 5 and 8-10. As shown in FIG. 6, storing one or more blocks of encrypted personal information (PI) in distributed file system (DFS) and creating a set of block chains of a set of PI based on one or more categories of use (CI) and one or more stored blocks of encrypted PI as further described regarding off-page reference A, 606, in FIGS. 8-10.

Figure 11:
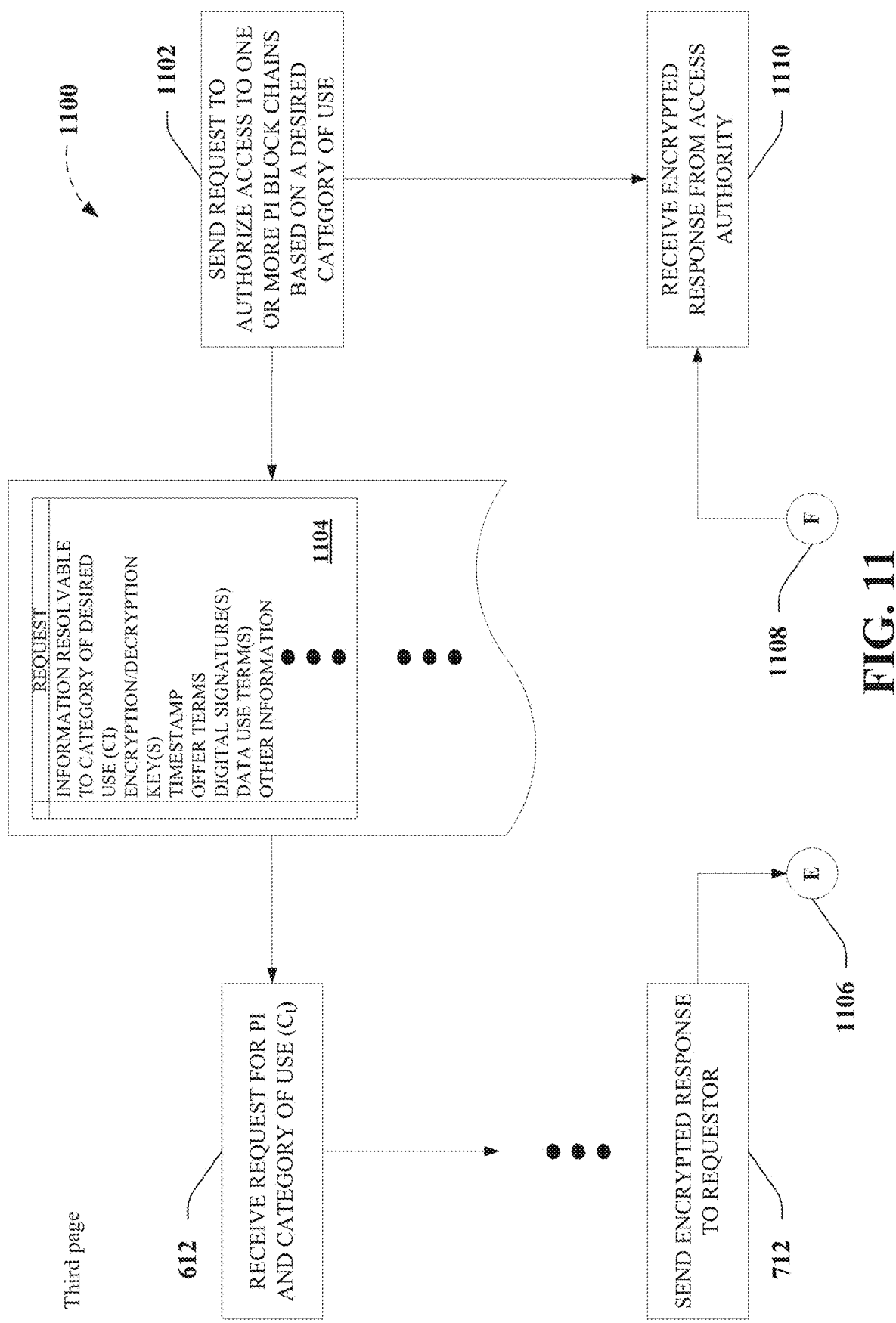
Figure 12:
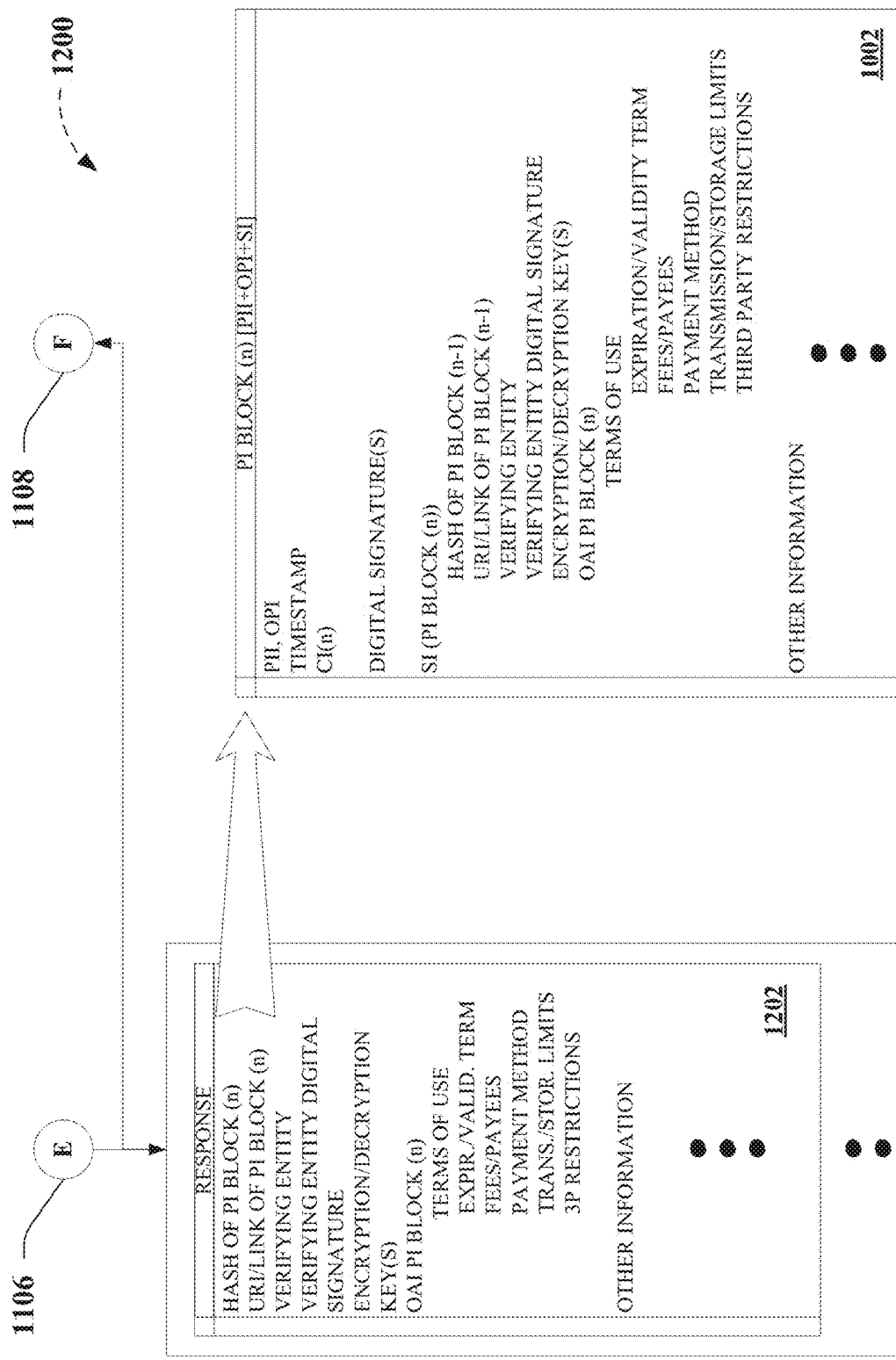

In a further non-limiting aspect, exemplary processes 600 can comprise, at 610, transmitting an authorization, by the device (e.g., device or system 2000, 2200, 2300, portions thereof, etc.), to access a set of the plurality of block chains based on the determined category of use associated with a request for authorization, as further described herein, regarding FIGS. 5 and 11-12. As a non-limiting example, to authorize access to one or more PI block chains based on a desired category of use (CI) at 610, exemplary processes 600 can comprise, at 612, receiving, via the device (e.g., device or system 2000, 2200, 2300, portions thereof, etc.), the request for authorization, as further described herein, regarding FIGS. 5 and 11-12, which can comprise a request for personal information (PI), one or more categories of use (CI) of the requested PI, and/or information from which it can be determined or resolved the one or more categories of use (CI) of the requested PI. As a further non-limiting example, to authorize access to one or more PI block chains based on a desired category of use (CI) at 610, exemplary processes 600 can comprise, at 614, determining, via the device (e.g., device or system 2000, 2200, 2300, portions thereof, etc.), from the request for authorization the determined category of use (CI), as further described herein, regarding FIGS. 5 and 11-12.

Figure 7:
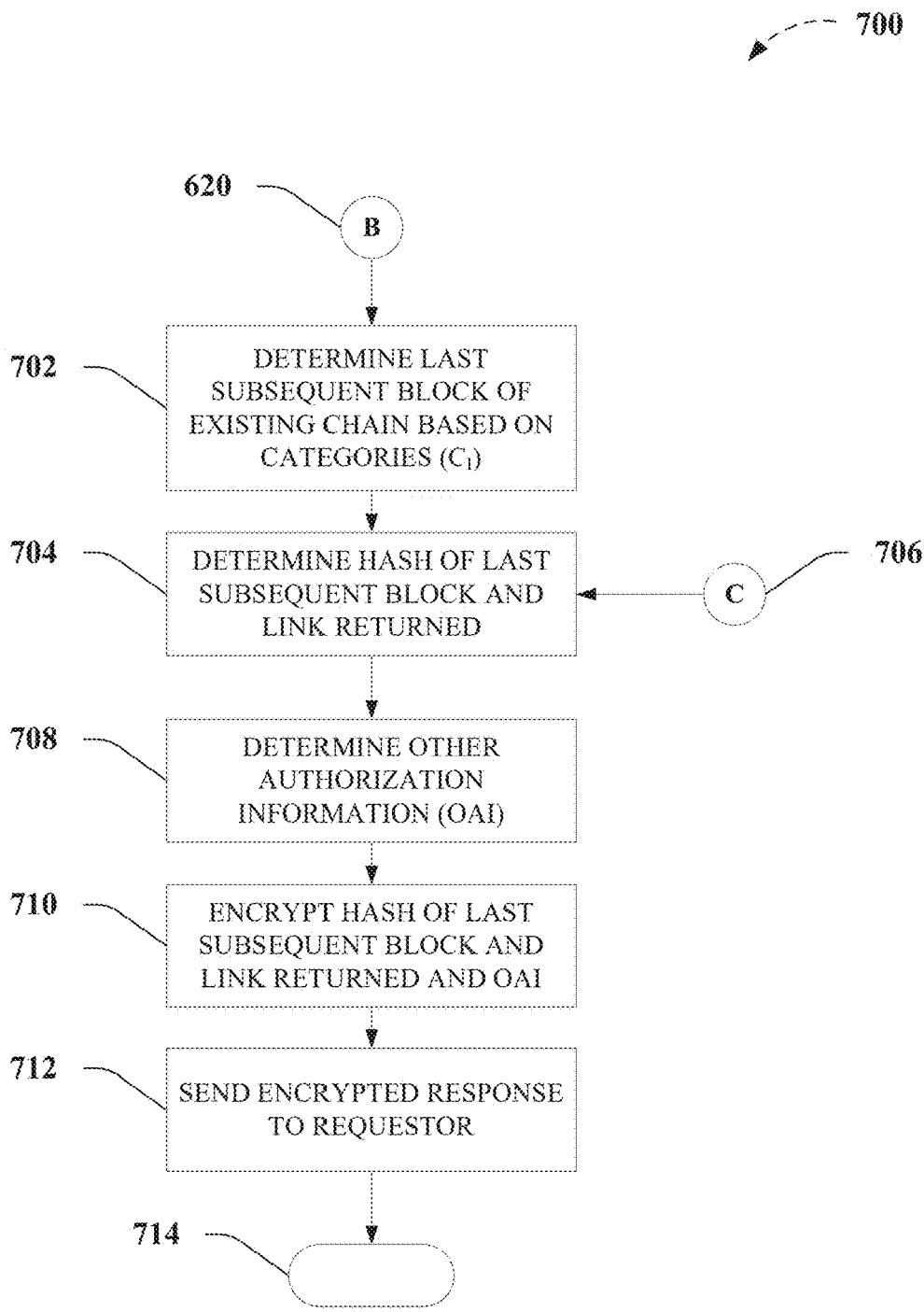

In yet another non-limiting example, to authorize access to one or more PI block chains based on a desired category of use (CI) at 610, exemplary processes 600 can comprise, at 616, determining, via the device (e.g., device or system 2000, 2200, 2300, portions thereof, etc.), whether one or more responsive block chain exists that is responsive to the determined category of use and the request for authorization in the set of the plurality of block chains, as further described herein, regarding FIGS. 5, 7, and 11. Thus, if it is determined that the PI block chain does not exist (e.g., whether one or more responsive block chains exist, etc.), at 618, the exemplary processes 600 can facilitate, at 608, the storing of one or more blocks of encrypted personal information (PI) in distributed file system (DFS) and creating a set of block chains of a set of PI based on one or more categories of use (CI) and one or more stored blocks of encrypted PI as further described above regarding off-page reference A, 606, in FIGS. 8-10. Alternatively, if it is determined that the PI block chain exists (e.g., whether one or more responsive block chain exists, etc.), at 618, the exemplary processes 600 can proceed through off-page reference B, 620, as further described herein, regarding FIGS. 7 and 11-12.

For example, FIG. 7 illustrates a flow diagram of non-limiting aspects of exemplary processes 700 that facilitates authorizing access to one or more PI block chains based on a desired category of use (CI) according non-limiting aspects of embodiments of the disclosed subject matter.

As a non-limiting example, exemplary processes 700 can comprise, at 702, determining s last subsequent block of an existing block chain based on one or more categories of use (CI). For instance, as described herein, a block chain typically comprises a growing list of records, called blocks, which are linked using cryptography, where each block can comprise a cryptographic hash of the previous block, a timestamp, and/or other data such as transaction data in conventional use. Thus, a block chain block as described herein can be referred to as a root block, which can be understood to be a first block in the block chain or a genesis block, which may be first in time, but need not be, according to various non-limiting aspects, a last block, which can be understood to be a last block in the block chain or a current block, which may be last in time, but need not be, according to further non-limiting aspects, and a subsequent block, which would be subsequent to or follow a root block in a block chain, and for which any number of subsequent blocks may follow the root block. By way of example of an exemplary three block, block chain, the "last" block, "last subsequent" block, or current block in the block chain would follow a subsequent block that is immediately prior in the block chain, and the subsequent block would follow the root block or genesis block, for example, as further described herein regarding FIGS. 8 and 11-12.

Figure 9:
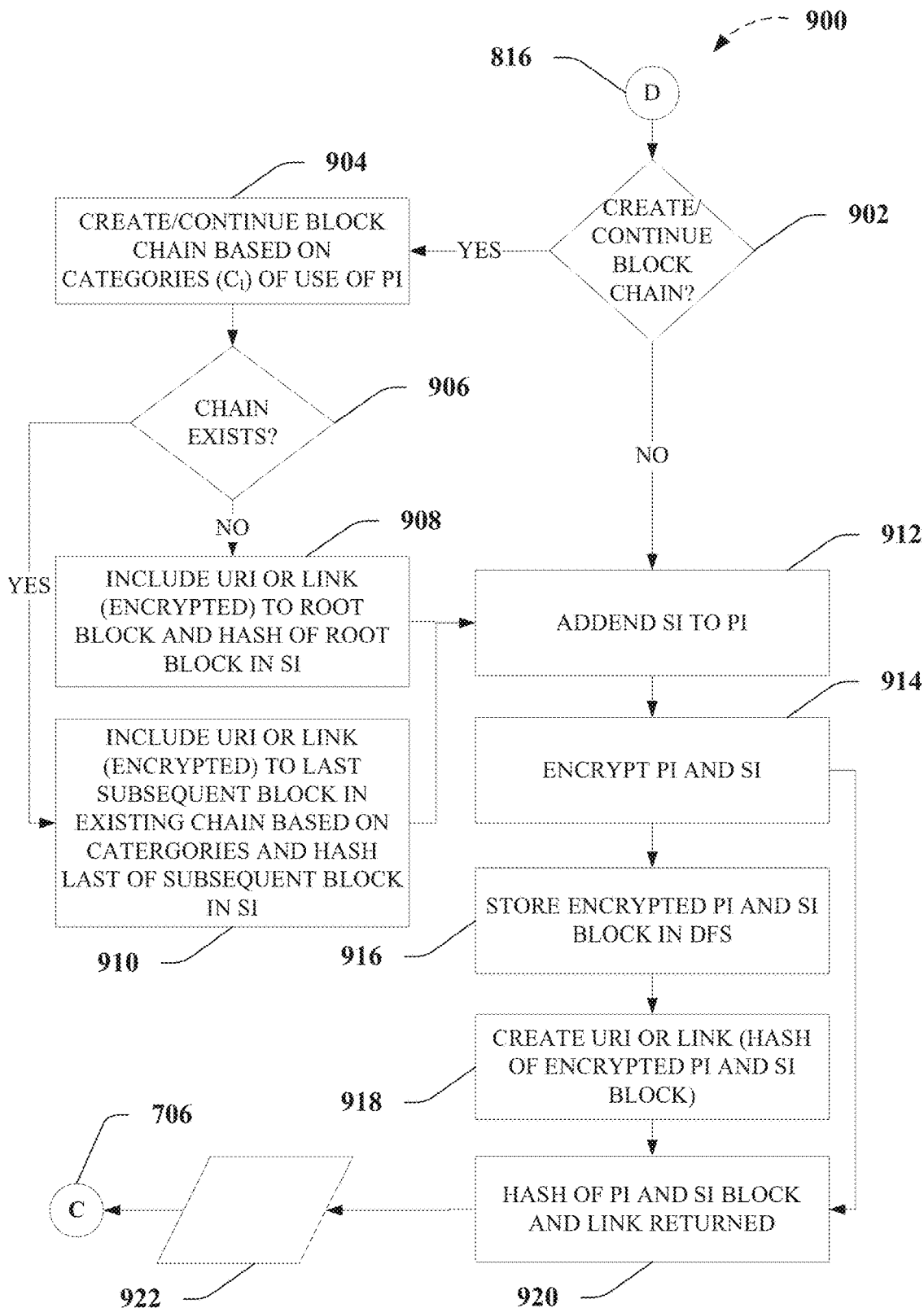

For instance, upon receiving a request for authorization to access a set of the plurality of block chains and determining that a responsive block chain exists that is responsive to the determined one or more categories of use (CI) and the request for authorization in the set of the plurality of block chains, at 618, exemplary processes 700 can comprise, at 702, determining a last subsequent block of an existing block chain based on one or more categories of use (CI), for example, as further described herein regarding FIGS. 9 and 11-12.

Figure 8:
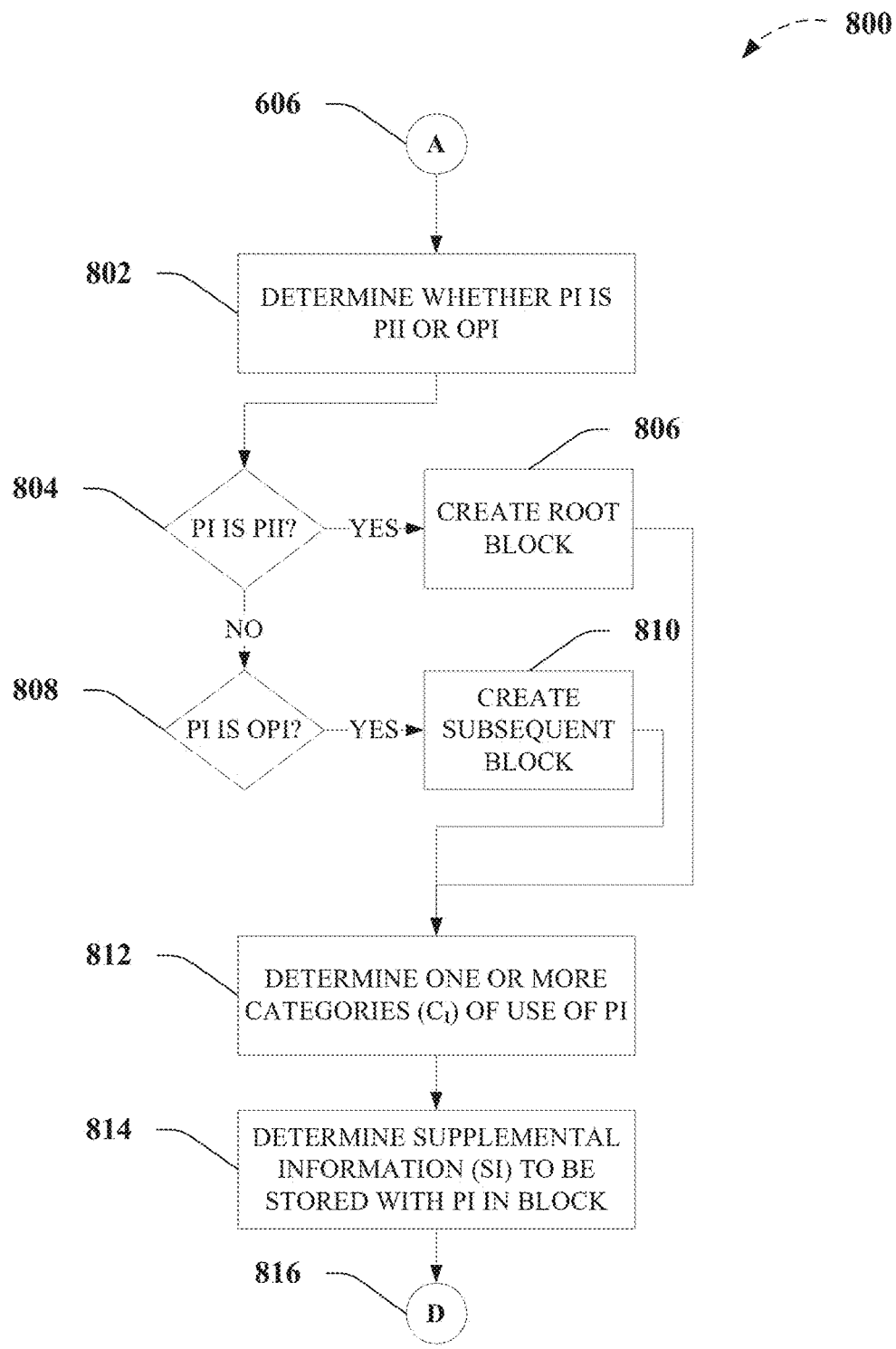
Figure 10:
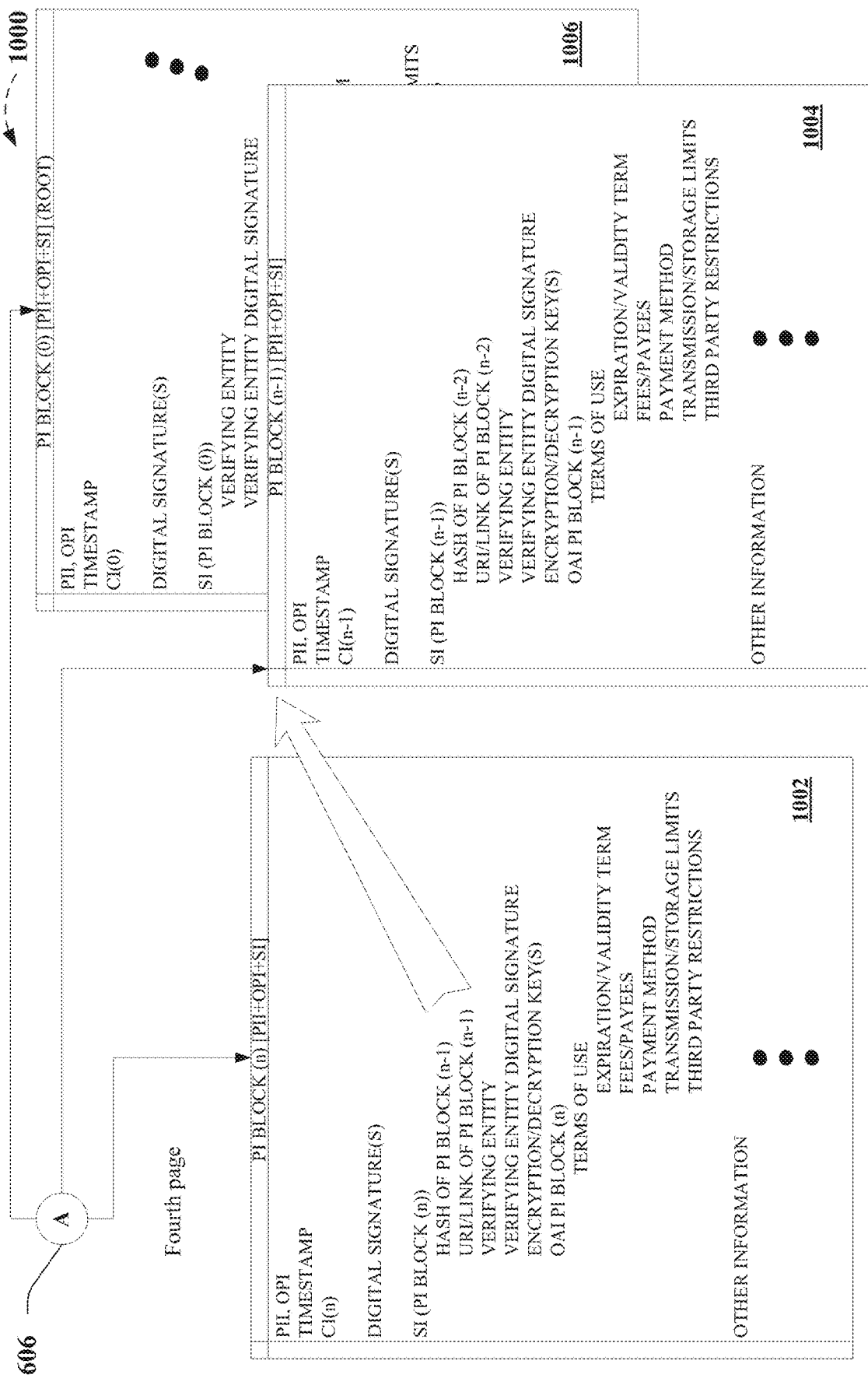

As a further non-limiting example, exemplary processes 700 can comprise, at 704, determining a hash (e.g., a cryptographic hash, etc.) of the last subsequent block and a link returned, for example, as further described herein regarding FIGS. 8-10. For example, as further described herein regarding FIGS. 8-10 and 12, a block of personal information can be encrypted and stored in DFS. In a non-limiting aspect, a hash or a cryptographic hash can be computed for the encrypted block of personal information, which in further non-limiting aspects, can be, but need not be, used as a link or uniform resource identifier (URI) to facilitate unambiguously identifying, locating, and/or sharing the encrypted block of personal information, according to various non-limiting embodiments described herein, for example, regarding FIGS. FIGS. 8-10 and 12. Thus, at 704, exemplary processes 700 can comprise determining a hash (e.g., a cryptographic hash, etc.) of the last subsequent block of PI and a link returned (e.g., as a result of storage in the DFS), for example, as further described herein regarding FIGS. 8-10, from off-page reference C, 706, from FIG. 9.

In another non-limiting example, exemplary processes 700 can comprise, at 708, determining other authorization information (OAI). For instance, according to various non-limiting embodiments described herein, contents of blocks in a block chain can comprise various categories of information, including, but not limited to, personal information (PI), which can include personal identification information (PII) and other personal information (OPI), as described above, supplemental information (SI), which can comprise other authorization information (OAI), and other information, for example, as further described herein, regarding FIGS. 8-10 and 12. As used herein, other authorization information (OAI) can comprise or be associated with restrictions specified by a user, or a system or a device on behalf of the user, regarding the provision, collection, use, storage, distribution, and so on, of user information about the user (e.g., personal information (PI)), as well as relating to the validation, verification, authentication, and/or proper protection and control user information about the user (e.g., personal information (PI)). Accordingly, non-limiting examples of other authorization information (OAI) can include, but are not limited to, terms of use, information expiration term (e.g., a time-based limit on validity), information validity term (e.g., other context-based limit on validity), fee-based restrictions or limitations and/or payee information, including but not limited to, payment method, transmission and/or storage limits and/or restrictions, limits and/or restrictions on third-party access, whether generalized or specific, and so on, links to such OAI, whether contained in the block or response, as the case may be, or incorporated by reference to a linked resource, etc., according to various non-limiting aspects. Accordingly, exemplary processes 700 can comprise, at 708, determining other authorization information (OAI), if any, to include in the block of PI to be stored in DFS or a response to be sent in reply to a request for authorization to access PI, as the case may be, for example, as further described herein, regarding FIGS. 8-10 and 12.

As a further non-limiting example, exemplary processes 700 can comprise, at 710, encrypting a hash (e.g., a cryptographic hash, etc.) of the last subsequent block of PI and a link returned (e.g., as a result of storage in the DFS), as determined at 704, for example, as further described herein regarding FIGS. 9 and 11-12. For instance, as further described herein, various non-limiting embodiments can comprise transmitting the authorization comprising transmitting, via the device (e.g., device or system 2000, 2200, 2300, portions thereof, etc.), one or more cryptographic hash associated with a last block of the one or more responsive block chain and a link to the last block of the one or more responsive block chain stored in the DFS, as further described herein. Thus, a hash (e.g., a cryptographic hash, etc.) of the last subsequent block of PI and a link returned (e.g., as a result of storage in the DFS), as determined at 704, can be encrypted, at 710. In yet another non-limiting example, exemplary processes 700 can comprise, at 712, sending encrypted response to requestor.

As further described herein, various encryption operations can be employed to facilitate the provision, collection, use, storage, distribution, and so on, of user information about the user (e.g., personal information (PI)), as well as relating to the validation, verification, authentication, and/or proper protection and control user information about the user (e.g., personal information (PI)), according to non-limiting aspects as described herein. As a non-limiting example, in FIG. 7, at 710, exemplary processes 700 can comprise, encrypting a hash (e.g., a cryptographic hash, etc.) of the last subsequent block of PI and a link returned (e.g., as a result of storage in the DFS), as determined at 704, for example, as further described herein regarding FIGS. 9 and 11-12. Such encryption may be, but need not be, by way of public-key cryptography. As non-limiting examples, at 710, exemplary processes 700 can comprise, encrypting a hash (e.g., a cryptographic hash, etc.) of the last subsequent block of PI and a link returned (e.g., as a result of storage in the DFS), as determined at 704, using a user's private key, which information would be decrypted using user's public key, using a requestor's public key, for example, which would be sent in an exemplary request for access to one or more PI block chains, as further described herein, regarding FIGS. 11-12, for example, and/or using another agreed-upon encryption protocol, without limitation.

Thus, having sent encrypted response to the requestor, at 712, exemplary processes 700 can terminated at 714.

As further described above regarding FIG. 6, FIG. 8 illustrates a flow diagram of non-limiting aspects of exemplary processes 800 for creation of user information or data block chains, according non-limiting aspects of embodiments of the disclosed subject matter. Accordingly, FIG. 6 proceeds from storing one or more blocks of encrypted personal information (PI) in distributed file system (DFS) and creating a set of block chains of a set of PI based on one or more categories of use (CI) and one or more stored blocks of encrypted PI to off-page reference A, 606, in FIG. 8.

Thus, at 802, exemplary processes 800 can comprise determining whether personal information (PI) is personal identification information (PII) or other personal information (OPI). As further described herein, regarding FIGS. 3-4, for example, exemplary PII or personal identification information 302, as used herein, can comprise or be associated with information or combinations of information that resolve to a unique user 102. Thus, in a non-limiting aspect, user information comprising PII or personal identification information 302 can be determined to be PII or personal identification information 302, based in part on such information or combinations of information resolving to a unique user 102 beyond a predetermined threshold confidence level, whereas OPI can comprise information or combinations of information that do not resolve to a unique user 102 beyond the predetermined threshold confidence level, for example, without more.

In a further non-limiting example, having determined that the personal information (PI) to be stored in DFS is personal identification information (PII), at 804, exemplary processes 800 can comprise creating a root block of PI to store in DFS, at 806. Otherwise, having determined that the personal information (PI) is other personal information (OPI), at 808, exemplary processes 800 can comprise creating a subsequent block of PI to store in DFS, at 810. As described above, an exemplary subsequent block would follow an exemplary root block to construct a block chain of personal information (PI) to be stored DFS. As depicted in FIG. 8, exemplary embodiments as described herein can comprise creating one or more block chains of user information or data about a user 102 or personal information (PI), wherein the root block comprises personal identification information (PII). However, in further non-limiting aspects, further exemplary embodiments can comprise creating one or more block chains of user information or data about a user 102 or personal information (PI), wherein the root block does not necessarily comprise personal identification information (PII). As a non-limiting example, in last or last subsequent block, and/or any subsequent block in the block chain as described herein can comprise personal identification information (PII). In other non-limiting examples, personal identification information (PII) can be spread across a number of blocks of a block chain, such that combinations of information spread across the number of blocks can resolve to a unique user 102 (e.g., beyond the predetermined threshold).

In still another non-limiting example, various embodiments can facilitate creating one or more block chains of user information or data about a user 102 or personal information (PI), wherein none of the blocks in a block chain comprise personal identification information (PII).

Nevertheless, having created a block of personal information (PI) to be stored in DFS, exemplary processes 800 can comprise determining one or more categories of use of the PI, at 812. As can be understood, some pieces of personal information (PI), can be used for useful for multiple categories of use. As a non-limiting example, personal identification information (PII), can be useful almost universally (e.g., employment, investment, lending, service provision, insurer assessment, etc.), whereas other pieces of personal information (PI) would be useful only in the most limited of circumstances (e.g., employment interview availability dates, desired salary, last medical exam, credit card purchase on a particular date, etc.). In addition, a user 102 may desire to restrict the purposes for which user information or data about a user 102 or personal information (PI) stored in DFS is available for use. As a non-limiting example, user 102 may store in DFS a block of personal information (PI) relating to employment history, for the purpose of interviewing with prospective employers. However, as a further non-limiting example, user 102 may desire to restrict use of that personal information (PI), for example, for other purposes, such as, lending, and so on. Accordingly, exemplary processes 800 can comprise, at 812, determining one or more categories of use of the PI to be stored in the block of personal information (PI) in DFS, for example, as further described herein, regarding FIGS. 9-10.

In addition, exemplary processes 800 can comprise, at 812, determining supplemental information (SI) to be stored with personal information (PI) in a block of a block chain in DFS, for example, as further described herein, regarding FIGS. 9-10. As a non-limiting example, in addition to other authorization information (OAI), for example, as described above regarding FIG. 7, supplemental information (SI) can comprise or be associated with meta information or supplemental information such as alternate or additional names, addresses, etc., contact information or referral information, account passwords or limited-time use access codes, authorized or associated side block chains, and so on, in addition to that information as further described herein, regarding FIGS. 9-10. As a non-limiting example, various embodiments as described herein can comprise supplemental information (SI) (e.g., SI (PI BLOCK (n))) comprising other authorization information (OAI), as described above, a hash (e.g., a cryptographic hash) of the prior block of personal information (PI) stored in DFS (e.g., HASH OF PI BLOCK (n−1)), a URI or link of the prior block of personal information (PI) stored in DFS (e.g., URI/LINK OF PI BLOCK (n−1)), a verifying entity associated with personal information (PI) in or associated with the block (e.g., VERIFYING ENTITY), a verifying entity digital signature associated with personal information (PI) in or associated with the block (e.g., VERIFYING ENTITY DIGITAL SIGNATURE), encryption/decryption keys, if any, to facilitate decryption of personal information (PI) stored in one or more blocks of the one or more block chains of personal information (PI) stored in DFS (e.g., ENCRYPTION/DECRYPTION KEY(S)), and so on, without limitation, for example, as further described herein, regarding FIGS. 9-13. As a non-limiting example, supplemental information (SI) comprising one or more encryption/decryption keys, if any, to facilitate decryption of personal information (PI) stored in one or more blocks of the one or more block chains of personal information (PI) stored in DFS (e.g., ENCRYPTION/DECRYPTION KEY(S)) can be employed to facilitate decrypting one or more blocks of personal information (PI) stored in DFS, according to a predetermined encryption protocol or agreement between a user 102 and a requestor, for example, comprising a data consumer 106, and/or via one or more devices or systems acting on their behalf, in further non-limiting aspects.

Exemplary processes 800 can continue via off-page reference D, 816. For instance, FIG. 9 illustrates a flow diagram of further non-limiting aspects of exemplary processes 900 for creation of user information or data block chains, according non-limiting aspects of embodiments of the disclosed subject matter. Accordingly, exemplary processes 900 can comprise, at 902, creating or continuing a block chain of personal information (PI) to be stored in DFS. As a non-limiting example, if it is determined that it is desired to create or continue a block chain of personal information (PI) based on one or more categories of use (CI) to be stored in DFS, at 904, it can be determined at 906, whether or not an existing block chain, at 906, in various non-limiting embodiments.

If it is determined that an existing block chain does not exist (e.g., a root block is to be created at 806, etc.), at 906, then, at 908, a URI or link to the root block and a hash (e.g., a cryptographic hash) of the root block can be included in supplemental information (SI), at 908. If it is determined that an existing block chain does exist (e.g., a subsequent block is to be created at 810, etc.), at 906, then, at 910, a URI or link to the last subsequent block and a hash (e.g., a cryptographic hash) of the last subsequent block can be included in supplemental information (SI), at 910. In further non-limiting embodiments, the URI or link to the root block or the last subsequent block, as the case may be, may be further encrypted to facilitate further compartmentalization, protection, and control over unauthorized access and dissemination of personal information (PI) stored in the one or more block chain stored in DFS, for example, according to a predetermined encryption protocol or agreement between a user 102 and a requestor, for example, comprising a data consumer 106, and/or via one or more devices or systems acting on their behalf, in further non-limiting aspects.

In further non-limiting examples, at 912, exemplary processes 900 can comprise addending any supplemental information (SI) to personal information (PI) to be stored in the block of the block chain stored in DFS, prior to encrypting the personal information (PI) and the supplemental information (SI) at 914, and prior to storing the encrypted personal information (PI) and the supplemental information (SI) in DFS at 916.

Further non-limiting examples of exemplary processes 900 can comprise, at 918, creating a URI or link to the encrypted personal information (PI) and the supplemental information (SI) stored in DFS. In a non-limiting aspect, creating a URI or link to the encrypted personal information (PI) and the supplemental information (SI) stored in DFS can comprise employing a hash (e.g., a cryptographic hash) of the encrypted personal information (PI) and the supplemental information (SI) stored in DFS as the URI or link. For instance, various embodiments described herein can employ exemplary hash functions that can be used to map data of arbitrary size (e.g., personal information (PI), supplemental information (SI), combinations thereof, etc.) to data of a fixed size, wherein values returned by an exemplary hash function can be referred to herein as hashes, such as cryptographic hashes, the employment of which, according to various the embodiments described herein, can facilitate assuring integrity of stored and/or transmitted data (e.g., personal information (PI), supplemental information (SI), combinations thereof, stored in DFS, etc.). Accordingly, in another non-limiting example, exemplary processes 900 can comprise, at 920, taking the hash (e.g., a cryptographic hash) of the encrypted personal information (PI) and the supplemental information (SI) stored in DFS and the URI or link, if any, and, at 922, storing the hash (e.g., a cryptographic hash) of the encrypted personal information (PI) and the supplemental information (SI) stored in DFS and the URI or link, if any, for further use, such as by transmitting or determining the hash (e.g., a cryptographic hash) of the encrypted personal information (PI) and the supplemental information (SI) stored in DFS and the URI or link, via off-page reference C, 706, in exemplary processes 700, for example.

As described above regarding FIGS. 6 and 8, for example, various embodiments as described herein can facilitate creation of user information or data (e.g., personal information (PI)) block chains. Accordingly, FIG. 10 illustrates an exemplary embodiment of a user information or data (e.g., personal information (PI)) block chain that can be stored in DFS according to various non-limiting embodiments. As further described herein, FIG. 10 can comprise a last or last subsequent block 1002 (e.g., PI BLOCK(n)[PII+OPI+SI]), and immediately prior subsequent block 1004 (e.g., PI BLOCK(n−1)[PII+OPI+SI]), and a root block 1006 (e.g., PI BLOCK(0)[PII+OPI+SI]). According to various non-limiting embodiments, an exemplary block chain of personal information (PI) stored in DFS can comprise less than three blocks, as illustrated in FIG. 10. In further non-limiting embodiments, an exemplary block chain of personal information (PI) stored in DFS can also comprise more than three blocks, as illustrated in FIG. 10. In a further non-limiting aspect, while FIG. 10 depicts last or last subsequent block 1002, immediately prior subsequent block 1004, and root block 1006 with personal identification information (PII), as further described herein, in the headings and the body of the blocks of the exemplary block diagram, this should be understood to illustrate the capability to store personal identification information (PII) in last or last subsequent block 1002, immediately prior subsequent block 1004, and root block 1006, and not as a requirement that each of last or last subsequent block 1002, immediately prior subsequent block 1004, and root block 1006, store such personal identification information (PII), as further described herein. Thus, the exemplary block diagram of FIG. 10 should be understood such that each of each of last or last subsequent block 1002, immediately prior subsequent block 1004, and root block 1006 can facilitate storage of some, none, all, whether determining whether the personal information (PI) is personal identification information (PII), as further described herein, in combination with personal information (PI) in other blocks, or otherwise.

Thus, FIG. 10 depicts the capability of blocks of personal information (PI), according to various non-limiting aspects as described herein, to store one or more of personal identification information (PII), a timestamp, one or more categories of use of the personal information (PI) comprised in or associated with the one or more blocks, other personal information (OPI), supplemental information (SI), other authorization information {OAI}, and so on, without limitation, for example, as further described herein, regarding FIG. 1-9. FIG. 10, further depicts the capability of blocks of personal information (PI), according to further non-limiting aspects as described herein, to store other information, for example, not described by the above categories of information. As a non-limiting example, other information can comprise or be associated with and/or facilitate further uses or restrictions associated with the one or more blocks and/or block chains of personal information (PI) stored in DFS, as further described herein. As a further non-limiting example, other information can comprise a limitation on acceptance of an offer, counter offer, terms, and so on, without limitation, for example, as further described herein, regarding FIGS. 15-19.

FIG. 10 further depicts the ability to facilitate creation of block chains of PI stored in DFS, wherein exemplary last or last subsequent block 1002 (e.g., PI BLOCK(n)[PII+OPI+SI]) stores a HASH of PI BLOCK (n−1), to facilitate verifying the integrity of the data stored in immediately prior subsequent block 1004 (e.g., PI BLOCK(n−1)[PII+OPI+SI]) and/or the URI/LINK of PI BLOCK (n−1), to locate such immediately prior subsequent block 1004 (e.g., PI BLOCK (n−1)[PII+OPI+SI]) in DFS. It can be understood that the block chain can be located by similar mechanism (e.g., locate, decrypt, retrieve URI and HASH of prior block, etc.) through to root block 1006 (e.g., PI BLOCK(0)[PII+OPI+SI]), according to the various non-limiting aspects described herein regarding FIGS. 6-9, etc.

FIG. 11 provides a non-limiting block diagram 1100 illustrating an exemplary request and response interaction, for example, between a user (e.g., a user 102) and a requestor (e.g., a data consumer 106), as further described herein. As can be understood, such requests and responses, as further described herein can be made by one or more devices or systems acting respectively on behalf of user 102 and data consumer 106, for example, as further described herein regarding FIGS. 15 to 20. As further described above regarding FIG. 6, to authorize access to one or more PI block chains based on a desired category of use (CI) at 610, exemplary processes 600 can comprise, at 612, receiving, via the device (e.g., device or system 2000, 2200, 2300, portions thereof, etc.), the request for authorization, as further described herein, regarding FIGS. 5 and 11-12, which can comprise a request for personal information (PI), one or more categories of use (CI) of the requested PI, and/or information from which it can be determined or resolved the one or more categories of use (CI) of the requested PI. Accordingly, as further described herein, a requestor (e.g., a data consumer 106) and/or one or more devices or systems acting on the requestor's behalf can send a request to authorize access to one or more personal information (PI) block chains stored in DFS, based on a desired category of use, at 1102, as depicted in FIG. 11. As a non-limiting example, a lender (or one or more devices or systems acting respectively on behalf of the lender) could send a request to authorize access to one or more personal information (PI) block chains stored in DFS, based on a prospective offer for financing, etc.

FIG. 11 further depicts an exemplary request 1104, according to various non-limiting aspects. As described above regarding FIG. 10, FIG. 11 depicts the capability of exemplary requests, such as depicted with respect to exemplary request 1104, according to various non-limiting aspects as described herein, to comprise or be associated with one or more of one or more desired categories of use (CI) of requested personal information (PI), and/or information resolvable to one or more desired categories of use (CI) of requested personal information (PI). As a non-limiting example, as further described herein, regarding FIGS. 2-5 and 20, for example, various disclosed embodiments can adhere to a predefined or predetermined taxonomy of categories of use (CI) of PI for the purposes of storing and accessing blocks and block chains of personal information (PI) stored in DFS. Accordingly, as depicted in FIG. 11, exemplary request 1104 can comprise or be associated with one or more categories of use (CI), according to the predefined or predetermined taxonomy of categories of use (CI) of personal information (PI). In a further non-limiting example, exemplary request 1104 can comprise or be associated with information resolvable to one or more categories of use (CI), according to the predefined or predetermined taxonomy of categories of use (CI) of personal information (PI).

As a non-limiting example, a first exemplary request 1104 might comprise or be associated with information such as one or more of the words "financing," "auto," "rates," "APR," etc., which can be resolvable to one or more categories of use (CI), such as, but not limited to, financing, auto financing, an offer of sale, etc. In another non-limiting example, a second exemplary request 1104 might comprise or be associated with information such as one or more of the words "hiring," "benefits," "skills," "experience," etc., which can be resolvable to one or more categories of use (CI), such as, but not limited to, hiring, invitations to apply to jobs, job offers, etc.

As described above regarding FIG. 10, FIG. 11 depicts the capability of exemplary requests, such as depicted with respect to exemplary request 1104, according to various non-limiting aspects as described herein, to comprise or be associated with further information such as encryption/decryption keys, timestamp, offer terms, digital signatures, data used terms, other information, and so on, without limitation. However, as further described, regarding FIG. 10, listing of such capability should not be construed as requirements and every request according to various non-limiting embodiments described herein. For instance, not every request such as exemplary request 1104 would comprise or be associated with an offer, which would include offer terms, would require encrypted responses, and so on. As further depicted in FIG. 11, exemplary request 1104 can comprise or be associated with particularly identifiable personal information (PI), whether comprised in exemplary request 1104, or ancillary thereto.

In addition, as further described above regarding FIG. 7, exemplary processes 700 can comprise, at 712, sending encrypted response to requestor, which is depicted in FIG. 11, via off-page reference, E, 1106. As further described herein, FIG. 11 depicts receiving encrypted response from an access authority (e.g., user 102, one or more devices or systems operating on behalf of user 102, such as an appropriately configured app on a device associated with user 102, in communication with a device or system 2000, 2200, 2300, portions thereof, etc.) via off-page reference F, 1108, at 1110.

For example, FIG. 12 depicts an exemplary response 1202 (e.g., an authorization) granted by access authority (e.g., user 102, one or more devices or systems operating on behalf of user 102, such as an appropriately configured app on a device associated with user 102, in communication with a device or system 2000, 2200, 2300, portions thereof, etc.). For example, as further described above regarding exemplary processes 700 of FIG. 7, exemplary processes 700 can comprise, at 710, encrypting a hash (e.g., a cryptographic hash, etc.) of the last subsequent block 1002 of personal information (PI) (e.g., PI BLOCK (n)[PII+OPI+SI]) and a link or URI returned (e.g., as a result of storage in the DFS), as determined at 704, for example. Thus, the exemplary response 1202, properly authorized and granted, can direct the requestor to the last subsequent block 1002 of personal information (PI) (e.g., PI BLOCK (n)[PII+OPI+SI]) via the link or URI returned (e.g., as a result of storage in the DFS). As a non-limiting example, exemplary response 1202 can be encrypted with the requestor's public key, with the sender's private key, and/or using another agreed-upon encryption protocol, without limitation.

In a further non-limiting aspect, exemplary response 1202 can further comprise the identity of a verifying entity 110 and/or a verifying entity 110 digital signature, that can facilitate certifying the validity of the personal information (PI) associated with one or more blocks of one or more block chains of personal information (PI) stored in DFS, or portions thereof (e.g., last subsequent block 1002 of personal information (PI) (e.g., PI BLOCK (n)[PII+OPI+SI])), for example, as further described above, regarding supplemental information (SI) in last subsequent block 1002 of personal information (PI) (e.g., PI BLOCK (n)[PII+OPI+SI]) and FIG. 10. As non-limiting examples, various embodiments as described herein can comprise various portions of supplemental information (SI) (e.g., in exemplary response 1202, which can direct requestor to last subsequent block 1002 of personal information (PI) (e.g., PI BLOCK (n)[PII+OPI+SI]) comprising other authorization information (OAI), as described above, a hash (e.g., a cryptographic hash) of the last subsequent block 1002 of personal information (PI) (e.g., PI BLOCK (n)[PII+OPI+SI]) stored in DFS (e.g., HASH OF PI BLOCK (n)[PII+OPI+SI]), a URI or link of the last subsequent block 1002 of personal information (PI)(e.g., URI/LINK OF PI BLOCK (n)[PII+OPI+SI]), a verifying entity associated with personal information (PI) in or associated with the block (e.g., VERIFYING ENTITY), a verifying entity digital signature associated with personal information (PI) in or associated with the block (e.g., VERIFYING ENTITY DIGITAL SIGNATURE), encryption/decryption keys, if any, to facilitate decryption of personal information (PI) stored in one or more blocks of the one or more block chains of personal information (PI) stored in DFS (e.g., ENCRYPTION/DECRYPTION KEY(S)), and so on, without limitation, for example, as further described herein, regarding FIGS. 9-10. As a further non-limiting example, supplemental information (SI) comprising one or more encryption/decryption keys, if any, to facilitate decryption of personal information (PI) stored in one or more blocks of the one or more block chains of personal information (PI) stored in DFS (e.g., ENCRYPTION/DECRYPTION KEY(S)) can be employed to facilitate decrypting one or more blocks of personal information (PI) stored in DFS, according to a predetermined encryption protocol or agreement between a user 102 and a requestor, for example, comprising a data consumer 106, and/or via one or more devices or systems acting on their behalf, in further non-limiting aspects.

Figure 13:
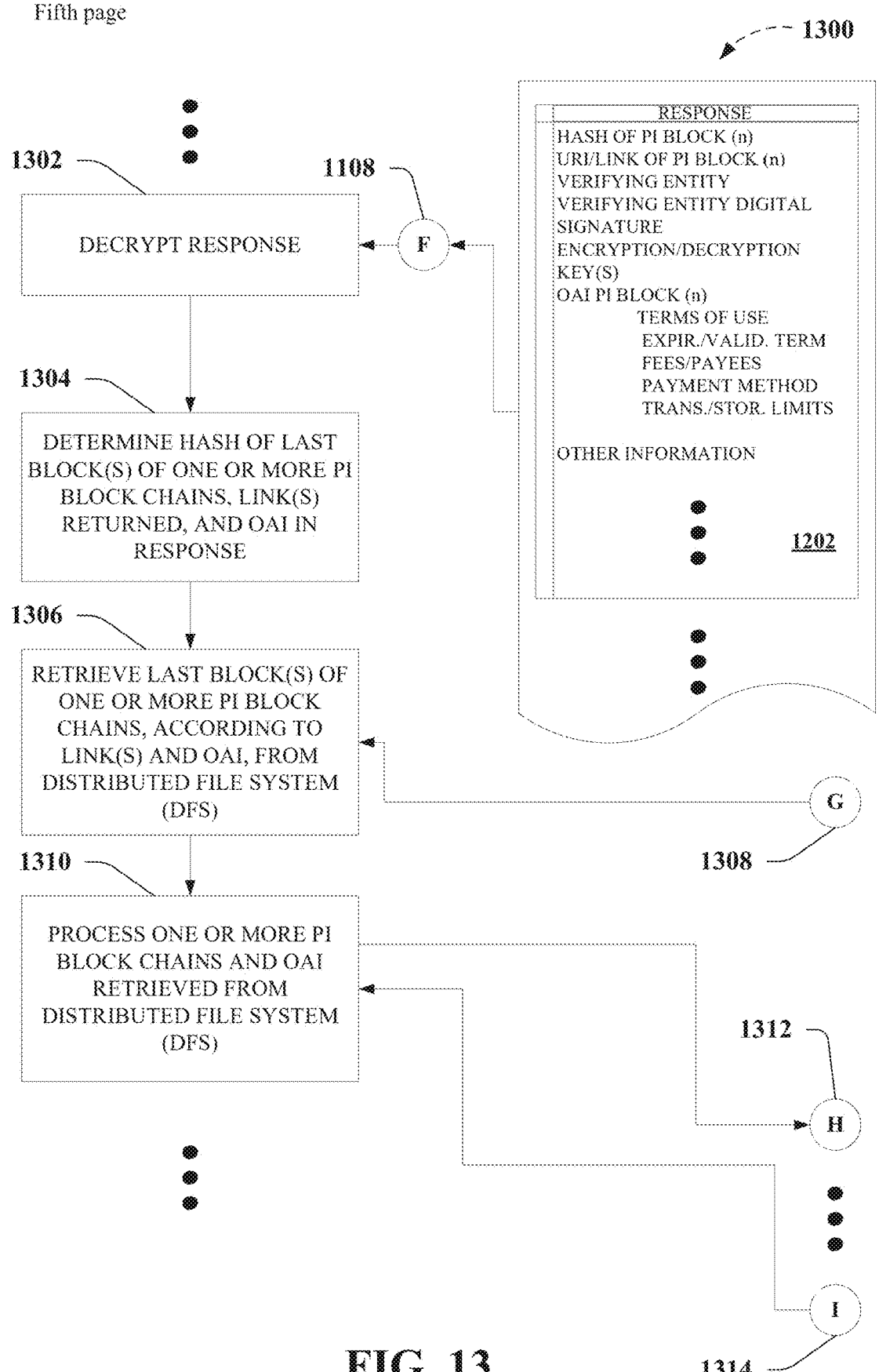

For instance, FIG. 13 depicts a flow diagram of non-limiting aspects of exemplary processes 1300 for decryption and processing of one or more user information or data block chains, according non-limiting aspects of embodiments of the disclosed subject matter. Having received exemplary response 1202, via off-page reference F, 1108, exemplary processes 1300 can comprise decrypting exemplary response 1202, if necessary at 1302. As described above, exemplary response 1202 can be encrypted with the requestor's public key, with the sender's private key, and/or using another agreed-upon encryption protocol, without limitation, in various non-limiting aspects. Having thus decrypted exemplary response 1202, exemplary processes 1300 can comprise determining one or more hashes (e.g., cryptographic hashes) of one or more last or last subsequent blocks 1002 of one or more personal information (PI) block chains stored in DFS, the associated URI's or links thereto, and other authorization information (OAI), if any, in exemplary response 1202.

In a further non-limiting aspect, exemplary processes 1300 can further comprise, at 1306, retrieving one or more last or last subsequent blocks 1002 of one or more personal information (PI) block chains, via or according to the associated URI's or links thereto, and/or according to other authorization information (OAI), if any, in exemplary response 1202, from DFS as indicated via off-page reference G, 1308. Accordingly, in still another non-limiting aspect, exemplary processes 1300 can further comprise, at 1310, processing one or more personal information (PI) block chains and other authorization information (OAI), if any, retrieved from DFS as indicated via off-page reference H, 1312 and off-page reference I, 1314.

Figure 14:
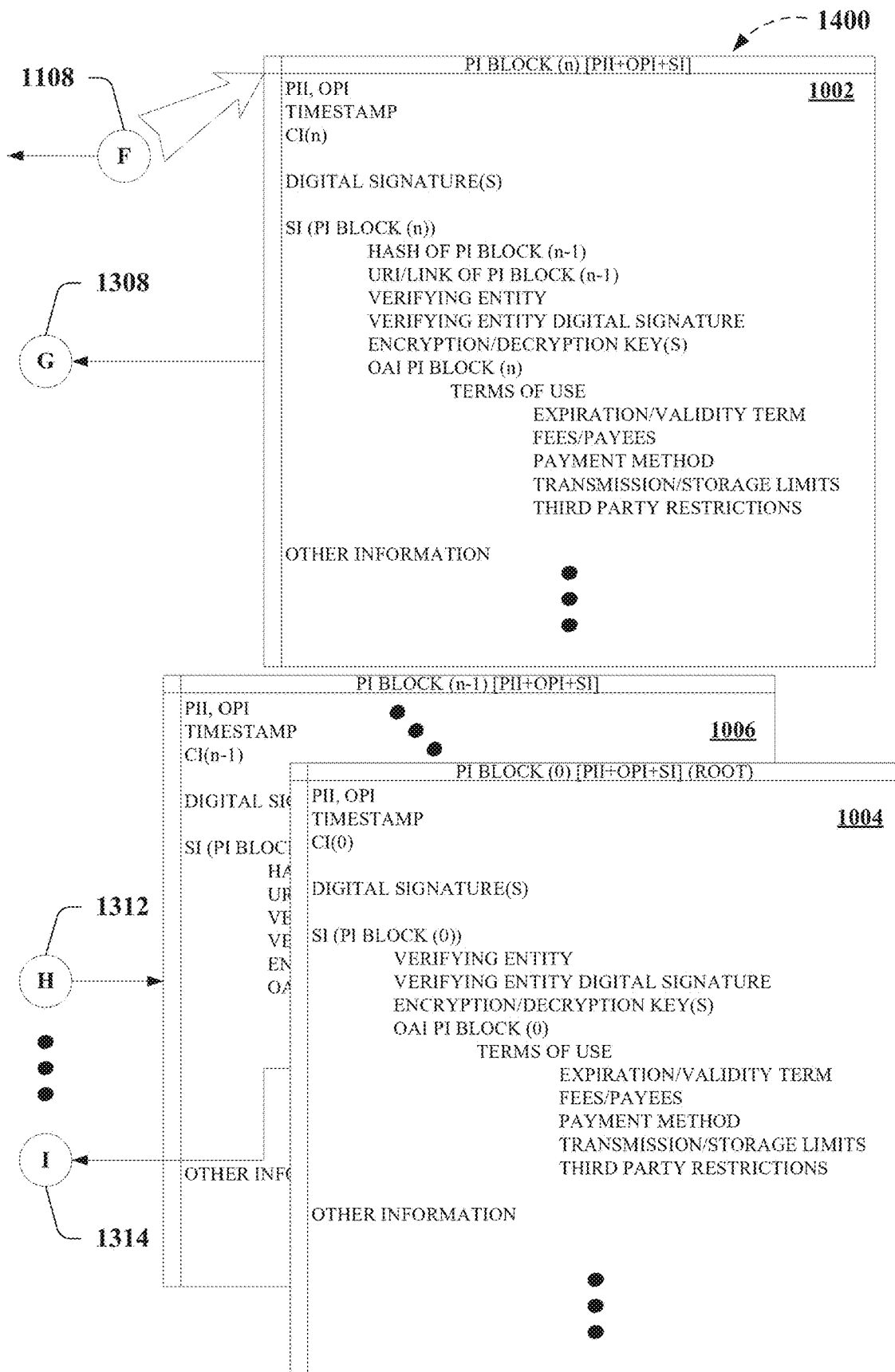

For instance, FIG. 14 illustrates exemplary processes 1400 for iteratively processing exemplary response 1202 and one or more personal information (PI) block chains stored in DFS, according to various non-limiting aspects. For instance, FIG. 14 depicts off-page reference F, 1108, associated with exemplary response 1202, which facilitates directing requestor to last or last subsequent block 1002 of personal information (PI)(e.g., URI/LINK OF PI BLOCK (n)[PII+OPI+SI]), which is processed, according to off-page reference G, 1308, as described above regarding FIG. 13. In addition, FIG. 14 depicts off-page reference H, 1312, which represents retrieving immediately prior subsequent block 1004 (e.g., PI BLOCK(n−1)[PII+OPI+SI]), after retrieving, and decrypting, if any, last or last subsequent block 1002 of personal information (PI)(e.g., URI/LINK OF PI BLOCK (n)[PII+OPI+SI]), iteratively through to root block 1006 (e.g., PI BLOCK(0)[PII+OPI+SI]), and off-page reference I, 1314.

Accordingly, FIGS. 13-14 illustrate an exemplary iterative process for processing one or more personal information (PI) block chains stored in DFS, which can be generally characterized as a process of, receiving and decrypting, if any, exemplary response 1202, locating, retrieving, and decrypting, if any, last or last subsequent block 1002 of personal information (PI)(e.g., URI/LINK OF PI BLOCK (n)[PII+OPI+SI]), locating, retrieving, and decrypting, if any, immediately prior subsequent block 1004 (e.g., PI BLOCK(n−1)[PII+OPI+SI]), and so on, until locating, retrieving, and decrypting, if any, root block 1006 (e.g., PI BLOCK(0)[PII+OPI+SI]), according to various non-limiting aspects, as described herein, regarding FIGS. 1-12.

Figure 15:
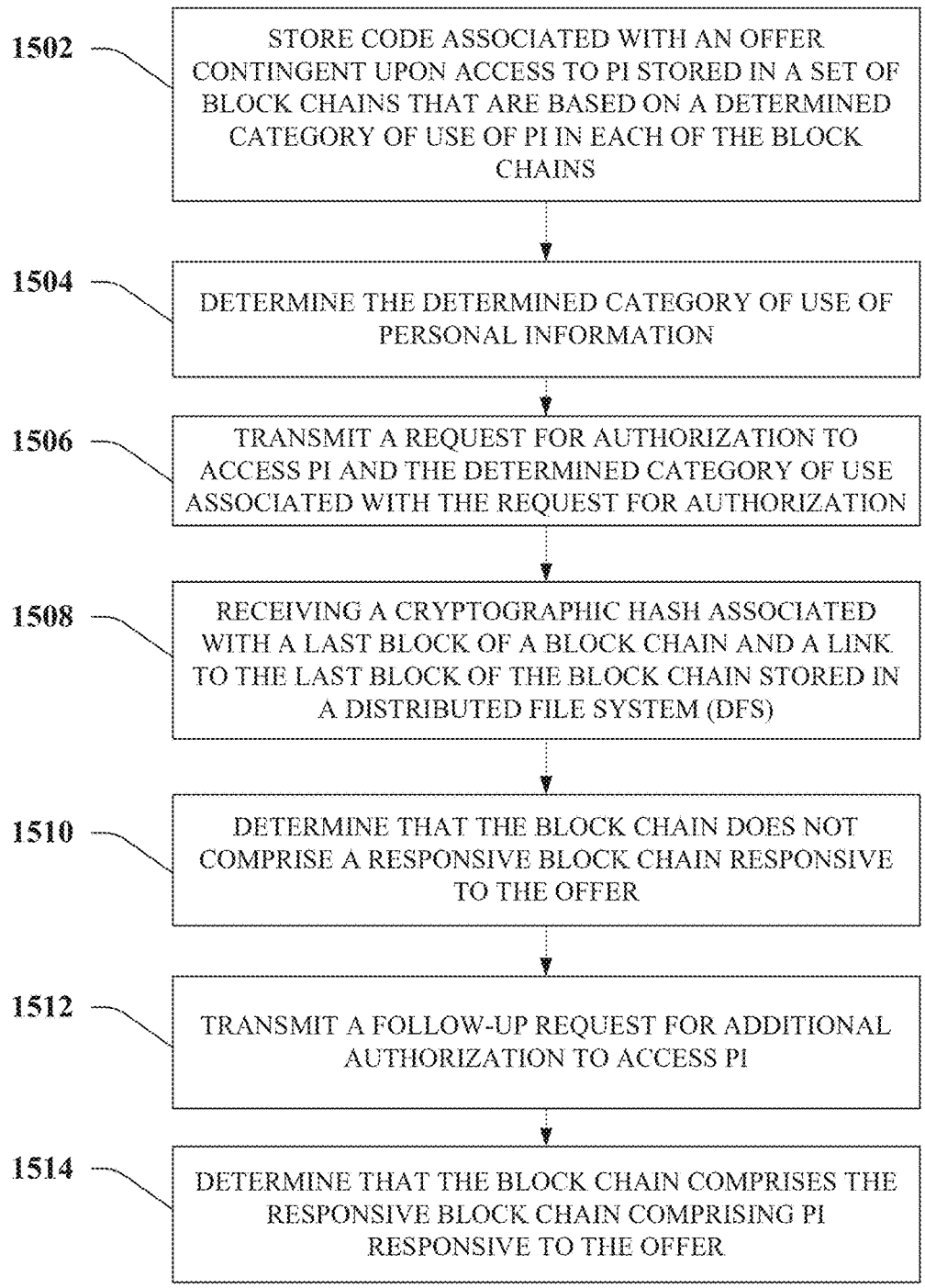
FIG. 15 illustrates an exemplary flow diagram of methods directed to a use of user information or data block chains according non-limiting aspects of embodiments of the disclosed subject matter.

In a further non-limiting implementation, FIG. 15 illustrates an exemplary flow diagram of methods 1500 directed to a use of user information or data block chains according non-limiting aspects of embodiments of the disclosed subject matter.

As a non-limiting example, exemplary methods 1500 can comprise, at 1502, storing, by a device comprising a processor (e.g., device or system 2000, 2200, 2300, portions thereof, etc.), machine-executable code associated with an offer, wherein the offer is contingent upon access to personal information stored in a set of a plurality of block chains, wherein the plurality of block chains are based on a determined category of use of personal information in each of the plurality of block chains, as further described herein, regarding FIGS. 6-14, 15-19, and 20-26, for example.

In another non-limiting example, exemplary methods 1500 can comprise, at 1504, determining, by the device (e.g., device or system 2000, 2200, 2300, portions thereof, etc.), the determined category of use of personal information, as further described herein, regarding FIGS. 6-14, 15-19, and 20-26, for example.

In a further non-limiting example, exemplary methods 1500 can comprise, at 1506, transmitting a request for authorization to access personal information and the determined category of use associated with the request for authorization, as further described herein, regarding FIGS. 6-14, 15-19, and 20-26, for example.

According to yet another non-limiting example, exemplary methods 1500 can comprise, at 1508, receiving, via the device (e.g., device or system 2000, 2200, 2300, portions thereof, etc.), one or more cryptographic hash associated with a last block of one or more block chain(s) and a link to the last block of the one or more block chain(s) stored in a distributed file system (DFS), as further described herein, regarding FIGS. 6-14, 15-19, and 20-26, for example. According to a non-limiting aspect, exemplary methods 1500 can comprise receiving, via the device (e.g., device or system 2000, 2200, 2300, portions thereof, etc.), an encrypted response and decrypting, via the device (e.g., device or system 2000, 2200, 2300, portions thereof, etc.), the encrypted response comprising the last block of one or more block chain(s) and the link to the last block of the one or more block chain(s) stored in a distributed file system.

In another non-limiting example, exemplary methods 1500 can comprise, at 1510, determining, by the device (e.g., device or system 2000, 2200, 2300, portions thereof, etc.), that the one or more block chain(s) does not comprise one or more responsive block chain responsive to the offer, as further described herein, regarding FIGS. 6-14, 15-19, and 20-26, for example.

In still another non-limiting example, exemplary methods 1500 can comprise, at 1512, transmitting, by the device (e.g., device or system 2000, 2200, 2300, portions thereof, etc.), a follow-up request for additional authorization to access personal information, as further described herein, regarding FIGS. 6-14, 15-19, and 20-26, for example.

According to another non-limiting example, exemplary methods 1500 can comprise, at 1514, determining, by the device (e.g., device or system 2000, 2200, 2300, portions thereof, etc.), that the one or more block chain(s) comprises the one or more responsive block chain comprising personal information responsive to the offer, as further described herein, regarding FIGS. 6-14, 15-19, and 20-26, for example.

Figure 16:
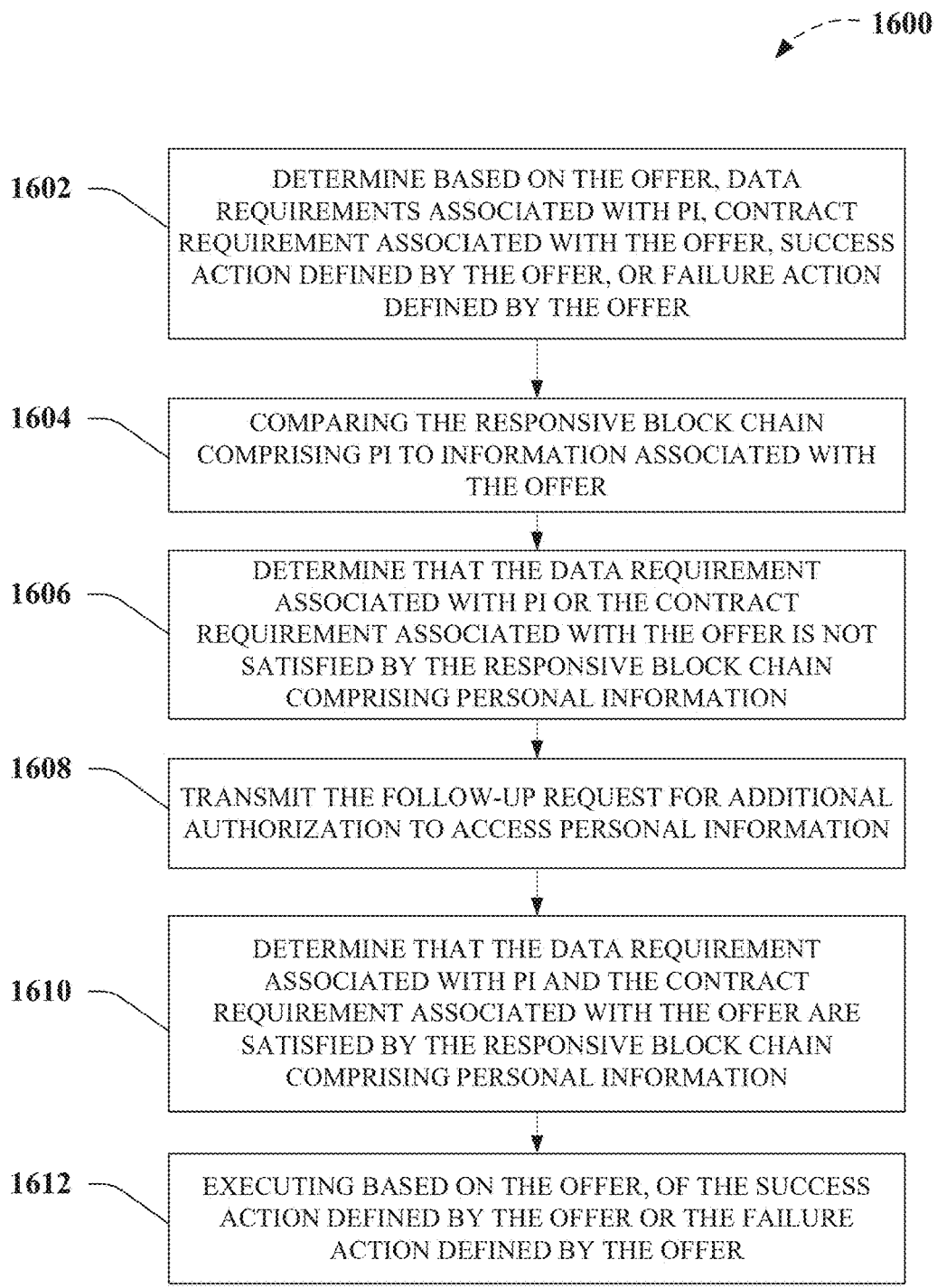
FIG. 16 illustrates another flow diagram of further non-limiting aspects of exemplary methods for using user information or data block chains according non-limiting aspects of embodiments as disclosed herein.

FIG. 16 illustrates another flow diagram of further non-limiting aspects of exemplary methods 1600 for using user information or data block chains according non-limiting aspects of embodiments as disclosed herein.

As a non-limiting example, exemplary methods 1600 can comprise, at 1602, determining, by the device (e.g., device or system 2000, 2200, 2300, portions thereof, etc.), based on the offer, a plurality of one or more data requirements associated with personal information, one or more contract requirement associated with the offer, one or more success action defined by the offer, or one or more failure action defined by the offer, as further described herein, regarding FIGS. 5-15, 17-19, and 20-26, for example. Such requirements may include data requirements that limit the provision of personal information in connection with the offer, but may permit the provision of alternative data based upon such personal information in a manner that permits the contracting parties to determine compliance with a contract provision without accessing the personal information. This may be provided through a score, authorization, verification, or other method that may be generated independently by a self-executing contract or may be generated by a mutually trusted third party. For example, a social security number may be provided to a mutually trusted third party who returns an indication of compliance with a contract requirement without the need for the sharing of the social security number between the contracting parties.

In a further non-limiting example, exemplary methods 1600 can comprise, at 1604, comparing, by the device (e.g., device or system 2000, 2200, 2300, portions thereof, etc.), the one or more responsive block chain comprising personal information to information associated with the offer, as further described herein, regarding FIGS. 5-15, 17-19, and 20-26, for example.

In yet another non-limiting example, exemplary methods 1600 can comprise, at 1606, determining, by the device (e.g., device or system 2000, 2200, 2300, portions thereof, etc.), that one or more of the one or more data requirement associated with personal information or the one or more contract requirement associated with the offer is not satisfied by the one or more responsive block chain comprising personal information, as further described herein, regarding FIGS. 5-15, 17-19, and 20-26, for example.

According to a further non-limiting example, exemplary methods 1600 can comprise, at 1608, transmitting, via the device (e.g., device or system 2000, 2200, 2300, portions thereof, etc.), the follow-up request for additional authorization to access personal information, as further described herein, regarding FIGS. 5-15, 17-19, and 20-26, for example.

In a further non-limiting example, exemplary methods 1600 can comprise, at 1610, determining, by the device (e.g., device or system 2000, 2200, 2300, portions thereof, etc.), that the one or more data requirement associated with personal information and the one or more contract requirement associated with the offer are satisfied by the one or more responsive block chain comprising personal information, as further described herein, regarding FIGS. 5-15, 17-19, and 20-26, for example. In a non-limiting aspect of exemplary methods 1600, the determining that the one or more data requirement associated with personal information is satisfied can comprise determining, via the device (e.g., device or system 2000, 2200, 2300, portions thereof, etc.), one or more of personal information comprising personal identification information or other personal information satisfies the one or more data requirement associated with personal information, wherein the personal identification information is defined as information or combinations of information that resolve to a unique user, meeting or exceeding a predetermined threshold confidence level, and wherein the other personal information is defined as other information or combinations of other information that does not resolve to the unique user, by failing to meet or exceed the predetermined threshold confidence level, and wherein the one or more block chain(s) is based on at least the personal identification information.

As a further non-limiting example, exemplary methods 1600 can comprise, at 1612, executing, by the device (e.g., device or system 2000, 2200, 2300, portions thereof, etc.), based on the offer, one or more of the one or more success action defined by the offer or the one or more failure action defined by the offer, as further described herein, regarding FIGS. 5-15, 17-19, and 20-26, for example.

In still further non-limiting examples, exemplary methods as described herein can comprise one or more of retrieving, by the device (e.g., device or system 2000, 2200, 2300, portions thereof, etc.), the last block of the one or more block chain(s) via link to the last block of the one or more block chain(s) stored in the DFS, determining, by the device (e.g., device or system 2000, 2200, 2300, portions thereof, etc.), other authorization information associated with the one or more block chain(s), and/or processing, by the device (e.g., device or system 2000, 2200, 2300, portions thereof, etc.), the one or more block chain(s) to determine personal information. In a non-limiting aspect of exemplary methods as described herein, the processing the one or more block chain(s) to determine personal information can comprise determining, via the device (e.g., device or system 2000, 2200, 2300, portions thereof, etc.), a plurality of a cryptographic hash of a prior block of personal information associated with the one or more block chain(s), a link to the prior block of personal information associated with the one or more block chain(s) stored in the DFS, a verifying entity associated with the personal information, a digital signature associated with the verifying entity, or information associated with an encryption key or decryption key.

In still further non-limiting aspects of exemplary methods as described herein, can further comprise the determining, by the device (e.g., device or system 2000, 2200, 2300, portions thereof, etc.), that one or more limitation associated with the other authorization information specified in the one or more block chain(s) is satisfied. In a non-limiting aspect of exemplary methods as described herein, the determining that the one or more limitation associated with the other authorization information specified is satisfied can comprise executing, by the device (e.g., device or system 2000, 2200, 2300, portions thereof, etc.), machine-executable code associated with the offer and defined by the one or more limitation associated with the other authorization information comprising one or more term of use associated with the personal information, including one or more of an expiration term for one or more of the authorization or the personal information, a validity term associated with the personal information, one or more of a payee or a requested fee associated with the one or more of the authorization or the personal information, one or more of a transmission limit or a storage limit associated with the one or more of the authorization or the personal information, or a restriction associated with the one or more of the authorization or the personal information on a third party.

Figure 17:
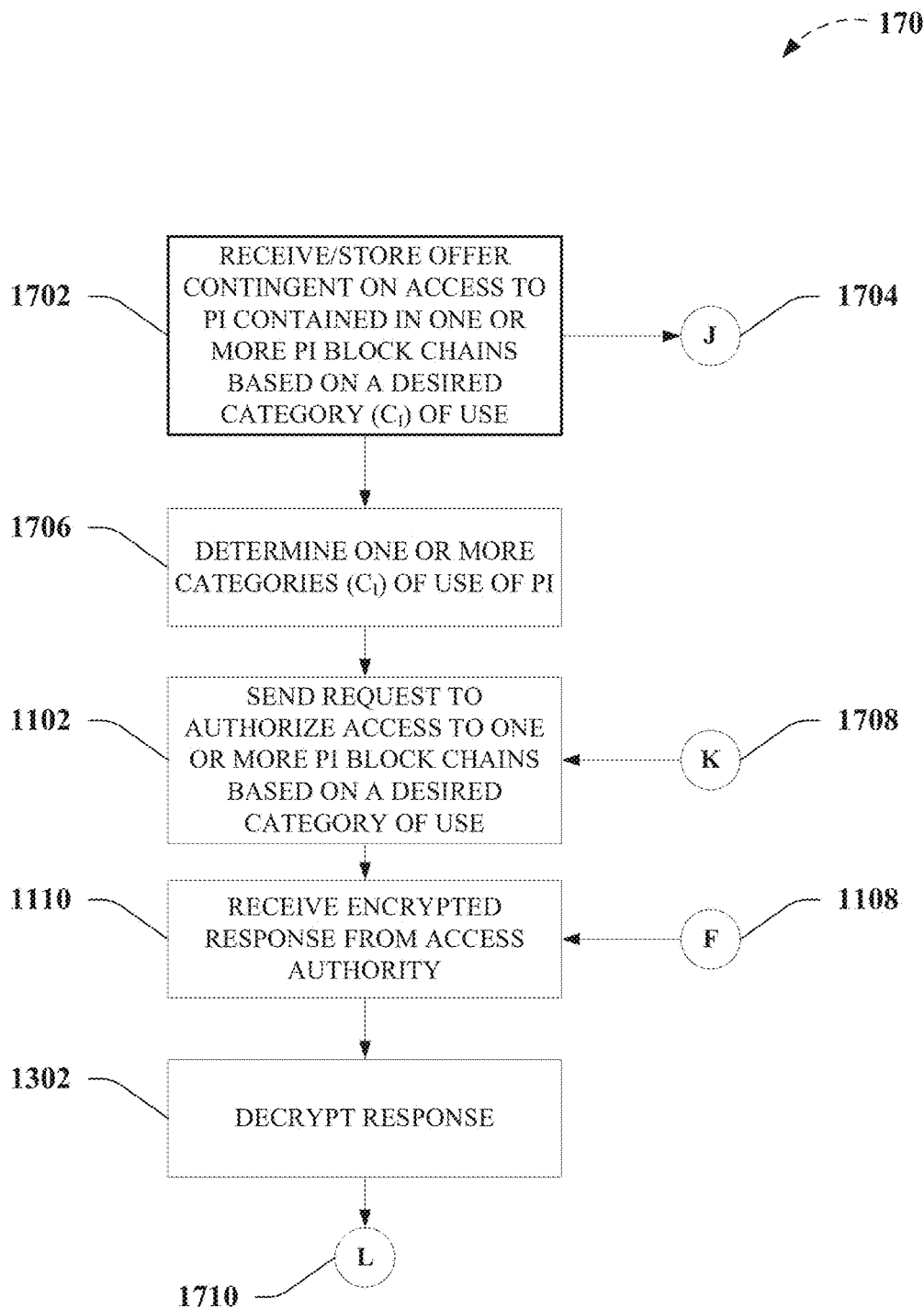
FIGS. 17-19 illustrates flow diagrams of non-limiting aspects of exemplary processes for use of user data block chains according non-limiting aspects of embodiments of the disclosed subject matter.
Figure 18:
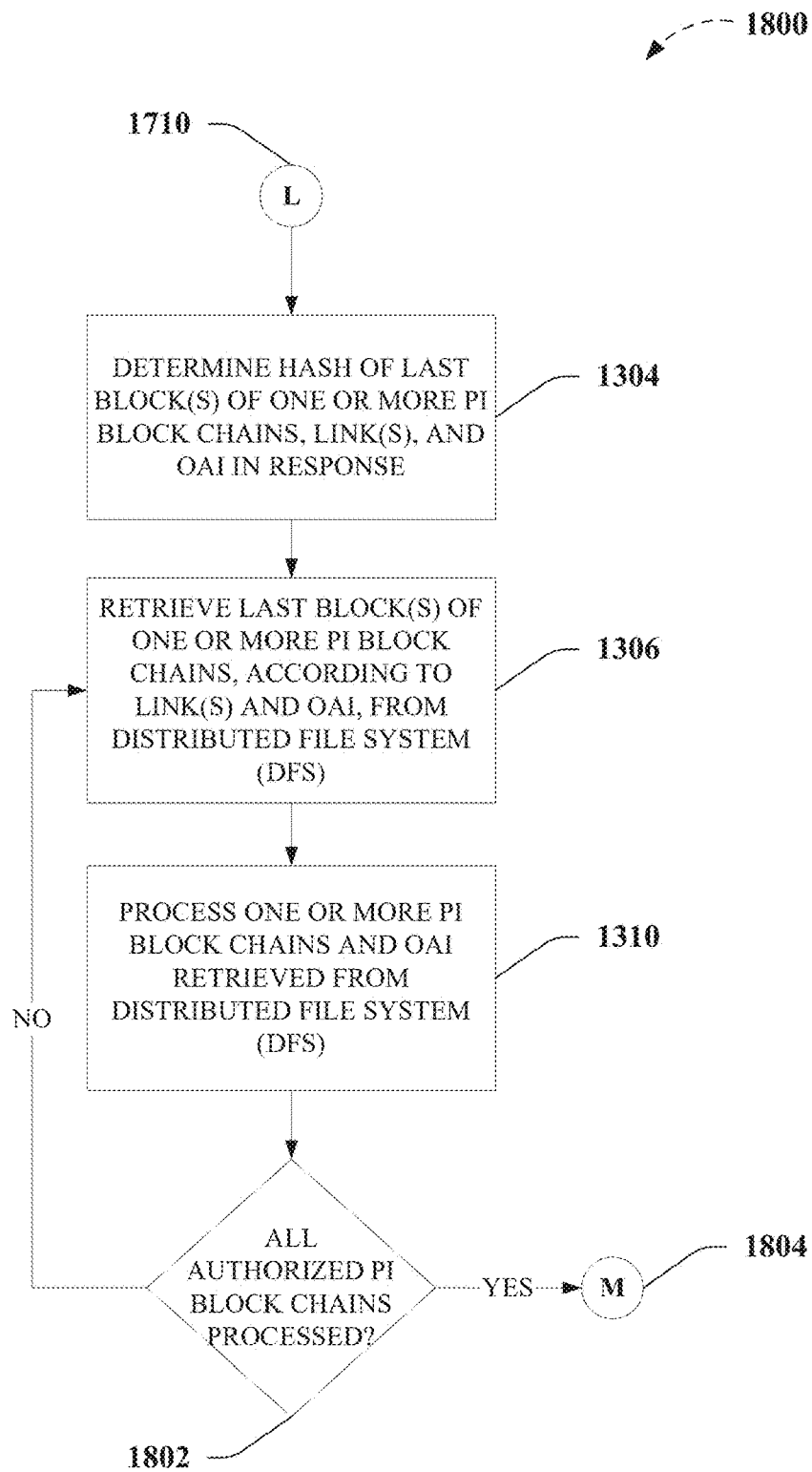
Figure 19:
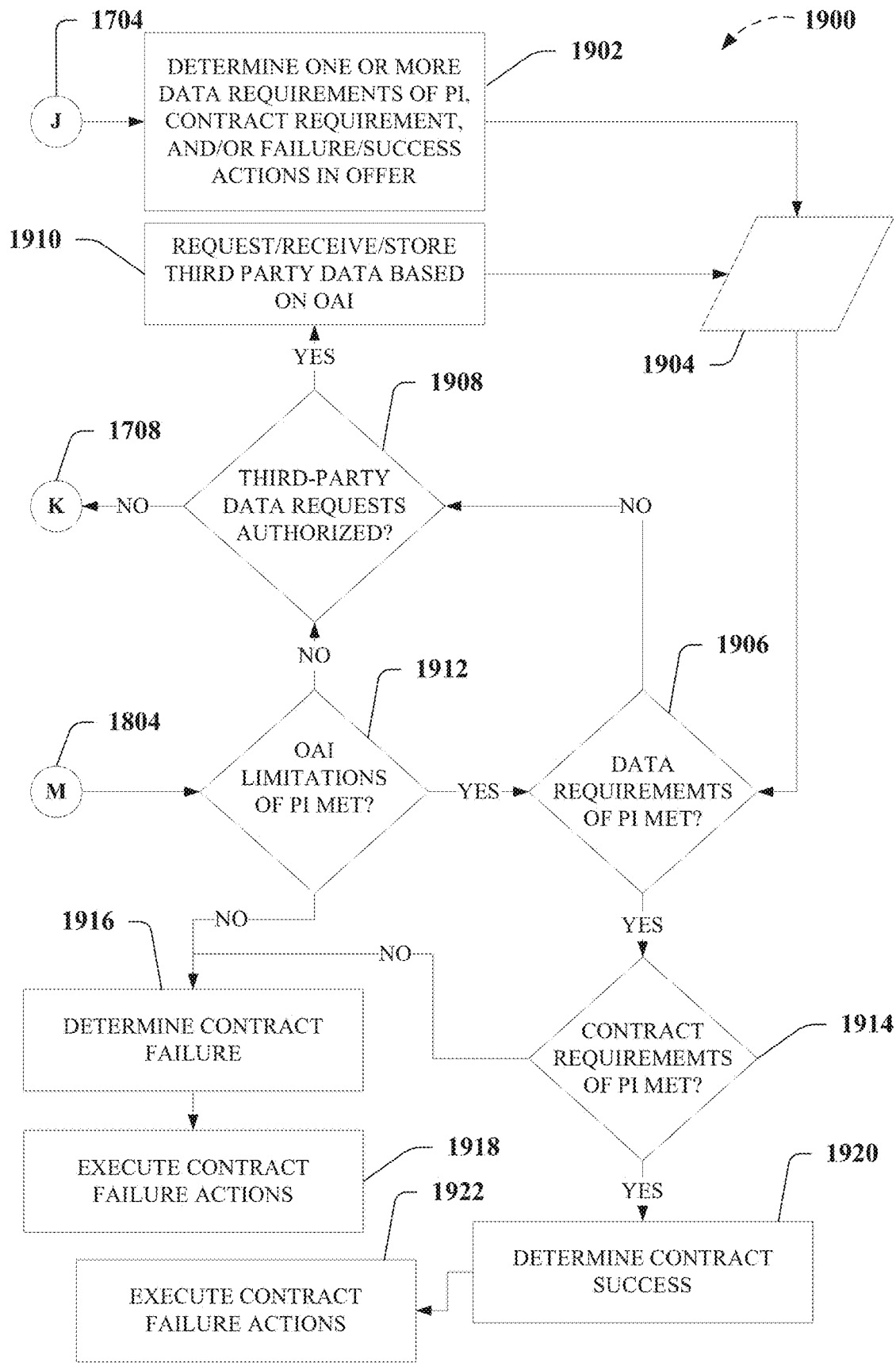

As further described herein, various operations and/or processes can be undertaken by one or more devices or systems on behalf of, for example, one or more user 102, one or more data consumer 106 (e.g., a requestor), one or more verifying entities 110, and so on, without limitation. As non-limiting examples, FIGS. 17-19 illustrate flow diagram of non-limiting aspects of exemplary processes for use of user data block chains according non-limiting aspects of embodiments of the disclosed subject matter. As described above regarding FIGS. 15-16, for instance, various operations and/or processes as described regarding FIGS. 17-19 via one or more devices or systems (e.g., device or system 2000, 2200, 2300, portions thereof, etc.), on behalf of one or more user 102, one or more data consumer 106 (e.g., a requestor), one or more verifying entities 110, and so on. Moreover, many operations and/or processes of FIGS. 17-19 have been described above, and thus, where operations have been described above, the operations and/or processes of FIGS. 17-19 can be described by reference to prior descriptions.

For instance, FIG. 17 depicts exemplary processes 1700 which can comprise, at 1702, storing, by a device comprising a processor (e.g., device or system 2000, 2200, 2300, portions thereof, etc.), machine-executable code associated with an offer, wherein the offer is contingent upon access to personal information stored in a set of a plurality of block chains, wherein the plurality of block chains are based on a determined category of use of personal information in each of the plurality of block chains, as further described herein, regarding FIGS. 11, 13, and 15-16, for example. Thus, at 1702, exemplary processes 1700 can comprise receiving and/or storing an offer (e.g., via device or system 2000, 2200, 2300, portions thereof, etc.), which is contingent on access to personal information contained in one or more personal information (PI) block chains (e.g., stored in DFS), wherein the one or more personal information (PI) block chains in DFS base on one or more categories of use (CI). According to further non-limiting aspects, the offer can be further processed via off-page reference J, 1704, as further described, regarding FIG. 19.

After an offer contingent on access to personal information (PI) contained in one or more personal information (PI) block chains stored in DFS based on one or more desired categories of use (CI) are received and/or stored at 1702, exemplary processes 1700 can comprise, at 1704, determining, by the device (e.g., device or system 2000, 2200, 2300, portions thereof, etc.), the determined category of use of personal information (PI), as further described herein, regarding FIGS. 6, 8, 11, 15, etc., for example. In a non-limiting aspect, a determined category of use of personal information (PI) can be explicitly stated or based on information resolvable to category of use of personal information (PI), for example, as described above regarding exemplary request 1104. In further non-limiting aspects, exemplary processes 1700 can comprise sending a request to authorize access to one or more personal information (PI) block chain based on one or more desired categories of use (CI), for example, such as described above regarding exemplary processes 1100, at 1102, which may also proceed from off-page reference K, 1708, of FIG. 19. In still further non-limiting aspects, exemplary processes 1700 can comprise receiving an encrypted response from an access authority, for example, such as described above regarding exemplary processes 1100, at 1110, which may also proceed from off-page reference F, 1108, of FIG. 11, and can further comprise decrypting the response (e.g., exemplary response 1202), for example, such as described above regarding exemplary processes 1302, at 1110, and can proceed via off-page reference L, 1710, of FIG. 18.

FIG. 18 depicts exemplary processes 1800, which, proceeding via off-page reference L, 1710, and having thus decrypted exemplary response 1202, exemplary processes 1800 can comprise, at 1304, determining one or more hashes (e.g., cryptographic hashes) of one or more last or last subsequent blocks 1002 of one or more personal information (PI) block chains stored in DFS, the associated URI's or links thereto, and other authorization information (OAI), if any, in exemplary response 1202, as further described above regarding FIG. 13.

In a further non-limiting aspect, exemplary processes 1800 can further comprise, at 1306, retrieving one or more last or last subsequent blocks 1002 of one or more personal information (PI) block chains, via or according to the associated URI's or links thereto, and/or according to other authorization information (OAI), if any, in exemplary response 1202, from DFS, as further described above regarding FIG. 13. Accordingly, in still another non-limiting aspect, exemplary processes 1800 can further comprise, at 1310, processing one or more personal information (PI) block chains and other authorization information (OAI), if any, retrieved from DFS, as further described above regarding FIG. 13.

In still another non-limiting aspect, exemplary processes 1800 can further comprise, at 1802, determining whether all authorized personal information (PI) block chains have been processed, received via off-page reference M, 1804, to FIG. 19, if all authorized personal information (PI) block chains have been processed, and proceeding back to exemplary processes 1800, at 1306, to retrieve further authorized personal information (PI) blocks and/or block chains (e.g., authorized blocks, block chains, side chains, etc.) from DFS, if not all authorized personal information (PI) block chains have been processed, at 1802.

FIG. 19 depicts exemplary processes 1900, which, proceeding via off-page reference J, 1704, and having received and/or stored offer (e.g., via device or system 2000, 2200, 2300, portions thereof, etc.), at 1702, can comprise, at 1902, determining, by the device (e.g., device or system 2000, 2200, 2300, portions thereof, etc.), based on the offer, a plurality of one or more data requirements associated with personal information, one or more contract requirement associated with the offer, one or more success action defined by the offer, or one or more failure action defined by the offer, as further described herein, regarding FIG. 16, for example, which can be stored (e.g., via device or system 2000, 2200, 2300, portions thereof, etc.), at 1904, for subsequent reference and/or use. For example, exemplary data requirements of personal information (PI) specified in the offer can typically comprise request for personal information, such as might appear in an application (e.g., name, address, date of birth, phone number, email address, account information, current employer, prior employer(s), username(s), password(s), etc.), for example, as further described above regarding FIGS. 3-4, without limitation. As a further non-limiting example, exemplary contract requirements associated with the offer can typically comprise if/then logic or requirements of the personal information pursuant to terms of a prospective contract (e.g., income level, account balance(s), employment eligibility data requirements, insurance requirements, etc.), that can be employed to facilitate determining whether the various portions of personal information (PI) comprised in the one or more personal information (PI) block chain stored in DFS, authorized and/or obtainable (e.g., via one or more third party data providers 104, e.g., via subsequent or follow-up exemplary requests 1104, etc.) meet the one or more exemplary contract requirements associated with the offer, without limitation.

In a further non-limiting aspect, the one or more success actions defined by the offer and the one or more failure action(s) defined by the offer, can comprise one or more actions to be taken (e.g., as defined in the offer, as defined in the supplemental information (SI), other authorization information (OAI), other information, etc.), in the event that is determined that the one or more data requirements associated with personal information and the one or more contract requirement associated with the offer are met, as further described herein, regarding FIG. 16, at 1610, for example. As a non-limiting example, upon meeting or not meeting the one or more data requirements associated with personal information and the one or more contract requirement associated with an offer for credit or financing, the one or more success actions defined by the offer and the one or more failure action(s) defined by the offer, as the case may be, can include extension of credit or financing, transmitting a conditional approval, etc., or a denial thereof, retention of personal information (PI) obtained in the described processes, or expungement thereof, and so on, respectively, without limitation. As a further non-limiting example, upon meeting or not meeting the one or more data requirements associated with personal information and the one or more contract requirement associated with an offer to apply to a prospective employer for employment, the one or more success actions defined by the offer and the one or more failure action(s) defined by the offer, as the case may be, can include transmitting an invitation for an interview, transmitting a request for further information, or transmitting a rejection letter, retention of personal information (PI) obtained in the described processes, or expungement thereof, and so on, respectively, without limitation.

Accordingly, exemplary processes 1900 can further comprise, at 1906, determining whether the one or more data requirements of personal information (PI) specified in the offer are met. If not, and if it is determined that third party data requests are authorized (e.g., via other authorization information OAI in an exemplary response 1202, and/or one or more personal information (PI) blocks stored in DFS, etc.), at 1908, exemplary processes 1900 can further comprise, at 1910, one or more of requesting, receiving, and/or storing (e.g., via device or system 2000, 2200, 2300, portions thereof, etc.) third party data (e.g., via one or more exemplary data provider(s) 104, etc.). If not, and if it is determined that third party data requests are not authorized (e.g., via other authorization information OAI in an exemplary response 1202, and/or one or more personal information (PI) blocks stored in DFS, etc.), at 1908, exemplary processes 1900 can further comprise sending a request to authorize access to one or more personal information (PI) block chain based on one or more desired categories of use (CI), for example, such as described above regarding exemplary processes 1100, at 1102, proceeding via off-page reference K, 1708, to FIG. 17, which then proceeds through exemplary processes 1800, to ensure all authorize personal information block chains are processed, as described above, and proceeding via off-page reference M, 1804, to FIG. 19, where exemplary processes 1900 can further comprise, at 1900, determining whether the other authorization information (OAI) limitations of the personal information (PI) of the one or more personal information blocks stored in DFS are met.

As described above, exemplary processes 1900 can further comprise, at 1906, determining whether the one or more data requirements of personal information (PI) specified in the offer are met. If it is determined, at 1906, that the one or more data requirements of personal information (PI) specified in the offer are met, then, exemplary processes 1900 can further comprise, at 1914, determining whether the contract requirements of the personal information (PI) of the one or more personal information (PI) blocks stored in DFS is met, in a further non-limiting aspect, as further described herein. If either the contract requirements of the personal information (PI) of the one or more personal information (PI) blocks stored in DFS, at 1914, or the other authorization information (OAI) limitations of the personal information (PI) of the one or more personal information blocks stored in DFS, at 1912, are not met, then, at 1916, exemplary processes 1900 can further comprise determining that the potential contract (e.g., as governed by the offer data requirements of personal information (PI), the contract requirements, and/or the other authorization information (OAI), etc.) has failed and can be classified as a contract failure, and can further comprise, at 1918, executing the one or more contract failure actions, as further described herein. Alternatively, if the contract requirements of the personal information (PI) of the one or more personal information (PI) blocks stored in DFS, at 1914, the other authorization information (OAI) limitations of the personal information (PI) of the one or more personal information blocks stored in DFS, at 1912, and the one or more data requirements of personal information (PI) specified in the offer, at 1906, are met, then, at 1920, exemplary processes 1900 can further comprise determining that the potential contract (e.g., as governed by the offer data requirements of personal information (PI), the contract requirements, and/or the other authorization information (OAI), etc.) has succeeded and can be classified as a contract success, and can further comprise, at 1922, executing the one or more contract success actions, as further described herein.

As further described herein, in various non-limiting embodiments described herein, the one or more processes or process steps as described can be performed by one or more devices or systems (e.g., via device or system 2000, 2200, 2300, portions thereof, etc.), and/or portions are combinations thereof, on behalf of the entities described herein, regarding FIG. 1 and exemplary environment 100, for example, including, but not limited to one or more user(s) 102, one or more data provider(s) 104, one or more data consumer(s) 106, one or more data sources 108, and/or one or more verifying entities 110, either on wholly automated, partially automated, or interactive basis, with or without intervention required by one or more of the entities described herein, regarding FIG. 1 and exemplary environment 100.

Figure 20:
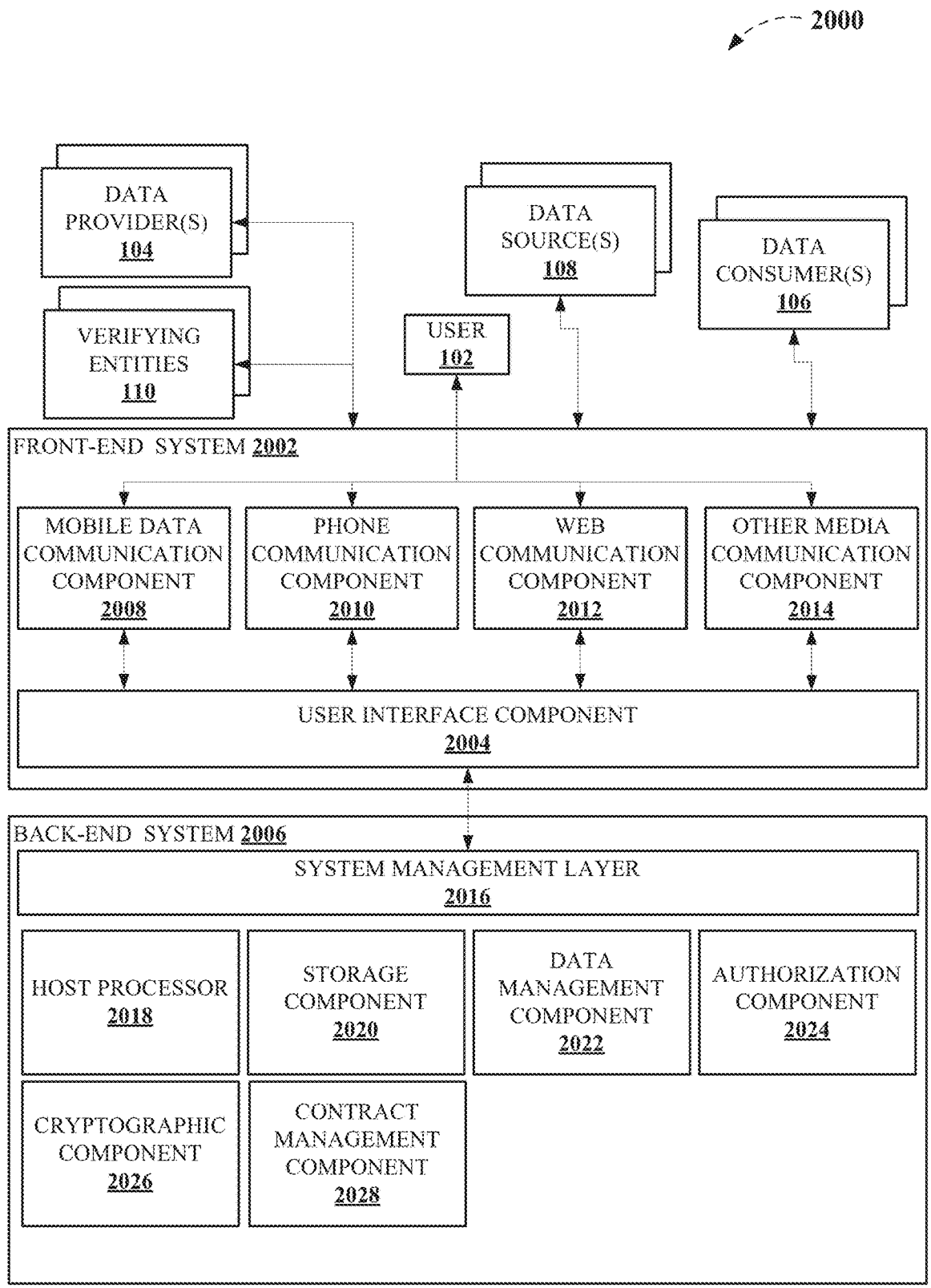
FIG. 20 depicts a functional block diagram illustrating exemplary non-limiting devices or systems suitable for use with aspects of the disclosed subject matter.

Accordingly, FIG. 20 depicts a functional block diagram illustrating exemplary non-limiting devices or systems suitable for use with aspects of the disclosed subject matter. For instance, FIG. 20 illustrates exemplary non-limiting devices or systems 2000 suitable for performing various aspects of the disclosed subject matter in accordance with an exemplary data safe or user data safe 112 as further described herein. For example, as described above regarding FIG. 1, a user 102 can interact with data safe or user data safe 112 via a front-end system 2002 that can comprise or be associated with one or more communication components and/or one or more user interface components 2004. As further described herein, user 102 interactions with data safe or user data safe 112 can be further processed and/or handled via a back-end system 2006 that can also comprise or be associated with system management layer 2016 and/or one or more system components. As depicted in FIG. 20, data safe or user data safe 112 can comprise a front-end system 2002 that can, in turn, comprise one or more of mobile data communication component 2008, phone communication component 2010, web communication component 2012, and/or other media communication component 2014, etc. As further depicted in FIG. 20, data safe or user data safe 112 can comprise a back-end system 2006 that can, in turn, comprise one or more of host processor 2018, storage component 2020, data management component 2022, authorization component 2024, cryptographic component 2026, contract management component 2028, etc., either as described above, or as further described herein.

For instance, as described above, data safe or user data safe 112 can facilitate user 102 interaction with data safe or user data safe 112 via front-end system 2002 to enable input of information into data safe or user data safe 112 and/or receipt of information out of data safe or user data safe 112 associated with information processing, handling, and/or transformation occurring within data safe or user data safe 112 or otherwise. In a non-limiting implementation of data safe or user data safe 112 comprising an exemplary mobile data communication component 2008, data safe or user data safe 112 can facilitate transmitting information to, and/or receiving information from, data safe or user data safe 112 via one or more devices configured to transmit and receive information via a wireless data network (e.g., cellular wireless, Wireless Fidelity (WiFi™), Worldwide Interoperability for Microwave Access (WiMax®), etc.). In yet other non-limiting implementations of data safe or user data safe 112 comprising an exemplary phone communication component 2010, data safe or user data safe 112 can facilitate transmitting information to, and/or receiving information from, data safe or user data safe 112 via one or more devices configured to transmit and receive information via a voice network (e.g., cellular wireless voice network, analog or digital fixed line network, such as via conventional land-line networks, etc.). In further non-limiting implementations of data safe or user data safe 112 comprising an exemplary web communication component 2012, data safe or user data safe 112 can facilitate transmitting information to, and/or receiving information from, data safe or user data safe 112 via one or more devices configured to transmit and receive information via a data network supporting conventional web browsing protocols and/or applications (e.g., such as via a data connected device connected to an intranet, the Internet, wireless networks, etc.).

In still other exemplary implementations of data safe or user data safe 112 comprising other media communication component 2014, data safe or user data safe 112 can facilitate transmitting information to, and/or receiving information from, data safe or user data safe 112 via one or more devices configured to transmit and receive information via other technologies (e.g., mesh networks, ad hoc networks, personal area networks, interactive television, wearable computing devices, facial recognition, video telephony via any of a number of networks including the Internet, wireless networks, etc., near field communications (NFC) techniques including communications protocols and data exchange formats, such as those based on radio-frequency identification (RFID) techniques, quick response codes (QR Codes®), barcodes, voice recognition, etc.), without limitation.

At this point, it should be noted that, while a number of components and/or systems are depicted in FIG. 20, and/or are described herein with respect to data safe or user data safe 112 comprising various components and/or systems, various non-limiting implementations of data safe or user data safe 112 and/or devices associated with a user 102 that can comprise and/or interact with data safe or user data safe 112 are not so limited. For instance, it can be understood that, depending on the context of the user 102 (or other entity, for example, as described above regarding FIG. 1 and exemplary operating environment 100) interaction with data safe or user data safe 112 and/or a device or system associated with a user 102 (or other entity), such a device or system associated with a user 102 (or other entity) can comprise any of a number of components, subcomponents, and/or portions thereof depicted in FIG. 20, and/or can comprise such components, subcomponents, and/or portions thereof in lieu of, in addition to, and/or complementary to components depicted in FIG. 20. As a non-limiting example, a device (e.g., such as a mobile device) associated with user 102 can comprise a user interface and/or a web browser, subcomponents, and/or portions thereof that are complementary (e.g., that can serve as a client of a server) to user interface component 2004 of various implementations data safe or user data safe 112 (e.g., that serve as the server to the client). In a further non-limiting example, a device (e.g., such as a mobile device) associated with user 102 can comprise any of a number of components, subcomponents, and/or portions thereof that can be employed in lieu of (or at least partially in lieu of) components depicted in FIG. 20 (e.g., such as an application, or app, programmed in native code for the particular device, etc.) that accomplishes and/or facilitates functionalities, or portions thereof, associated with components depicted in FIG. 20.

Thus, FIG. 20 illustrates an exemplary non-limiting device or system 2000 suitable for performing various aspects of the disclosed subject matter regarding the provision, the collection, the use, and the distribution of user information about user 102, as well as the validation, the verification, the authentication, and the proper protection and control of such user information about user 102, to ensure smooth, efficient, and cost-effective business processes, and therefore, in turn, attractive prices on the offered goods and services in accordance with the various non-limiting embodiments as described herein.

For instance, as described below with reference to FIG. 21, for example, various non-limiting embodiments of the disclosed subject matter can comprise more or less functionality than those exemplary devices or systems described therein, depending on the context. In addition, a device or system 2000 as described can be any of the devices and/or systems as the context requires and as further described above in connection with FIGS. 1-19. It can be understood that while the functionality of device or system 2000 is described in a general sense, more or less of the described functionality may be implemented, combined, and/or distributed (e.g., among network components, servers, databases, and the like), according to context, system design considerations, and/or marketing factors, and the like. For the purposes of illustration and not limitation, exemplary non-limiting devices or systems 2000 can comprise one or more exemplary devices and/or systems of FIG. 21, such as data safe or user data safe 112 (or device 2110, computing system 2126, computing system 2130, etc.) as described below, for example, or portions thereof.

In yet another non-limiting example, data safe or user data safe 112 can be implemented a subset of components associated with data safe or user data safe 112 and/or portions thereof can be incorporated within, associated with, in communication with, and/or otherwise affiliated with another computing system (e.g., such as one or more of a social media network computing system, a governmental agency network computing system, a search network computing system, etc.), and/or one or more computing systems associated with third parties, (e.g., individuals, political organizations, employment agencies organizations, service providing organizations, etc.). Moreover, any of the components described herein can be configured to perform the described functionality (e.g., via computer-executable instructions stored in a tangible computer readable medium, and/or executed by a computer, a processor, etc.). Additionally, it can be understood that various components, as described herein, can be communicatively coupled with one or more other components, as described herein, or otherwise, to share data and/or information among such components to accomplish any functionality, as described herein, and/or otherwise, that can be associated with data safe or user data safe 112, related thereto, and/or ancillary to various aspects and disclosed subject matter.

Referring again to FIG. 20, data safe or user data safe 112 comprising device or system 2000, or portions thereof, can also include a user interface component 2004, which can be associated with one or more host processors 2018, and which can facilitate various aspects of the disclosed subject matter. For instance, user interface component 2004 can provide various types of user interfaces to facilitate interaction between a user 102 (e.g., user 102, a device on behalf of user 102, an appropriately configured application, or app, such as an app appropriately configured for a specific device, such as described below with reference to FIGS. 21-26) and any component coupled to, or associated with, one or more host processors 2018, data safe or user data safe 112, and so on, for example, such as described below with reference to FIGS. 21-26, etc. In addition to being configured or adapted to be accessed by one or more user 102, user interface component 2004, can be further configured to provide one or more GUIs, command line interfaces (CLIs), machine accessible interfaces (e.g., APIs such as e-commerce and/or MIS back-end interfaces), structured and/or customized menus, and the like. In yet another exemplary implementation, user interface component 2004 can facilitate interaction between a user 102 (e.g., via a device associated with user 102, etc.), such as between a mobile device native app installed directly onto the device (e.g., smartphone, tablet, etc.) coded in its own native programming language, and/or a mobile web app (e.g., an Internet-enabled app, etc.) that has specific functionality for mobile devices and accessed through the mobile device's web browser, as further described herein.

For example, an exemplary data safe or user data safe 112 comprising user interface component 2004 can facilitate rendering a GUI that can provide user 102 with a region (e.g., region of a device screen, such as via an operating system (OS), application, or otherwise, etc.) or other means to load, import, read, etc., data and/or information, and/or can include a region to present results output from data safe or user data safe 112. These regions can comprise known text and/or graphic regions comprising dialogue boxes, static controls, drop-down-menus, list boxes, pop-up menus, edit controls, combo boxes, radio buttons, check boxes, push buttons, and/or graphic boxes, and the like. In addition, utilities to facilitate the presentation such as vertical and/or horizontal scroll bars for navigation and toolbar buttons to determine whether a region will be viewable can be employed. For example, user 102 can interact with one or more of the components depicted in FIG. 20, for instance, whether associated with, coupled to, and/or incorporated in one or more host processors 2018 associated with data safe or user data safe 112, and so on.

Data safe or user data safe 112 comprising user interface component 2004 can facilitate user 102 interaction with such regions to select and/or provide information via various devices such as a mouse, a roller ball, a keypad, a keyboard, a touchpad, touch screen, a pen and/or voice activation, for example. Typically, a mechanism such as a push button or the enter key on the keyboard can be employed to facilitate entering information in a device associated with user 102 to facilitate interaction with data safe or user data safe 112 comprising device or system 2000, or portions thereof. However, it is to be understood that the claimed subject matter is not so limited. In a non-limiting example, merely highlighting a check box can initiate information conveyance.

In yet another example, a command line interface (CLI) can be employed. For example, the command line interface can prompt (e.g., via a text message on a display and/or an audio tone, etc.) user 102 for information via providing a text message. Thus, user 102 can provide suitable information, such as alpha-numeric input corresponding to an option provided in the interface prompt or an answer to a question posed in the prompt. It is to be understood that a command line interface can be employed in connection with a GUI and/or API. In addition, the command line interface can be employed in connection with hardware (e.g., video cards of a computer) and/or displays (e.g., black and white, EGA, or other video display unit of a standalone device such as an LCD display on a network capable device) with limited graphic support, and/or low bandwidth communication channels. As a further example, a device associated with user 102 that facilitates interaction with data safe or user data safe 112 comprising device or system 2000 can include one or more motion sensors and associated software components, voice activation components, and/or facial recognition components that can be used by a user to facilitate entering information into data safe or user data safe 112 comprising device or system 2000, or portions thereof.

Accordingly, an exemplary data safe or user data safe 112 can comprise or be associated with advanced mobile device centric applications and services that can facilitate interactions with data safe or user data safe 112 as described herein related to various functionalities, e.g., via one or more of user interface component 2004 and/or communication components, etc. For instance, in an exemplary implementation data safe or user data safe 112 can facilitate user 102 employing any of a variety of devices comprising an appropriately configured application, or app (e.g., such as via an app appropriately configured for a specific device associated with user 102, an app appropriately configured for a communications service carrier, etc.), such as described below with reference to FIGS. 21-26). As a result, data safe or user data safe 112 can provide one or more of a variety of interfaces to mobile devices via mobile applications that can facilitate providing access to data safe or user data safe 112 functionalities as described herein, for example, with reference to FIGS. 1-19, etc.

Thus, in exemplary non-limiting implementations, data safe or user data safe 112 can facilitate user 102 interfacing with data safe or user data safe 112 via a mobile device, a phone, a web browser, and/or other media and/or device types (e.g., via one or more of mobile data communication component 2008, phone communication component 2010, web communication component 2012, and/or other media communication component 2014, etc.), which are employed by, or are associated with, user 102. In further non-limiting implementations, data safe or user data safe 112 comprising user interface component 2004 can facilitate transforming any of a variety of input formats (e.g., data, voice, video, biometric, etc.) into a common data format and/or transmitting input formats and/or common data format to back-end system 2006. Moreover, any of the components described herein (e.g., one or more of user interface component 2004, mobile data communication component 2008, phone communication component 2010, web communication component 2012, and/or other media communication component 2014, etc.) can be configured to perform the described functionality (e.g., via computer-executable instructions stored in a tangible computer readable medium, and/or executed by a computer, a processor, etc.).

Referring again to FIG. 20, in further exemplary implementations, data safe or user data safe 112 can comprise one or more system management layers 2016 that can facilitate management of one or more system components, as further described herein, and/or one or more components associated with user interface component 2004, one or more communications components, and so on, for example, via computer-executable instructions executing on one or more host processors 2018, or otherwise. In a non-limiting example of an exemplary data safe or user data safe 112, one or more system components can comprise one or more of storage component 2020, data management component 2022, authorization component 2024, cryptographic component 2026, contract management component 2028, etc., without limitation. In addition to being configured or adapted to facilitate management of one or more of system components, and so on, system management layer 2016, can be further configured to manage and/or provide one or more interfaces such as one or more CLIs, machine accessible interfaces (e.g., APIs such as e-commerce and/or MIS back-end interfaces), and the like, whether in lieu of, in addition to, and/or complementary to any such interfaces provided by user interface component 2004 or other components associated with data safe or user data safe 112.

As described above, an exemplary data safe or user data safe 112 comprising device or system 2000, or portions thereof, can include one or more host processors 2018 that can be associated with one or more system components. As a non-limiting example, computer-executable instructions associated with one or more system components can be executed via one or more host processors 2018. For instance, as described above, data safe or user data safe 112 can facilitate user 102 (e.g., user 102, a device on behalf of user 102, an appropriately configured application, or app, such as an app appropriately configured for a specific device, etc.) registering a user 102, or a computer or device on behalf of user 102, with data safe or user data safe 112, for a service that facilitates interaction with data safe or user data safe 112, and so on etc. Moreover, any of the components described herein (e.g., one or more of system management layers 2030, system components, etc.) can be configured to perform the described functionality (e.g., via computer-executable instructions stored in a tangible computer readable medium, and/or executed by a computer, a processor, etc.).

For still other non-limiting implementations, data safe or user data safe 112 comprising device or system 2000, or portions thereof, can also include storage component 2020 (e.g., which can comprise one or more of local storage component, network storage component, such as a network storage component associated with DFS, memory 2202, storage component 2020, etc.) that can facilitate storage and/or retrieval of data and/or information associated with data safe or user data safe 112. Thus, as described above, an exemplary data safe or user data safe 112 comprising device or system 1100, or portions thereof, can include one or more host processors 2018 that can be associated with storage component 2020 to facilitate storage of data and/or information (e.g., personal information (PI), supplemental information (SI), other authorization information (OAI), categories of use (CI), links or URIs, hashes (e.g., cryptographic hashes), other information, digital signatures, offers, etc.), and/or instructions for performing functions associated with and/or incident to the disclosed subject matter as described herein, for example, regarding FIGS. 1-19, etc.

In a non-limiting embodiment, exemplary data safe or user data safe 112 can comprise or be associated with a storage component 2020 configured to store personal information (PI) associated with a user (e.g., user 102) in a distributed file system (DFS), for example, as further described herein, regarding FIGS. 5-14. In a further non-limiting example, exemplary data safe or user data safe 112 can comprise or be associated with a storage component 2020 configured to store the personal information (PI) with supplemental information (SI) encrypted to facilitate one or more of creation of one or more block chain of the number of block chains or determining an applicability status of the request for authorization (e.g., exemplary request 1104), for example, as further described herein, regarding FIGS. 5-14. In still another non-limiting example, exemplary data safe or user data safe 112 can comprise or be associated with a storage component 2020 configured to store the personal information (PI) in the DFS comprising inter-planetary file system (IPFS), for example, as further described herein, regarding FIGS. 5-14.

In yet another non-limiting embodiment, exemplary data safe or user data safe 112 can comprise or be associated with a storage component 2020 configured to store machine-executable code associated with an offer, wherein the offer can be contingent upon access to personal information (PI) stored in a set of a number of block chains, wherein the number of block chains are based on a determined category of use (CI) of personal information (PI) in each of the number of block chains, for example, as further described herein, regarding FIGS. 15-19.

It can be understood that storage component 2020 can comprise one or more of system components, and/or portions thereof, to facilitate any of the functionality described herein and/or ancillary thereto, such as by execution of computer-executable instructions by a computer, a processor, etc. (e.g., one or more of host processors 2018, processor 2204, etc.). Moreover, any of the components described herein (e.g., storage component 2020, etc.) can be configured to perform the described functionality (e.g., via computer-executable instructions stored in a tangible computer readable medium, and/or executed by a computer, a processor, etc.).

For still other non-limiting implementations, data safe or user data safe 112 comprising device or system 2000, or portions thereof, can also include data management component 2022 that can facilitate creation of block chains of personal information (PI), based on a determined category of use (CI) the PI in the block chains, for example, as further described herein, regarding FIGS. 5-19, for example, and/or other functionalities associated with data safe or user data safe 112. Thus, as described above, an exemplary data safe or user data safe 112 comprising device or system 1100, or portions thereof, can include one or more host processors 2018 that can be associated with data management component 2022 to facilitate management of data and/or information (e.g., personal information (PI), supplemental information (SI), other authorization information (OAI), categories of use (CI), links or URIs, hashes (e.g., cryptographic hashes), other information, digital signatures, offers, etc.), and/or instructions for performing functions associated with and/or incident to the disclosed subject matter as described herein, for example, regarding FIGS. 1-19, etc.

In a non-limiting embodiment, exemplary data safe or user data safe 112 can comprise or be associated with a data management component 2022 configured to create a number of block chains of personal information (PI), based on a determined category of use (CI) of each of the number of block chains, for example, as further described herein, regarding FIGS. 5-14. In a further non-limiting example, exemplary data safe or user data safe 112 can comprise or be associated with a data management component 2022 configured to determine the one or more term of use, comprising one or more of an expiration term for one or more of the authorization or the personal information (PI), a validity term associated with the personal information (PI), one or more of a payee or a requested fee associated with the one or more of the authorization or the personal information (PI), one or more of a transmission limit or a storage limit associated with the one or more of the authorization or the personal information (PI), or a restriction associated with the one or more of the authorization or the personal information (PI) on a third party (e.g., one or more of third parties, such as one or more data provider(s) 104, one or more data source(s) 108, one or more verifying entities 110, one or more other data consumer(s) 106, etc.), for example, as further described herein, regarding FIGS. 5-14.

In another non-limiting example, exemplary data safe or user data safe 112 can comprise or be associated with a data management component 2022 configured to determine whether the personal information (PI) can be personally identifying information or other personal information (PI), wherein the personally identifying information can be defined as information or combinations of information that resolve to a unique user (e.g., user 102), meeting or exceeding a predetermined threshold confidence level, and wherein the other personal information (PI) can be defined as other information or combinations of other information that does not resolve to the unique user (e.g., user 102), by failing to meet or exceed the predetermined threshold confidence level, and can be further configured to create the number of block chains based on at least the personally identifying information, for example, as further described herein, regarding FIGS. 5-14. In still another non-limiting example, exemplary data safe or user data safe 112 can comprise or be associated with a data management component 2022 configured to determine from the request for authorization (e.g., exemplary request 1104) the determined category of use (CI), wherein the data management component 2022, can be further configured to determine whether one or more responsive block chain exists that can be responsive to the determined category of use (CI) and the request for authorization (e.g., exemplary request 1104) in the set of the number of block chains, and wherein the data management component 2022 can be further configured to create the one or more responsive block chain if the one or more responsive block chain does not exist, for example, as further described herein, regarding FIGS. 5-14. As described above regarding FIG. 11, for example, various disclosed embodiments can adhere to a predefined or predetermined taxonomy of categories of use (CI) of PI for the purposes of storing and accessing blocks and block chains of personal information (PI) stored in DFS. For instance, FIG. 2 is described regarding an exemplary credit lending process, in which various uses are defined that are applicable to credit lending. However, within such a process, many subprocesses are described, for which various further categories of use (CI) can be defined (e.g., underwriting, fraud prevention, etc.). Similar categories of use (CI) can be defined for further processes (e.g., employment application and/or verification, insurance eligibility and/or rate determination, medical service applicability, etc.), without limitation. Moreover, FIGS. 3 and 4 illustrate non-limiting examples of user information about a user 102 (e.g., personal information (PI)) that can be employed in the provision, collection, use, distribution, and so on, of user information about the user, in accordance with various embodiments of an exemplary data safe or user data safe 112 as described herein. Accordingly, such examples of user information about a user 102 (e.g., personal information (PI)) can be linked or associated in an exemplary taxonomy with particular categories of use (CI), such as via a database, lookup table, and so on (e.g., via exemplary storage component 2020) to enable exemplary data management component 2022 determining a category of use (CI) (e.g., from exemplary request 1104, etc.), to create a number of block chains of personal information (PI), based on a determined category of use (CI), and so on, without limitation. In a non-limiting aspect, various examples of user information about a user 102 (e.g., personal information (PI)) can be linked or associated in the predetermined or predefined taxonomy more than one category of use (CI).

In yet another non-limiting embodiment, exemplary data safe or user data safe 112 can comprise or be associated with a data management component 2022 configured to determine the determined category of use (CI) of personal information (PI), for example, as further described herein, regarding FIGS. 15-19. In a further non-limiting example, exemplary data safe or user data safe 112 can comprise or be associated with a data management component 2022 configured to retrieve the last block (e.g., last or last subsequent block 1002) of the one or more block chain via link to the last block (e.g., last or last subsequent block 1002) of the one or more block chain stored in the DFS, for example, as further described herein, regarding FIGS. 15-19.

In another non-limiting example, exemplary data safe or user data safe 112 can comprise or be associated with a data management component 2022 configured to process the one or more block chain to determine personal information (PI), for example, as further described herein, regarding FIGS. 15-19.

In still another non-limiting example, exemplary data safe or user data safe 112 can comprise or be associated with a data management component 2022 configured to determine a number of a cryptographic hash of a prior block (e.g., immediately prior subsequent block 1004, root block 1006) of personal information (PI) associated with the one or more block chain, a link to the prior block (e.g., immediately prior subsequent block 1004, root block 1006) of personal information (PI) associated with the one or more block chain stored in the DFS, a verifying entity associated with the personal information (PI), a digital signature associated with the verifying entity, or information associated with an encryption key or decryption key, for example, as further described herein, regarding FIGS. 15-19.

In a further non-limiting example, exemplary data safe or user data safe 112 can comprise or be associated with a data management component 2022 configured to determine that one or more limitation associated with the other authorization information (OAI) specified in the one or more block chain can be satisfied, for example, as further described herein, regarding FIGS. 15-19.

It can be understood that data management component 2022 can comprise one or more of system components, and/or portions thereof, to facilitate any of the functionality described herein and/or ancillary thereto, such as by execution of computer-executable instructions by a computer, a processor, etc. (e.g., one or more of host processors 2018, processor 2204, etc.). Moreover, any of the components described herein (e.g., data management component 2022, etc.) can be configured to perform the described functionality (e.g., via computer-executable instructions stored in a tangible computer readable medium, and/or executed by a computer, a processor, etc.).

For still other non-limiting implementations, data safe or user data safe 112 comprising device or system 2000, or portions thereof, can also include authorization component 2024 that can facilitate transmitting an authorization (e.g., exemplary response 1202) to access personal information (PI), receive the request for authorization (e.g., exemplary request 1104), and so on, for example, as further described herein, regarding FIGS. 5-19, for example, and/or other functionalities associated with data safe or user data safe 112. Thus, as described above, an exemplary data safe or user data safe 112 comprising device or system 1100, or portions thereof, can include one or more host processors 2018 that can be associated with authorization component 202 to facilitate receiving, transmitting, authorizing access, etc., regarding data and/or information (e.g., personal information (PI), supplemental information (SI), other authorization information (OAI), categories of use (CI), links or URIs, hashes (e.g., cryptographic hashes), other information, digital signatures, offers, etc.), and/or instructions for performing functions associated with and/or incident to the disclosed subject matter as described herein, for example, regarding FIGS. 1-19, etc.

In a non-limiting embodiment, exemplary data safe or user data safe 112 can comprise or be associated with a authorization component 2024 configured to transmit an authorization (e.g., exemplary response 1202) to access a set of the number of block chains based on the determined category of use (CI) associated with a request for authorization (e.g., exemplary request 1104), for example, as further described herein, regarding FIGS. 5-14. In a further non-limiting example, exemplary data safe or user data safe 112 can comprise or be associated with a authorization component 2024 configured to receive the request for authorization (e.g., exemplary request 1104), wherein the authorization component 2024 can be further configured to transmit the authorization (e.g., exemplary response 1202) comprising one or more cryptographic hash associated with a last block (e.g., last or last subsequent block 1002) of the one or more responsive block chain and a link to the last block (e.g., last or last subsequent block 1002) of the one or more responsive block chain stored in the DFS, for example, as further described herein, regarding FIGS. 5-14. In still another non-limiting example, exemplary data safe or user data safe 112 can comprise or be associated with a authorization component 2024 configured to transmit the one or more cryptographic hash associated with the last block (e.g., last or last subsequent block 1002) of the one or more responsive block chain and the link to the last block (e.g., last or last subsequent block 1002) of the one or more responsive block chain stored in the DFS encrypted, for example, as further described herein, regarding FIGS. 5-14.

In another non-limiting embodiment, exemplary data safe or user data safe 112 can comprise or be associated with a authorization component 2024 configured to transmit a request for authorization (e.g., exemplary request 1104) to access personal information (PI) and the determined category of use (CI) associated with the request for authorization (e.g., exemplary request 1104), wherein the authorization component 2024 can be further configured to receive one or more cryptographic hash associated with a last block (e.g., last or last subsequent block 1002) of one or more block chain and a link to the last block (e.g., last or last subsequent block 1002) of the one or more block chain stored in a distributed file system (DFS), for example, as further described herein, regarding FIGS. 15-19. In a further non-limiting example, exemplary data safe or user data safe 112 can comprise or be associated with a authorization component 2024 configured to receive an encrypted response and can be associated with a cryptographic component 2026 configured to decrypt the encrypted response comprising the last block (e.g., last or last subsequent block 1002) of one or more block chain and the link to the last block (e.g., last or last subsequent block 1002) of the one or more block chain stored in a distributed file system, for example, as further described herein, regarding FIGS. 15-19. In yet another non-limiting example, exemplary data safe or user data safe 112 can comprise or be associated with a authorization component 2024 configured to transmit a follow-up request (e.g., exemplary request 1104) for additional authorization (e.g., exemplary response 1202) to access personal information (PI), for example, as further described herein, regarding FIGS. 15-19. In still another non-limiting example, exemplary data safe or user data safe 112 can comprise or be associated with a authorization component 2024 configured to transmit the follow-up request (e.g., exemplary request 1104) for additional authorization (e.g., exemplary response 1202) to access personal information (PI), for example, as further described herein, regarding FIGS. 15-19.

It can be understood that authorization component 2024 can comprise one or more of system components, and/or portions thereof, to facilitate any of the functionality described herein and/or ancillary thereto, such as by execution of computer-executable instructions by a computer, a processor, etc. (e.g., one or more of host processors 2018, processor 2204, etc.). Moreover, any of the components described herein (e.g., authorization component 2024, etc.) can be configured to perform the described functionality (e.g., via computer-executable instructions stored in a tangible computer readable medium, and/or executed by a computer, a processor, etc.).

For still other non-limiting implementations, data safe or user data safe 112 comprising device or system 2000, or portions thereof, can also include cryptographic component 202 that can facilitate encryption/decryption, and the handling of information or data incident thereto, for example, as further described herein, regarding FIGS. 5-19, for example, and/or other functionalities associated with data safe or user data safe 112. Thus, as described above, an exemplary data safe or user data safe 112 comprising device or system 1100, or portions thereof, can include one or more host processors 2018 that can be associated with cryptographic component 202 to facilitate encryption/decryption of data and/or information (e.g., personal information (PI), supplemental information (SI), other authorization information (OAI), categories of use (CI), links or URIs, hashes (e.g., cryptographic hashes), other information, digital signatures, offers, etc.), and/or instructions for performing functions associated with and/or incident to the disclosed subject matter as described herein, for example, regarding FIGS. 1-19, etc.

Thus, cryptographic component 2026 can facilitate securing data and/or information being written to, stored in, and/or read from the storage component 2020 (e.g., account and/or profile information, messages, queries, requests, responses, etc.), transmitted to and/or received from a connected network (e.g., such as for transmitting user 102 and/or associated device information to a trusted intermediary, etc.), and/or creating a secure communication channel as part of a secure association of various devices with exemplary implementations of data safe or user data safe 112 comprising non-limiting embodiments of devices or systems 2000, or portions thereof, with a user 102 (or one or more of third parties, such as one or more data provider(s) 104, one or more data source(s) 108, one or more verifying entities 110, etc.) facilitating various aspects of the disclosed subject matter to ensure that protected data can only be accessed by those entities authorized and/or authenticated to do so. To the same ends, cryptographic component 2026 can also provide asymmetric cryptographic accelerators and tools (e.g., RSA, Digital Signature Standard (DSS), and the like) in addition to accelerators and tools (e.g., Secure Hash Algorithm (SHA) and its variants such as, for example, SHA-0, SHA-1, SHA-224, SHA-256, SHA-384, SHA-512, SHA-3, and so on). As described, any of the components described herein (e.g., cryptographic component 2026, etc.) can be configured to perform the described functionality (e.g., via computer-executable instructions stored in a tangible computer readable medium, and/or executed by a computer, a processor, etc.).

In a non-limiting embodiment, exemplary data safe or user data safe 112 can comprise or be associated with a cryptographic component 2026 configured to encrypt a number of a cryptographic hash of a prior block (e.g., immediately prior subsequent block 1004, root block 1006) of personal information (PI) in the one or more block chain, a link to the prior block (e.g., immediately prior subsequent block 1004, root block 1006) of personal information (PI) in the one or more block chain stored in the DFS, a verifying entity associated with the personal information (PI), a digital signature associated with the verifying entity, information associated with an encryption key or decryption key, or other authorization information (OAI) associated with the set of the number of block chains, for example, as further described herein, regarding FIGS. 5-19. In a further non-limiting example, exemplary data safe or user data safe 112 can comprise or be associated with a cryptographic component 2026 configured to decrypt the encrypted response (e.g., exemplary response 1202) comprising the last block (e.g., last or last subsequent block 1002) of one or more block chain and the link to the last block (e.g., last or last subsequent block 1002) of the one or more block chain stored in a distributed file system, for example, as further described herein, regarding FIGS. 15-19.

It can be understood that cryptographic component 2026 can comprise one or more of system components, and/or portions thereof, to facilitate any of the functionality described herein and/or ancillary thereto, such as by execution of computer-executable instructions by a computer, a processor, etc. (e.g., one or more of host processors 2018, processor 2204, etc.). Moreover, any of the components described herein (e.g., cryptographic component 2026, etc.) can be configured to perform the described functionality (e.g., via computer-executable instructions stored in a tangible computer readable medium, and/or executed by a computer, a processor, etc.).

For still other non-limiting implementations, data safe or user data safe 112 comprising device or system 2000, or portions thereof, can also include contract management component 2028 that can facilitate automated or self-executing contract execution based on personal information (PI) stored in one or more block chains based on one or more categories of use (CI) stored in DFS, for example, as further described herein, regarding FIGS. 5-19, for example, and/or other functionalities associated with data safe or user data safe 112. Thus, as described above, an exemplary data safe or user data safe 112 comprising device or system 1100, or portions thereof, can include one or more host processors 2018 that can be associated with contract management component 2028 to facilitate automated or self-executing contract execution associated with data and/or information (e.g., personal information (PI), supplemental information (SI), other authorization information (OAI), categories of use (CI), links or URIs, hashes (e.g., cryptographic hashes), other information, digital signatures, offers, etc.), and/or instructions for performing functions associated with and/or incident to the disclosed subject matter as described herein, for example, regarding FIGS. 1-19, etc.

In another non-limiting embodiment, exemplary data safe or user data safe 112 can comprise or be associated with a contract management component 2028 configured to determine that the one or more block chain does not comprise one or more responsive block chain responsive to the offer, and wherein the authorization component 2024 can be further configured to transmit a follow-up request (e.g., exemplary request 1104) for additional authorization (e.g., exemplary response 1202) to access personal information (PI), for example, as further described herein, regarding FIGS. 15-19. In a further non-limiting example, exemplary data safe or user data safe 112 can comprise or be associated with a contract management component 2028 configured to determine that the one or more block chain comprises the one or more responsive block chain comprising personal information (PI) responsive to the offer, for example, as further described herein, regarding FIGS. 15-19.

In another non-limiting example, exemplary data safe or user data safe 112 can comprise or be associated with a contract management component 2028 configured to determine based on the offer, a number of one or more data requirements associated with personal information (PI), one or more contract requirement associated with the offer, one or more success action defined by the offer, or one or more failure action defined by the offer, for example, as further described herein, regarding FIGS. 15-19. In still another non-limiting example, exemplary data safe or user data safe 112 can comprise or be associated with a contract management component 2028 configured to execute, based on the offer, one or more of the one or more success action defined by the offer or the one or more failure action defined by the offer, for example, as further described herein, regarding FIGS. 15-19. In a further non-limiting example, exemplary data safe or user data safe 112 can comprise or be associated with a contract management component 2028 configured to compare the one or more responsive block chain comprising personal information (PI) to information associated with the offer, for example, as further described herein, regarding FIGS. 15-19.

In further non-limiting examples, exemplary data safe or user data safe 112 can comprise or be associated with a contract management component 2028 configured to determine that one or more of the one or more data requirement associated with personal information (PI) or the one or more contract requirement associated with the offer can be not satisfied by the one or more responsive block chain comprising personal information (PI), for example, as further described herein, regarding FIGS. 15-19. In still other non-limiting examples, exemplary data safe or user data safe 112 can comprise or be associated with a contract management component 2028 configured to determine that the one or more data requirement associated with personal information (PI) and the one or more contract requirement associated with the offer are satisfied by the one or more responsive block chain comprising personal information (PI), for example, as further described herein, regarding FIGS. 15-19.

In further non-limiting examples, exemplary data safe or user data safe 112 can comprise or be associated with a contract management component 2028 configured to determine that one or more of personal information (PI) comprising personally identifying information or other personal information (PI) satisfies the one or more data requirement associated with personal information (PI), wherein the personally identifying information can be defined as information or combinations of information that resolve to a unique user (e.g., user 102), meeting or exceeding a predetermined threshold confidence level, and wherein the other personal information (PI) can be defined as other information or combinations of other information that does not resolve to the unique user (e.g., user 102), by failing to meet or exceed the predetermined threshold confidence level, and wherein the one or more block chain can be based on at least the personally identifying information, for example, as further described herein, regarding FIGS. 15-19.

In still further non-limiting examples, exemplary data safe or user data safe 112 can comprise or be associated with a contract management component 2028 configured to execute the machine-executable code associated with the offer defined by the one or more limitation associated with the other authorization information (OAI) comprising one or more term of use associated with the personal information (PI), including one or more of an expiration term for one or more of the authorization (e.g., exemplary response 1202) or the personal information (PI), a validity term associated with the personal information (PI), one or more of a payee or a requested fee associated with the one or more of the authorization (e.g., exemplary response 1202) or the personal information (PI), one or more of a transmission limit or a storage limit associated with the one or more of the authorization (e.g., exemplary response 1202) or the personal information (PI), or a restriction associated with the one or more of the authorization (e.g., exemplary response 1202) or the personal information (PI) on a third party (e.g., one or more of third parties, such as one or more data provider(s) 104, one or more data source(s) 108, one or more verifying entities 110, one or more other data consumer(s) 106, etc.), for example, as further described herein, regarding FIGS. 15-19.

It can be understood that contract management component 2028 can comprise one or more of system components, and/or portions thereof, to facilitate any of the functionality described herein and/or ancillary thereto, such as by execution of computer-executable instructions by a computer, a processor, etc. (e.g., one or more of host processors 2018, processor 2204, etc.). Moreover, any of the components described herein (e.g., contract management component 2028, etc.) can be configured to perform the described functionality (e.g., via computer-executable instructions stored in a tangible computer readable medium, and/or executed by a computer, a processor, etc.).

Referring again to FIG. 20, data safe or user data safe 112 comprising device or system 2000, or portions thereof, can also include system management layer 2016, which can be associated with one or more host processors 2018, can facilitate various aspects of the disclosed subject matter, as described above. For instance, system management layer 2016 can facilitate transmitting and/or receiving information and/or data that can be written to, stored in, and/or read from the storage component 2020, can facilitate transmitting and/or receiving information and/or data between and/or among one or more of system components, as further described herein, and/or one or more components associated with user interface component 2004, one or more communications components, and so on, and/or one or more host processors 2018, can facilitate control and/or execution of one or more of system components, etc. As a further non-limiting example, the system management layer 2016 can facilitate transmitting data, information, and/or instructions between front-end system 2002 and back-end system 2006, can facilitate transmitting and/or receiving data, information, and/or instructions incident to various aspects and/or functionalities associated with data safe or user data safe 112, or otherwise, and the like, as further as described herein, for example, regarding FIGS. 1-19, etc. In a further non-limiting example involving an exemplary implementation of data safe or user data safe 112 comprising system management layer 2016, or portions thereof, data safe or user data safe 112 can facilitate presenting actionable options (e.g., via, in lieu of, in addition to, and/or complementary to user interface component 2004) to a user 102 (or one or more of third parties, such as one or more data provider(s) 104, one or more data source(s) 108, one or more verifying entities 110, one or more other data consumer(s) 106, etc.), for example, by identifying and/or determining options and/or activities available to user 102 within data safe or user data safe 112, based in part on one or more of whether user 102 (or others) has installed an appropriately configured app on a device associated with user 102 (or others), whether user 102 (or others) is registered and/or authenticated with data safe or user data safe 112, or otherwise, capabilities of one or more system components, etc.

In yet another non-limiting example in the context of hybrid web applications or "mashups," system management layer 2016 can facilitate using and/or combining data, information, and/or functionality associated with data safe or user data safe 112 (or components or portions thereof) with one or more other sources to create compound applications or services by providing one or more APIs associated with one or more system components, and by providing access to one or more information and/or data sources associated with data safe or user data safe 112. To these and related ends, further non-limiting implementations of data safe or user data safe 112 comprising system management layer 2016 (or one or more system components), or portions thereof, can provide one or more APIs that can expose data, information, and/or functionality associated with the one or more system components (e.g., one or more of host processor 2018, storage component 2020, data management component 2022, authorization component 2024, cryptographic component 2026, contract management component 2028, registration and/or authentication component(s) (not shown), one or more profile management component(s) (not shown), one or more privacy and/or control component (not shown), one or more search component(s) (not shown), one or more analysis component(s) (not shown), one or more monetization component(s) (not shown), one or more marketing component(s) (not shown), etc.), either as described above, or as further described herein.

It should be noted that, as depicted in FIG. 20, devices or systems 2000 are described as monolithic devices or systems. However, it is to be understood that the various components and/or the functionality provided thereby can be incorporated into one or more host processors 2018 or provided by one or more other connected devices. Accordingly, it is to be understood that more or less of the described functionality may be implemented, combined, and/or distributed (e.g., among network devices or systems, servers, databases, and the like), according to context, system design considerations, and/or marketing factors. Moreover, any of the components described herein can be configured to perform the described functionality (e.g., via computer-executable instructions stored in a tangible computer readable medium, and/or executed by a computer, a processor, etc.).

Accordingly, non-limiting embodiments of exemplary devices or systems 2000 can comprise or be associated with a processor and a memory that stores computer executable components that, when executed by the processor, facilitate performance of operations, wherein the computer executable components can comprise a storage component 2020 configured to store personal information (PI) associated with a user (e.g., user 102) in a distributed file system (DFS), for example, as further described herein, regarding FIGS. 5-14.

In a non-limiting aspect, exemplary storage component 2020 can be further configured to store the personal information (PI) with supplemental information (SI) encrypted to facilitate one or more of creation of one or more block chain of the number of block chains or determining an applicability status of the request for authorization (e.g., exemplary request 1104), for example, as further described herein, regarding FIGS. 5-14. In a further non-limiting aspect, exemplary storage component 2020 can be further configured to store the personal information (PI) in the DFS comprising inter-planetary file system (IPFS), for example, as further described herein, regarding FIGS. 5-14.

Still further non-limiting embodiments of exemplary devices or systems 2000 can comprise or be associated with a data management component 2022 configured to create a number of block chains of personal information (PI), based on a determined category of use (CI) of each of the number of block chains, for example, as further described herein, regarding FIGS. 5-14. For instance, in a non-limiting aspect, exemplary data management component 2022 can be associated with a cryptographic component 2026 configured to encrypt a number of a cryptographic hash of a prior block (e.g., immediately prior subsequent block 1004, root block 1006) of personal information (PI) in the one or more block chain, a link to the prior block (e.g., immediately prior subsequent block 1004, root block 1006) of personal information (PI) in the one or more block chain stored in the DFS, a verifying entity associated with the personal information (PI), a digital signature associated with the verifying entity, information associated with an encryption key or decryption key, or other authorization information (OAI) associated with the set of the number of block chains, for example, as further described herein, regarding FIGS. 5-19.

For instance, an exemplary link to the prior block (e.g., immediately prior subsequent block 1004, root block 1006) of personal information (PI) in the one or more block chain can comprise an encrypted link to the prior block (e.g., immediately prior subsequent block 1004, root block 1006) of personal information (PI) in the one or more block chain, for example, as further described herein, regarding FIGS. 5-14.

In another non-limiting aspect, exemplary data management component 2022 can be further configured to determine the one or more term of use, comprising one or more of an expiration term for one or more of the authorization or the personal information (PI), a validity term associated with the personal information (PI), one or more of a payee or a requested fee associated with the one or more of the authorization or the personal information (PI), one or more of a transmission limit or a storage limit associated with the one or more of the authorization or the personal information (PI), or a restriction associated with the one or more of the authorization or the personal information (PI) on a third party (e.g., one or more of third parties, such as one or more data provider(s) 104, one or more data source(s) 108, one or more verifying entities 110, one or more other data consumer(s) 106, etc.), for example, as further described herein, regarding FIGS. 5-14.

In still another non-limiting aspect, exemplary data management component 2022 can be further configured to determine whether the personal information (PI) can be personally identifying information or other personal information (PI), wherein the personally identifying information can be defined as information or combinations of information that resolve to a unique user (e.g., user 102), meeting or exceeding a predetermined threshold confidence level, and wherein the other personal information (PI) can be defined as other information or combinations of other information that does not resolve to the unique user (e.g., user 102), by failing to meet or exceed the predetermined threshold confidence level, and can be further configured to create the number of block chains based on at least the personally identifying information, for example, as further described herein, regarding FIGS. 5-14.

In yet another non-limiting aspect, exemplary data management component 2022 can be further configured to determine from the request for authorization (e.g., exemplary request 1104) the determined category of use (CI), wherein the data management component 2022, can be further configured to determine whether one or more responsive block chain exists that can be responsive to the determined category of use (CI) and the request for authorization (e.g., exemplary request 1104) in the set of the number of block chains, wherein the data management component 2022 can be further configured to create the one or more responsive block chain if the one or more responsive block chain does not exist, for example, as further described herein, regarding FIGS. 5-14.

In further non-limiting aspects, exemplary devices or systems 2000 can comprise or be associated with an authorization component 2024 configured to transmit an authorization (e.g., exemplary response 1202) to access a set of the number of block chains based on the determined category of use (CI) associated with a request for authorization (e.g., exemplary request 1104), for example, as further described herein, regarding FIGS. 5-14. For instance, exemplary other authorization information (OAI) associated with the set of the number of block chains can comprise one or more term of use determined by the user (e.g., user 102), for example, as further described herein, regarding FIGS. 5-14. In a further non-limiting aspect, exemplary authorization component 2024 can be further configured to receive the request for authorization (e.g., exemplary request 1104), the authorization component 2024 can be further configured to transmit the authorization (e.g., exemplary response 1202) comprising one or more cryptographic hash associated with a last block (e.g., last or last subsequent block 1002) of the one or more responsive block chain and a link to the last block (e.g., last or last subsequent block 1002) of the one or more responsive block chain stored in the DFS, for example, as further described herein, regarding FIGS. 5-14. In still further non-limiting aspects, exemplary authorization component 2024 can be further configured to transmit the one or more cryptographic hash associated with the last block (e.g., last or last subsequent block 1002) of the one or more responsive block chain and the link to the last block (e.g., last or last subsequent block 1002) of the one or more responsive block chain stored in the DFS encrypted, for example, as further described herein, regarding FIGS. 5-14.

Further non-limiting embodiments of exemplary devices or systems 2000 can comprise or be associated with a processor and a memory that stores computer executable components that, when executed by the processor, facilitate performance of operations, wherein the computer executable components can comprise a storage component 2020 configured to store machine-executable code associated with an offer, wherein the offer can be contingent upon access to personal information (PI) stored in a set of a number of block chains, wherein the number of block chains are based on a determined category of use (CI) of personal information (PI) in each of the number of block chains, for example, as further described herein, regarding FIGS. 15-19.

Still further non-limiting embodiments of exemplary devices or systems 2000 can comprise or be associated with a data management component 2022 configured to determine the determined category of use (CI) of personal information (PI), for example, as further described herein, regarding FIGS. 15-19.

In a non-limiting example, exemplary data management component 2022 can be further configured to retrieve the last block (e.g., last or last subsequent block 1002) of the one or more block chain via link to the last block (e.g., last or last subsequent block 1002) of the one or more block chain stored in the DFS and/or determine other authorization information (OAI) associated with the one or more block chain, and wherein the data management component 2022 can be further configured to process the one or more block chain to determine personal information (PI), for example, as further described herein, regarding FIGS. 15-19.

In another non-limiting example, exemplary data management component 2022 can be further configured to determine a number of a cryptographic hash of a prior block (e.g., immediately prior subsequent block 1004, root block 1006) of personal information (PI) associated with the one or more block chain, a link to the prior block (e.g., immediately prior subsequent block 1004, root block 1006) of personal information (PI) associated with the one or more block chain stored in the DFS, a verifying entity associated with the personal information (PI), a digital signature associated with the verifying entity, or information associated with an encryption key or decryption key, for example, as further described herein, regarding FIGS. 15-19.

In a non-limiting example, exemplary data management component 2022 can be further configured to determine that one or more limitation associated with the other authorization information (OAI) specified in the one or more block chain can be satisfied, for example, as further described herein, regarding FIGS. 15-19.

Further non-limiting embodiments of exemplary devices or systems 2000 can comprise or be associated with a an authorization component 2024 configured to transmit a request for authorization (e.g., exemplary request 1104) to access personal information (PI) and the determined category of use (CI) associated with the request for authorization (e.g., exemplary request 1104), wherein the authorization component 2024 can be further configured to receive one or more cryptographic hash associated with a last block (e.g., last or last subsequent block 1002) of one or more block chain and a link to the last block (e.g., last or last subsequent block 1002) of the one or more block chain stored in a distributed file system (DFS), for example, as further described herein, regarding FIGS. 15-19. In a non-limiting aspect, exemplary authorization component 2024 can be further configured to receive an encrypted response (e.g., exemplary response 1202) and can be associated with a cryptographic component 2026 configured to decrypt the encrypted response (e.g., exemplary response 1202) comprising the last block (e.g., last or last subsequent block 1002) of one or more block chain and the link to the last block (e.g., last or last subsequent block 1002) of the one or more block chain stored in a distributed file system, for example, as further described herein, regarding FIGS. 5-19. In a further non-limiting aspect, exemplary authorization component 2024 can be further configured to transmit a follow-up request (e.g., exemplary request 1104) for additional authorization (e.g., exemplary response 1202) to access personal information (PI), for example, as further described herein, regarding FIGS. 15-19. In another example, exemplary authorization component 2024 can be further configured to transmit the follow-up request (e.g., exemplary request 1104) for additional authorization (e.g., exemplary response 1202) to access personal information (PI), for example, as further described herein, regarding FIGS. 15-19.

Still further non-limiting embodiments of exemplary devices or systems 2000 can comprise or be associated with a contract management component 2028 configured to determine that the one or more block chain does not comprise one or more responsive block chain responsive to the offer, for example, as further described herein, regarding FIGS. 15-19. For instance, in a non-limiting aspect, exemplary contract management component 2028 can be further configured to determine that the one or more block chain comprises the one or more responsive block chain comprising personal information (PI) responsive to the offer, for example, as further described herein, regarding FIGS. 15-19. In yet another non-limiting aspect, exemplary contract management component 2028 can be further configured to determine based on the offer, a number of one or more data requirements associated with personal information (PI), one or more contract requirement associated with the offer, one or more success action defined by the offer, or one or more failure action defined by the offer, for example, as further described herein, regarding FIGS. 15-19. In still another non-limiting aspect, exemplary contract management component 2028 can be further configured to execute, based on the offer, one or more of the one or more success action defined by the offer or the one or more failure action defined by the offer, for example, as further described herein, regarding FIGS. 15-19.

Further non-limiting embodiments can comprise or be associated with an exemplary contract management component 2028 that can be further configured to compare the one or more responsive block chain comprising personal information (PI) to information associated with the offer, for example, as further described herein, regarding FIGS. 15-19. In still another non-limiting aspect, exemplary contract management component 2028 can be further configured to determine that one or more of the one or more data requirement associated with personal information (PI) or the one or more contract requirement associated with the offer can be not satisfied by the one or more responsive block chain comprising personal information (PI), for example, as further described herein, regarding FIGS. 15-19. In addition, exemplary contract management component 2028 can be further configured to determine that the one or more data requirement associated with personal information (PI) and the one or more contract requirement associated with the offer are satisfied by the one or more responsive block chain comprising personal information (PI), for example, as further described herein, regarding FIGS. 15-19. In other non-limiting embodiments, exemplary contract management component 2028 can be further configured to determine that one or more of personal information (PI) comprising personally identifying information or other personal information (PI) satisfies the one or more data requirement associated with personal information (PI), wherein the personally identifying information can be defined as information or combinations of information that resolve to a unique user (e.g., user 102), meeting or exceeding a predetermined threshold confidence level, and wherein the other personal information (PI) can be defined as other information or combinations of other information that does not resolve to the unique user (e.g., user 102), by failing to meet or exceed the predetermined threshold confidence level, and wherein the one or more block chain can be based on at least the personally identifying information, for example, as further described herein, regarding FIGS. 15-19.

In still further non-limiting examples, exemplary contract management component 2028 can be further configured to execute the machine-executable code associated with the offer defined by the one or more limitation associated with the other authorization information (OAI) comprising one or more term of use associated with the personal information (PI), including one or more of an expiration term for one or more of the authorization (e.g., exemplary response 1202) or the personal information (PI), a validity term associated with the personal information (PI), one or more of a payee or a requested fee associated with the one or more of the authorization (e.g., exemplary response 1202) or the personal information (PI), one or more of a transmission limit or a storage limit associated with the one or more of the authorization (e.g., exemplary response 1202) or the personal information (PI), or a restriction associated with the one or more of the authorization (e.g., exemplary response 1202) or the personal information (PI) on a third party (e.g., one or more of third parties, such as one or more data provider(s) 104, one or more data source(s) 108, one or more verifying entities 110, one or more other data consumer(s) 106, etc.), for example, as further described herein, regarding FIGS. 15-19.

Figure 21:
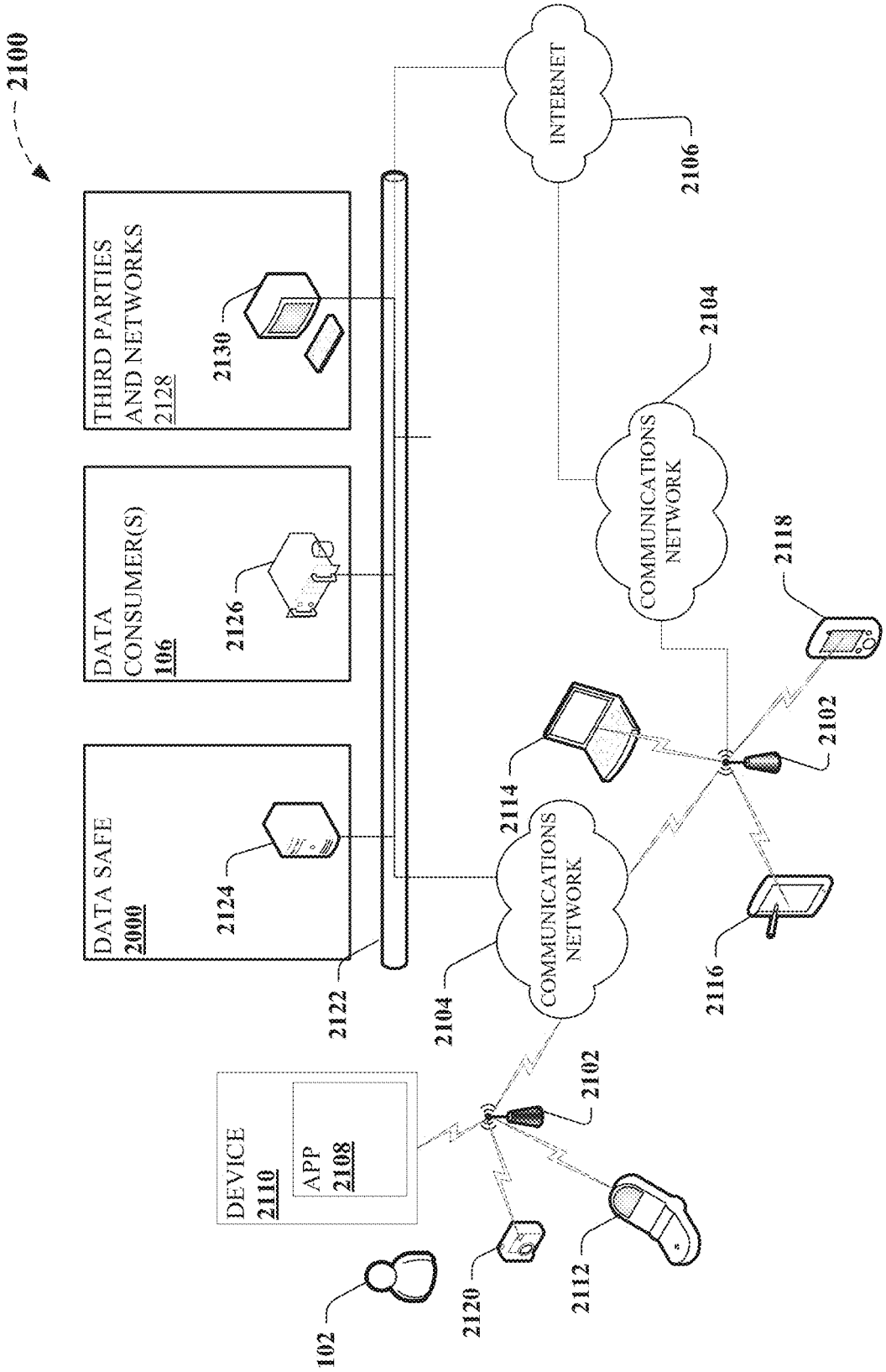
FIG. 21 illustrates an overview of an exemplary computing environment suitable for incorporation of embodiments of the disclosed subject matter.

FIG. 21 illustrates an overview of an exemplary computing environment 2100 suitable for incorporation of embodiments of the disclosed subject matter. For example, computing environment 2100 can comprise wired communication environments, wireless communication environments, and so on. As a further example, computing environment 2100 can further comprise one or more of a wireless access component 2102, communications networks 2104, the Internet 2106, etc., with which a user 102 can employ any of a variety of devices (e.g., device 2110, devices 2112-2120, and so on) comprising an appropriately configured application, or app 2108 (e.g., such as via an app appropriately configured for a specific device associated with user 102, such as described below with reference to FIGS. 22-23, and so on, etc.), or other functionality (e.g., browsers, clients, etc.) to communicate data and/or information over a communication medium (e.g., a wired medium 2122, a wireless medium via wireless access component 2102, etc.) according to an agreed protocol, to facilitate communication of data and/or information associated with data safe or user data safe 112 between and/or among one or more of data safe or user data safe 112, user 102, one or more data consumer(s) 106, and/or other third parties and networks 2128 (e.g., one or more of third parties, such as one or more data provider(s) 104, one or more data source(s) 108, one or more verifying entities 110, one or more other data consumer(s) 106, etc.), and/or computing systems or devices associated therewith, such as device 2110, computing systems or devices 2124, 2126, and 2130, respectively (e.g., via an operating system, application software, device drivers, communications stacks, etc., which can perform such actions on behalf of such computing systems or devices). For instance, user interface component 2006 can facilitate interaction between a user 102 (e.g., via a device associated with user 102, and so on, etc.), such as via a mobile device native app installed directly onto the device (e.g., smartphone, tablet, etc.) coded in its own native program language, and/or via a mobile web app (e.g., an Internet-enabled app, etc.) that has specific functionality for mobile devices and/or accessed through the mobile device's web browser, as described herein.

Thus, as described herein, in various non-limiting aspects, devices 2110 (e.g., comprising app 2108, or otherwise, and so on, etc.) employed in connection with data safe or user data safe 112 or functionalities thereof can facilitate various actions described herein regarding FIGS. 1-20, for example.

Accordingly, computing environment 2100 can comprise a number of components to facilitate described functionalities according to various aspects of the disclosed subject matter, among other related functions. While various embodiments are described with respect to the components of computing environment 2100 and the further embodiments more fully described herein, one having ordinary skill in the art would recognize that various modifications could be made without departing from the spirit of the disclosed subject matter. Thus, it can be understood that the description herein is but one of many embodiments that may be possible while keeping within the scope of the claims appended hereto.

Additionally, while device 2110 is shown as a generic network capable device, which can include any of a variety of devices (e.g., device 2110, devices 2112-2120, and so on), device 2110 is intended to refer to a class of network capable devices that can one or more of receive, transmit, store, etc., data and or information incident to and that user 102, data safe or user data safe 112, data consumer(s) 106, and/or third parties and networks 2128 (e.g., one or more of third parties, such as one or more data provider(s) 104, one or more data source(s) 108, one or more verifying entities 110, one or more other data consumer(s) 106, etc.) can employ to facilitate various techniques of the disclosed subject matter. However, the discussion of the foregoing distinction is intended for illustration and not limitation. While for purposes of illustration, user 102 is described as performing certain actions, it is to be understood that device 2110 (e.g., via an operating system, application software, device drivers, communications stacks, etc.) can perform such actions on behalf of user 102, as further described herein. Similarly for third parties and networks 2128 (e.g., one or more of third parties, such as one or more data provider(s) 104, one or more data source(s) 108, one or more verifying entities 110, one or more other data consumer(s) 106, etc.), which can be discussed or described as performing certain actions, it is to be understood that computing systems or devices (e.g., 2126, 2130) associated with data consumer(s) 106, and third parties and networks 2128, respectively (e.g., via an operating system, application software, device drivers, communications stacks, etc.) can perform such actions on behalf of data consumer(s) 106, third parties and networks 2128, respectively.

Accordingly, exemplary device 2110 can include, without limitation, a cellular phone 2112, a laptop computer 2114, a tablet personal computer (PC) device 2116, and/or a personal digital assistant (PDA) 2118, or other mobile device, and so on connected to a network via access component 2102 or otherwise. As further examples, device 2110 can include such devices as a network capable camera 2120 and other such devices (not shown) as a pen computing device, wearable computing device, portable digital music player, home entertainment devices, network capable devices, appliances, kiosks, and sensors, and so on. It is to be understood that device 2110 can comprise more or less functionality than those exemplary devices described above as the context requires and as further described herein in connection with FIGS. 1-20, etc., for instance.

According to various embodiments of the disclosed subject matter, device 2110 can connect to other devices to facilitate accomplishing various functions as further described herein (e.g., storing personal information (PI) and/or creating personal information (PI) block chains in DFS. In addition, device 2110 can connect via one or more communications networks 2104 to a wired network 2122 (e.g., directly, via the Internet 2106, or otherwise). Wired network 2122 (as well as communications network 2104) can comprise any number of computers, servers, intermediate network devices, and the like to facilitate various functions as further described herein. As a non-limiting example, wired network 2122 can include and/or be associated with computing systems or devices 2126 (e.g., one or more appropriately configured computing devices associated with, operated by, or operated on behalf of one or more data consumer(s), etc.) as described above, that facilitates providing access to data safe or user data safe 112 for one or more data consumer(s) 106 to enable various operations as described herein. In other non-limiting implementations, data safe or user data safe 112 can facilitate various interactions and/or functionality as described herein, regarding FIGS. 5-14, etc.

In a further non-limiting example, wired network 2122 can include and/or be associated with computing systems or devices 2130 (e.g., one or more appropriately configured computing devices associated with, operated by, or operated on behalf of third parties and networks 2128 (e.g., one or more of third parties, such as one or more data provider(s) 104, one or more data source(s) 108, one or more verifying entities 110, one or more other data consumer(s) 106, etc.), etc.) as described above, that facilitates providing access to data safe or user data safe 112 for third parties and networks 2128 to enable various operations as described herein. In still other non-limiting implementations, data safe or user data safe 112 can facilitate various interactions and/or functionality as described herein, regarding FIGS. 15-19, etc.

Exemplary data safe or user data safe 112 can further include any number of intermediaries acting on behalf of one or more of users 102, data safe or user data safe 112, third parties and networks 2128, and so on, to facilitate various functions as further described herein. In a further non-limiting example, an intermediary acting on behalf of data safe or user data safe 112 could store and/or provide access to data and/or information associated with data safe or user data safe 112, such as via storage and/or retrieval of personal information (PI) stored in personal information (PI) block chains in DFS, to other computing systems (e.g., CRM platforms, MIS platforms, e-commerce systems, social media networks, news networks, search networks, etc.) and/or third parties, (e.g., individuals, political organizations, employment agencies organizations, service providing organizations, etc.). Moreover, data safe or user data safe 112 can be further configured to perform any number of additional and/or complementary functions incident to functionalities as described above, regarding FIGS. 2-10, for example.

In addition, wired network 2122 or systems (or components) thereof can facilitate performing ancillary functions to accomplish various techniques described herein. For example, computing systems or devices 2126 (or 2130) associated with one or more data consumer(s) 106 (and/or third parties and networks 2128) can provide functions that facilitate authentication and/or authorization of one or more of users 102, one or more data consumer(s) 106, one or more third parties and networks 2128, and/or others to data safe or user data safe 112, transmission of data and/or information associated with data safe or user data safe 112 (e.g., via an API, etc.) and/or other information associated with facilitating the provision, collection, use, distribution, and so on, of user information about user 102, as well as the validation, verification, authentication, and proper protection and control of such user information about user 102 to ensure smooth, efficient, and cost-effective business processes, and therefore, in turn, attractive prices on the offered goods and services, as described above. Accordingly, in various non-limiting embodiments of the disclosed subject matter, computing environment 2100 can further comprise additional network components (not shown). For example, systems, devices, and/or components can be relatively simplistic and/or lacking certain features to facilitate various techniques of the disclosed subject matter. Thus, particular aspects of the disclosed subject matter can be facilitated by additional network components (not shown) in communication with the devices and/or other components of computing environment 2100.

For instance, computing systems or devices 2126 associated with one or more data consumer(s) 106 can be capable of performing a number of functions as described above regarding data safe or user data safe 112, and/or computing systems or devices 2126 associated with one or more data consumer(s) 106, and functionality described above regarding computing systems or devices 2126 associated with one or more data consumer(s) 106 can likewise be provided by other components or devices associated with wired network 2122 (e.g., data safe or user data safe 112, computing systems or devices 2130 associated with third parties and networks 2128, and/or others, or portions thereof, etc.). For example, functionality associated with data safe or user data safe 112 for providing one or more of analyses, inferences, or insights can be provided by one or more computing systems (not shown) that can be considered ancillary to, but associated with data safe or user data safe 112. In a further non-limiting example, functionality associated with data safe or user data safe 112 for search, monetization, and so on, without limitation, can be provided by one or more computing systems (not shown) that can be considered ancillary to, but associated with data safe or user data safe 112, computing systems or devices 2126 associated with one or more data consumer(s) 106, computing systems or devices 2128 associated with third parties and networks 2128, etc. As a further example, data collected, transmitted, and/or received by a storage component 2020 can be stored in an associated database system (not shown), in addition to various associated systems that comprise a network (not shown) participating in a distributed file system (DFS), such as IPFS. As a further example, analyses and reporting functions, and/or other information associated with one or more of an analysis component (not shown), marketing component (not shown), rewards component (not shown), and so on, without limitation, can also be provided by associated systems such as CRM platforms, MIS platforms, and/or the like associated with data safe or user data safe 112.

In addition, as previously described, one or more intermediaries (e.g., any of a number of MIS providers, e-commerce solution providers, and so on, etc.) acting on behalf one or more of user 102, one or more data consumer(s) 106, third parties and networks 2128, can provide subsets of functionality such as described above regarding data safe or user data safe 112. In yet another example, while one or more data consumer(s) 106 or computing systems or devices 2126 associated with one or more data consumer(s) 106 can be capable of facilitating functions as previously described, one or more data consumer(s) 106 or computing systems or devices 2126 associated with one or more data consumer(s) 106 could also be functionally limited resulting in an inability to authenticate one or more data consumer(s) 106 or verify that access is authorized (e.g., verifying fulfillment of a specified authentication requirement) in embodiments that employ such techniques. Accordingly, computing environment 2100 can comprise such further components (not shown) (e.g., authentication, authorization and accounting (AAA) servers, e-commerce servers, database servers, application servers, etc.) in communication with one or more of data safe or user data safe 112, computing systems or devices 2126 associated with one or more data consumer(s)

106, computing systems or devices 2128 associated with third parties and networks 2128, and/or user 102 to accomplish the desired functions, without limitation.

Figure 22:
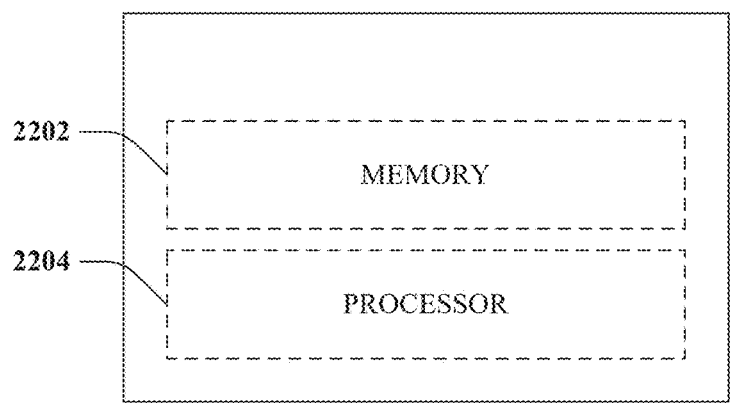
FIG. 22 depicts an exemplary non-limiting device or system suitable for performing various aspects of the disclosed subject matter.

FIG. 22 depicts an exemplary non-limiting device or system suitable for performing various aspects of the disclosed subject matter. For example, FIG. 22 depicts an exemplary non-limiting device or system 2200 suitable for performing various aspects of the disclosed subject matter. The device or system 2200 can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, exemplary non-limiting device or system 2200 can comprise exemplary devices and/or systems described above regarding FIGS. 1-20, or as further described below regarding FIGS. 23-26, for example, or portions or combinations thereof.

Accordingly, device or system 2200 can include a memory 2202 that retains various instructions with respect to facilitating various operations, for example, such as: storing (e.g., via device or system 2000, 2200, 2300, portions thereof, etc.) personal information (PI) associated with a user (e.g., user 102) in a distributed file system (DFS); creating (e.g., via device or system 2000, 2200, 2300, portions thereof, etc.) a number of block chains of personal information (PI), based on a determined category of use (CI) of each of the number of block chains; transmitting (e.g., via device or system 2000, 2200, 2300, portions thereof, etc.) an authorization (e.g., exemplary response 1202) to access a set of the number of block chains based on the determined category of use (CI) associated with a request for authorization (e.g., exemplary request 1104); storing (e.g., via device or system 2000, 2200, 2300, portions thereof, etc.) the personal information (PI) in inter-planetary file system (IPFS); encrypting (e.g., via device or system 2000, 2200, 2300, portions thereof, etc.) a number of a cryptographic hash of a prior block (e.g., immediately prior subsequent block 1004, root block 1006) of personal information (PI) in the one or more block chain, a link to the prior block (e.g., immediately prior subsequent block 1004, root block 1006) of personal information (PI) in the one or more block chain stored in the DFS, a verifying entity associated with the personal information (PI), a digital signature associated with the verifying entity, information associated with an encryption key or decryption key, or other authorization information (OAI) associated with the set of the number of block chains; encrypting (e.g., via device or system 2000, 2200, 2300, portions thereof, etc.) the personal information (PI) with supplemental information (SI) to facilitate one or more of creation of one or more block chain of the number of block chains or determining an applicability status of the request for authorization (e.g., exemplary request 1104); encrypting (e.g., via device or system 2000, 2200, 2300, portions thereof, etc.) an encrypted link to the prior block (e.g., immediately prior subsequent block 1004, root block 1006) of personal information (PI) in the one or more block chain; encrypting (e.g., via device or system 2000, 2200, 2300, portions thereof, etc.) one or more term of use determined by the user (e.g., user 102); determining (e.g., via device or system 2000, 2200, 2300, portions thereof, etc.) the one or more term of use, comprising one or more of an expiration term for one or more of the authorization (e.g., exemplary response 1202) or the personal information (PI), a validity term associated with the personal information (PI), one or more of a payee or a requested fee associated with the one or more of the authorization (e.g., exemplary response 1202) or the personal information (PI), one or more of a transmission limit or a storage limit associated with the one or more of the authorization (e.g., exemplary response 1202) or the personal information (PI), or a restriction associated with the one or more of the authorization (e.g., exemplary response 1202) or the personal information (PI) on a third party; determining (e.g., via device or system 2000, 2200, 2300, portions thereof, etc.) the one or more term of use, comprising one or more of an expiration term for one or more of the authorization (e.g., exemplary response 1202) or the personal information (PI), a validity term associated with the personal information (PI), one or more of a payee or a requested fee associated with the one or more of the authorization (e.g., exemplary response 1202) or the personal information (PI), one or more of a transmission limit or a storage limit associated with the one or more of the authorization (e.g., exemplary response 1202) or the personal information (PI), or a restriction associated with the one or more of the authorization (e.g., exemplary response 1202) or the personal information (PI) on a third party; determining (e.g., via device or system 2000, 2200, 2300, portions thereof, etc.) whether the personal information (PI) is personally identifying information or other personal information (PI), wherein the personally identifying information is defined as information or combinations of information that resolve to a unique user (e.g., user 102), meeting or exceeding a predetermined threshold confidence level, and wherein the other personal information (PI) is defined as other information or combinations of other information that does not resolve to the unique user (e.g., user 102), by failing to meet or exceed the predetermined threshold confidence level, and creating the number of block chains based on at least the personally identifying information; and so on, as further described herein, regarding FIGS. 5-14.

In other non-limiting implementations, device or system 2200 can include a memory 2202 that retains various instructions with respect to facilitating various operations, for example, such as: receiving (e.g., via device or system 2000, 2200, 2300, portions thereof, etc.) the request for authorization (e.g., exemplary request 1104); determining (e.g., via device or system 2000, 2200, 2300, portions thereof, etc.) from the request for authorization (e.g., exemplary request 1104) the determined category of use (CI); determining (e.g., via device or system 2000, 2200, 2300, portions thereof, etc.) whether one or more responsive block chain exists that is responsive to the determined category of use (CI) and the request for authorization (e.g., exemplary request 1104) in the set of the number of block chains; creating (e.g., via device or system 2000, 2200, 2300, portions thereof, etc.) the one or more responsive block chain if the one or more responsive block chain does not exist; transmitting the authorization (e.g., exemplary response 1202) comprising transmitting (e.g., via device or system 2000, 2200, 2300, portions thereof, etc.) one or more cryptographic hash associated with a last block (e.g., last or last subsequent block 1002) of the one or more responsive block chain and a link to the last block (e.g., last or last subsequent block 1002) of the one or more responsive block chain stored in the DFS; encrypting (e.g., via device or system 2000, 2200, 2300, portions thereof, etc.) the one or more cryptographic hash associated with the last block (e.g., last or last subsequent block 1002) of the one or more responsive block chain and the link to the last block (e.g., last or last subsequent block 1002) of the one or more responsive block chain with a requester encryption key; and so on, as further described herein, regarding FIGS. 5-14.

In other non-limiting implementations, device or system 2200 can include a memory 2202 that retains various instructions with respect to facilitating various operations, for example, such as: storing (e.g., via device or system 2000, 2200, 2300, portions thereof, etc.) machine-executable code associated with an offer, wherein the offer is contingent upon access to personal information (PI) stored in a set of a number of block chains, wherein the number of block chains are based on a determined category of use (CI) of personal information (PI) in each of the number of block chains; determining (e.g., via device or system 2000, 2200, 2300, portions thereof, etc.) the determined category of use (CI) of personal information (PI); transmitting a request for authorization (e.g., exemplary request 1104) to access personal information (PI) and the determined category of use (CI) associated with the request for authorization (e.g., exemplary request 1104); receiving (e.g., via device or system 2000, 2200, 2300, portions thereof, etc.) one or more cryptographic hash associated with a last block (e.g., last or last subsequent block 1002) of one or more block chain and a link to the last block (e.g., last or last subsequent block 1002) of the one or more block chain stored in a distributed file system (DFS); receiving (e.g., via device or system 2000, 2200, 2300, portions thereof, etc.) an encrypted response and decrypting (e.g., via device or system 2000, 2200, 2300, portions thereof, etc.) the encrypted response comprising the last block (e.g., last or last subsequent block 1002) of one or more block chain and the link to the last block (e.g., last or last subsequent block 1002) of the one or more block chain stored in a distributed file system; determining (e.g., via device or system 2000, 2200, 2300, portions thereof, etc.) that the one or more block chain does not comprise one or more responsive block chain responsive to the offer; transmitting (e.g., via device or system 2000, 2200, 2300, portions thereof, etc.) a follow-up request (e.g., exemplary request 1104) for additional authorization to access personal information (PI); determining (e.g., via device or system 2000, 2200, 2300, portions thereof, etc.) that the one or more block chain comprises the one or more responsive block chain comprising personal information (PI) responsive to the offer; determining (e.g., via device or system 2000, 2200, 2300, portions thereof, etc.) based on the offer, a number of one or more data requirements associated with personal information (PI), one or more contract requirement associated with the offer, one or more success action defined by the offer, or one or more failure action defined by the offer; and so on, as further described herein, regarding FIGS. 5-19.

In other non-limiting implementations, device or system 2200 can include a memory 2202 that retains various instructions with respect to facilitating various operations, for example, such as: executing (e.g., via device or system 2000, 2200, 2300, portions thereof, etc.) based on the offer, one or more of the one or more success action defined by the offer or the one or more failure action defined by the offer; comparing (e.g., via device or system 2000, 2200, 2300, portions thereof, etc.) the one or more responsive block chain comprising personal information (PI) to information associated with the offer; determining (e.g., via device or system 2000, 2200, 2300, portions thereof, etc.) that one or more of the one or more data requirement associated with personal information (PI) or the one or more contract requirement associated with the offer is not satisfied by the one or more responsive block chain comprising personal information (PI); transmitting (e.g., via device or system 2000, 2200, 2300, portions thereof, etc.) the follow-up request (e.g., exemplary request 1104) for additional authorization to access personal information (PI); determining (e.g., via device or system 2000, 2200, 2300, portions thereof, etc.) that the one or more data requirement associated with personal information (PI) and the one or more contract requirement associated with the offer are satisfied by the one or more responsive block chain comprising personal information (PI); determining (e.g., via device or system 2000, 2200, 2300, portions thereof, etc.) that one or more of personal information (PI) comprising personally identifying information or other personal information (PI) satisfies the one or more data requirement associated with personal information (PI), wherein the personally identifying information is defined as information or combinations of information that resolve to a unique user (e.g., user 102), meeting or exceeding a predetermined threshold confidence level, and wherein the other personal information (PI) is defined as other information or combinations of other information that does not resolve to the unique user (e.g., user 102), by failing to meet or exceed the predetermined threshold confidence level, and wherein the one or more block chain is based on at least the personally identifying information; retrieving (e.g., via device or system 2000, 2200, 2300, portions thereof, etc.) the last block (e.g., last or last subsequent block 1002) of the one or more block chain via link to the last block (e.g., last or last subsequent block 1002) of the one or more block chain stored in the DFS; determining (e.g., via device or system 2000, 2200, 2300, portions thereof, etc.) other authorization information (OAI) associated with the one or more block chain; processing (e.g., via device or system 2000, 2200, 2300, portions thereof, etc.) the one or more block chain to determine personal information (PI); and so on, as further described herein, regarding FIGS. 5-19.

In still further non-limiting implementations, device or system 2200 can include a memory 2202 that retains various instructions with respect to facilitating various operations, for example, such as: determining (e.g., via device or system 2000, 2200, 2300, portions thereof, etc.) a number of a cryptographic hash of a prior block (e.g., immediately prior subsequent block 1004, root block 1006) of personal information (PI) associated with the one or more block chain, a link to the prior block (e.g., immediately prior subsequent block 1004, root block 1006) of personal information (PI) associated with the one or more block chain stored in the DFS, a verifying entity associated with the personal information (PI), a digital signature associated with the verifying entity, or information associated with an encryption key or decryption key; determining (e.g., via device or system 2000, 2200, 2300, portions thereof, etc.) that one or more limitation associated with the other authorization information (OAI) specified in the one or more block chain is satisfied; executing (e.g., via device or system 2000, 2200, 2300, portions thereof, etc.) machine-executable code associated with the offer and defined by the one or more limitation associated with the other authorization information (OAI) comprising one or more term of use associated with the personal information (PI), including one or more of an expiration term for one or more of the authorization or the personal information (PI), a validity term associated with the personal information (PI), one or more of a payee or a requested fee associated with the one or more of the authorization or the personal information (PI), one or more of a transmission limit or a storage limit associated with the one or more of the authorization or the personal information (PI), or a restriction associated with the one or more of the authorization or the personal information (PI) on a third party; and so on, as further described herein, regarding FIGS. 5-19.

The above example instructions and other suitable instructions for functionalities as described herein for example, regarding FIGS. 1-21, etc., can be retained within memory 2202, and a processor 2204 can be utilized in connection with executing the instructions.

Figure 23:
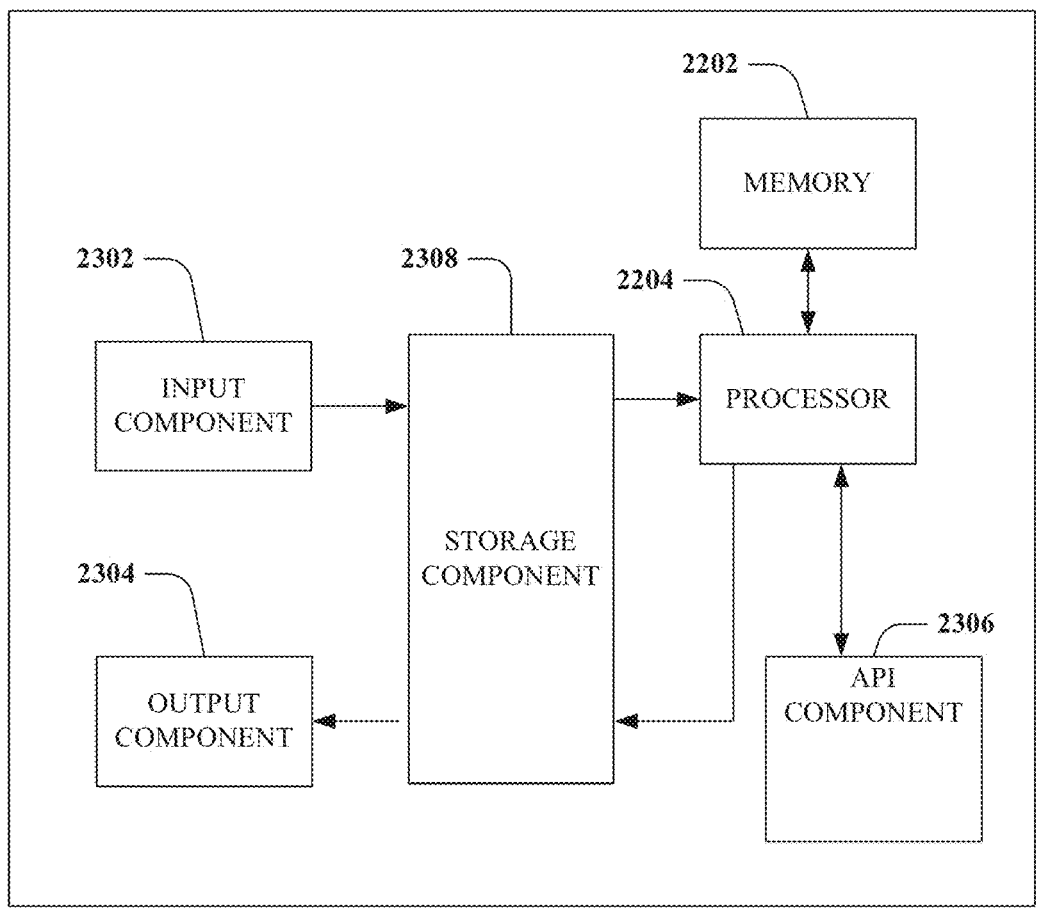
FIG. 23 illustrates an exemplary non-limiting device or system suitable for performing various aspects of the disclosed subject matter

FIG. 23 illustrates an exemplary non-limiting system or device 2300 suitable for performing various aspects of the disclosed subject matter. As an illustrative example, exemplary non-limiting device or system 2300 can comprise exemplary devices or systems of FIGS. 1-22, as described above, or portions thereof. System or device 2300 can comprise an input component 2302 that can receive data or signals, and performs typical actions thereon (e.g., transmits to storage component 2308) the received data or signal. A storage component 2308 can store the received data or signal, as described above, for example, regarding storage component 2020, memory 2202, etc., for subsequent processing or can provide it to a API component 2306, or a processor (e.g., one or more host processors 2018, 2204, etc.), via a memory (e.g., memory 2202, etc.) over a suitable communications bus or otherwise, or to the output component 2304.

Processor 2204 can be a processor dedicated to analyzing and performing functions on information received by input component 2302 and/or generating information for transmission by an output component 2304. Processor 2204 can be a processor that controls one or more portions of system or device 2300, and/or a processor that analyzes information received by input component 2302, generates information for transmission by output component 2304, and performs various functionalities associated API component 2306. API component 2306 can include various algorithms and routines to facilitate communication according specified network protocols and coding algorithms.

While API component 2306 is shown external to the Processor 2204 and memory 2202, it is to be understood that API component 2306 can include code or instructions stored in storage component 2308, storage component 2020, memory 2202, etc., and/or subsequently retained in memory 2202 for execution by Processor 2204. It can be understood that various routines performed by system or device 2300 can utilize artificial intelligence based methods in connection with performing inference and/or probabilistic determinations and/or statistical-based determinations in connection with various aspects of the disclosed subject matter.

System or device 2300 can additionally comprise a memory (e.g., memory 2202, etc.) that is operatively coupled to Processor 2204 and that stores information such as described above, parameters, information, and the like, wherein such information can be employed in connection with implementing various aspects as described herein. memory 2202 can additionally store received data and/or information (e.g., data and/or information associated with data safe or user data safe 112, etc.), as well as software routines and/or instructions for functionality as described above in reference to FIGS. 1-20, etc., for example.

As an illustration of a non-limiting implementation of the disclosed subject matter, an exemplary system or device 2300 can be configured or adapted to provide various functionality characterized by a device associated with user 102 (e.g., device 2110, etc.). For example, FIG. 21 describes device 2110, associated with user 102, which can comprise an appropriately configured application, or app (e.g., appropriately configured for a specific device, etc.), such as app 2108.

Referring again to FIG. 23, an exemplary system or device 2300 can comprise means for storing (e.g., via device or system 2000, 2200, 2300, portions thereof, etc.) personal information (PI) associated with a user (e.g., user 102) in a distributed file system (DFS), means for creating (e.g., via device or system 2000, 2200, 2300, portions thereof, etc.) a number of block chains of personal information (PI), based on a determined category of use (CI) of each of the number of block chains, and means for transmitting (e.g., via device or system 2000, 2200, 2300, portions thereof, etc.) an authorization (e.g., exemplary response 1202 to access a set of the number of block chains based on the determined category of use (CI) associated with a request for authorization (e.g., exemplary request 1104), as further described herein, for example, regarding FIGS. 5-20.

For instance, in a non-limiting aspect, exemplary means for storing the personal information (PI) can be associated with means for encrypting (e.g., via device or system 2000, 2200, 2300, portions thereof, etc.) the personal information (PI) with supplemental information (SI) to facilitate one or more of creation of one or more block chain of the number of block chains or determining an applicability status of the request for authorization (e.g., exemplary request 1104), as further described herein, for example, regarding FIGS. 5-20. In a further non-limiting aspect, exemplary means for storing the personal information (PI) in DFS can comprise means for storing (e.g., via device or system 2000, 2200, 2300, portions thereof, etc.) the personal information (PI) in inter-planetary file system (IPFS), as further described herein, for example, regarding FIGS. 5-20.

In yet another non-limiting aspect, exemplary means for encrypting the personal information (PI) with supplemental information (SI) can comprise means for encrypting (e.g., via device or system 2000, 2200, 2300, portions thereof, etc.) a number of a cryptographic hash of a prior block (e.g., immediately prior subsequent block 1004, root block 1006) of personal information (PI) in the one or more block chain, a link to the prior block (e.g., immediately prior subsequent block 1004, root block 1006) of personal information (PI) in the one or more block chain stored in the DFS, a verifying entity associated with the personal information (PI), a digital signature associated with the verifying entity, information associated with an encryption key or decryption key, or other authorization information (OAI) associated with the set of the number of block chains, as further described herein, for example, regarding FIGS. 5-20. For instance, in a non-limiting aspect, exemplary means for encrypting the link to the prior block (e.g., immediately prior subsequent block 1004, root block 1006) of personal information (PI) in the one or more block chain can comprise means for encrypting (e.g., via device or system 2000, 2200, 2300, portions thereof, etc.) an encrypted link to the prior block (e.g., immediately prior subsequent block 1004, root block 1006) of personal information (PI) in the one or more block chain, as further described herein, for example, regarding FIGS. 5-20. In a further non-limiting aspect, exemplary means for encrypting the link to the prior block (e.g., immediately prior subsequent block 1004, root block 1006) of personal information (PI) in the one or more block chain can comprise means for encrypting (e.g., via device or system 2000, 2200, 2300, portions thereof, etc.) an encrypted link to the prior block (e.g., immediately prior subsequent block 1004, root block 1006) of personal information (PI) in the one or more block chain, as further described herein, for example, regarding FIGS. 5-20. As a non-limiting example, exemplary means for encrypting the other authorization information (OAI) associated with the set of the number of block chains can comprise means for encrypting (e.g., via device or system 2000, 2200, 2300, portions thereof, etc.) one or more term of use determined by the user (e.g., user 102), in another non-limiting aspect as further described herein, for example, regarding FIGS. 5-20.

In further non-limiting implementations, exemplary system or device 2300 can also comprise means for determining (e.g., via device or system 2000, 2200, 2300, portions thereof, etc.) the one or more term of use, comprising one or more of an expiration term for one or more of the authorization (e.g., exemplary response 1202 or the personal information (PI), a validity term associated with the personal information (PI), one or more of a payee or a requested fee associated with the one or more of the authorization (e.g., exemplary response 1202 or the personal information (PI), one or more of a transmission limit or a storage limit associated with the one or more of the authorization (e.g., exemplary response 1202 or the personal information (PI), or a restriction associated with the one or more of the authorization (e.g., exemplary response 1202 or the personal information (PI) on a third party, as further described herein, for example, regarding FIGS. 5-20. In addition, in another non-limiting aspect, exemplary means for creating the number of block chains of personal information (PI) can comprise means for determining (e.g., via device or system 2000, 2200, 2300, portions thereof, etc.) whether the personal information (PI) can be personally identifying information or other personal information (PI), wherein the personally identifying information can be defined as information or combinations of information that resolve to a unique user (e.g., user 102), meeting or exceeding a predetermined threshold confidence level, and wherein the other personal information (PI) can be defined as other information or combinations of other information that does not resolve to the unique user (e.g., user 102), by failing to meet or exceed the predetermined threshold confidence level, and means for creating the number of block chains based on at least the personally identifying information, as further described herein, for example, regarding FIGS. 5-20.

In further non-limiting implementations, exemplary system or device 2300 can also comprise means for receiving (e.g., via device or system 2000, 2200, 2300, portions thereof, etc.) the request for authorization (e.g., exemplary request 1104), means for determining (e.g., via device or system 2000, 2200, 2300, portions thereof, etc.) from the request for authorization (e.g., exemplary request 1104) the determined category of use (CI), means for determining (e.g., via device or system 2000, 2200, 2300, portions thereof, etc.) whether one or more responsive block chain exists that can be responsive to the determined category of use (CI) and the request for authorization (e.g., exemplary request 1104) in the set of the number of block chains, means for creating (e.g., via device or system 2000, 2200, 2300, portions thereof, etc.) the one or more responsive block chain if the one or more responsive block chain does not exist, and means for transmitting the authorization (e.g., exemplary response 1202 can comprise means for transmitting (e.g., via device or system 2000, 2200, 2300, portions thereof, etc.) one or more cryptographic hash associated with a last block (e.g., last or last subsequent block 1002) of the one or more responsive block chain and a link to the last block (e.g., last or last subsequent block 1002) of the one or more responsive block chain stored in the DFS, as further described herein, for example, regarding FIGS. 5-20.

For instance, in a non-limiting aspect, exemplary means for transmitting the one or more cryptographic hash associated with the last block (e.g., last or last subsequent block 1002) of the one or more responsive block chain and the link to the last block (e.g., last or last subsequent block 1002) of the one or more responsive block chain stored in the DFS can be associated with means for encrypting (e.g., via device or system 2000, 2200, 2300, portions thereof, etc.) the one or more cryptographic hash associated with the last block (e.g., last or last subsequent block 1002) of the one or more responsive block chain and the link to the last block (e.g., last or last subsequent block 1002) of the one or more responsive block chain with a requester encryption key, as further described herein, for example, regarding FIGS. 5-20.

It can be appreciated that exemplary system or device 2300 can be configured and/or adapted in a similar fashion to provide various other functionalities as described herein.

In further non-limiting implementations, exemplary system or device 2300 can also comprise means for storing (e.g., via device or system 2000, 2200, 2300, portions thereof, etc.) machine-executable code associated with an offer, wherein the offer can be contingent upon access to personal information (PI) stored in a set of a number of block chains, wherein the number of block chains are based on a determined category of use (CI) of personal information (PI) in each of the number of block chains, means for determining (e.g., via device or system 2000, 2200, 2300, portions thereof, etc.) the determined category of use (CI) of personal information (PI), means for transmitting a request for authorization (e.g., exemplary request 1104) to access personal information (PI) and the determined category of use (CI) associated with the request for authorization (e.g., exemplary request 1104), and means for receiving (e.g., via device or system 2000, 2200, 2300, portions thereof, etc.) one or more cryptographic hash associated with a last block (e.g., last or last subsequent block 1002) of one or more block chain and a link to the last block (e.g., last or last subsequent block 1002) of the one or more block chain stored in a distributed file system (DFS), as further described herein, for example, regarding FIGS. 5-20.

For instance, in a non-limiting aspect, exemplary means for receiving can comprise means for receiving (e.g., via device or system 2000, 2200, 2300, portions thereof, etc.) an encrypted response and decrypting (e.g., via device or system 2000, 2200, 2300, portions thereof, etc.) the encrypted response comprising the last block (e.g., last or last subsequent block 1002) of one or more block chain and the link to the last block (e.g., last or last subsequent block 1002) of the one or more block chain stored in a distributed file system, as further described herein, for example, regarding FIGS. 5-20.

In yet another non-limiting implementation, exemplary system or device 2300 can comprise means for determining (e.g., via device or system 2000, 2200, 2300, portions thereof, etc.) that the one or more block chain does not comprise one or more responsive block chain responsive to the offer and means for transmitting (e.g., via device or system 2000, 2200, 2300, portions thereof, etc.) a follow-up request (e.g., exemplary request 1104) for additional authorization (e.g., exemplary response 1202) to access personal information (PI), as further described herein, for example, regarding FIGS. 5-20.

In still another non-limiting implementation, exemplary system or device 2300 can comprise means for determining (e.g., via device or system 2000, 2200, 2300, portions thereof, etc.) that the one or more block chain can comprise the one or more responsive block chain comprising personal information (PI) responsive to the offer, as further described herein, for example, regarding FIGS. 5-20. For instance, in another non-limiting implementation, exemplary system or device 2300 can comprise means for determining (e.g., via device or system 2000, 2200, 2300, portions thereof, etc.) based on the offer, a number of one or more data requirements associated with personal information (PI), one or more contract requirement associated with the offer, one or more success action defined by the offer, or one or more failure action defined by the offer, as further described herein, for example, regarding FIGS. 5-20. In addition, in another non-limiting implementation, exemplary system or device 2300 can comprise means for executing (e.g., via device or system 2000, 2200, 2300, portions thereof, etc.) based on the offer, one or more of the one or more success action defined by the offer or the one or more failure action defined by the offer, as further described herein, for example, regarding FIGS. 5-20.

In yet another non-limiting implementation, exemplary system or device 2300 can comprise means for comparing (e.g., via device or system 2000, 2200, 2300, portions thereof, etc.) the one or more responsive block chain comprising personal information (PI) to information associated with the offer, as further described herein, for example, regarding FIGS. 5-20.

In a further non-limiting implementation, exemplary system or device 2300 can comprise means for determining (e.g., via device or system 2000, 2200, 2300, portions thereof, etc.) that one or more of the one or more data requirement associated with personal information (PI) or the one or more contract requirement associated with the offer can be not satisfied by the one or more responsive block chain comprising personal information (PI), and means for transmitting (e.g., via device or system 2000, 2200, 2300, portions thereof, etc.) the follow-up request for additional authorization to access personal information (PI), as further described herein, for example, regarding FIGS. 5-20. For example, in another non-limiting implementation, exemplary system or device 2300 can comprise means for determining (e.g., via device or system 2000, 2200, 2300, portions thereof, etc.) that the one or more data requirement associated with personal information (PI) and the one or more contract requirement associated with the offer are satisfied by the one or more responsive block chain comprising personal information (PI), as further described herein, for example, regarding FIGS. 5-20. For instance, exemplary means for determining that the one or more data requirement associated with personal information (PI) can be satisfied can comprise means for determining (e.g., via device or system 2000, 2200, 2300, portions thereof, etc.) that one or more of personal information (PI) comprising personally identifying information or other personal information (PI) satisfies the one or more data requirement associated with personal information (PI), wherein the personally identifying information can be defined as information or combinations of information that resolve to a unique user (e.g., user 102), meeting or exceeding a predetermined threshold confidence level, and wherein the other personal information (PI) can be defined as other information or combinations of other information that does not resolve to the unique user (e.g., user 102), by failing to meet or exceed the predetermined threshold confidence level, and wherein the one or more block chain can be based on at least the personally identifying information, as further described herein, for example, regarding FIGS. 5-20.

In yet another non-limiting implementation, exemplary system or device 2300 can comprise means for retrieving (e.g., via device or system 2000, 2200, 2300, portions thereof, etc.) the last block (e.g., last or last subsequent block 1002) of the one or more block chain via link to the last block (e.g., last or last subsequent block 1002) of the one or more block chain stored in the DFS, means for determining (e.g., via device or system 2000, 2200, 2300, portions thereof, etc.) other authorization information (OAI) associated with the one or more block chain, and means for processing (e.g., via device or system 2000, 2200, 2300, portions thereof, etc.) the one or more block chain to determine personal information (PI), wherein exemplary means for processing the one or more block chain to determine personal information (PI) can comprise means for determining (e.g., via device or system 2000, 2200, 2300, portions thereof, etc.) a number of a cryptographic hash of a prior block (e.g., immediately prior subsequent block 1004, root block 1006) of personal information (PI) associated with the one or more block chain, a link to the prior block (e.g., immediately prior subsequent block 1004, root block 1006) of personal information (PI) associated with the one or more block chain stored in the DFS, a verifying entity associated with the personal information (PI), a digital signature associated with the verifying entity, or information associated with an encryption key or decryption key, as further described herein, for example, regarding FIGS. 5-20.

In still further non-limiting implementations, exemplary system or device 2300 can comprise means for determining (e.g., via device or system 2000, 2200, 2300, portions thereof, etc.) that one or more limitation associated with the other authorization information (OAI) specified in the one or more block chain can be satisfied, as further described herein, for example, regarding FIGS. 5-20. For instance, in a non-limiting aspect, exemplary means for determining that the one or more limitation associated with the other authorization information (OAI) specified can be satisfied can comprise means for executing (e.g., via device or system 2000, 2200, 2300, portions thereof, etc.) machine-executable code associated with the offer and defined by the one or more limitation associated with the other authorization information (OAI) comprising one or more term of use associated with the personal information (PI), including one or more of an expiration term for one or more of the authorization or the personal information (PI), a validity term associated with the personal information (PI), one or more of a payee or a requested fee associated with the one or more of the authorization or the personal information (PI), one or more of a transmission limit or a storage limit associated with the one or more of the authorization (e.g., exemplary response 1202 or the personal information (PI), or a restriction associated with the one or more of the authorization (e.g., exemplary response 1202 or the personal information (PI) on a third party, as further described herein, for example, regarding FIGS. 5-20.

It can be appreciated that exemplary system or device 2300 can be configured and/or adapted in a similar fashion to provide various other functionalities as described herein.

It will be understood that storage component 2308, storage component 2020, memory 2202, and/or any combination thereof as described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 2202 is intended to comprise, without being limited to, these and/or any other suitable types of memory, including processor registers and the like. In addition, by way of illustration and not limitation, storage component 2308 and/or storage component 2020, can include conventional storage media as in known in the art (e.g., hard disk drive, solid state disk (SSD), etc.).

It can be understood that various techniques described herein may be implemented in connection with hardware or software or, where appropriate, with a combination of both. As used herein, the terms "device," "component," "system" and the like are likewise intended to refer to a computer-related entity, either hardware, a combination of hardware and software, software, or software in execution. For example, a "device," "component," subcomponent, "system" portions thereof, and so on, may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

It can be further understood that while a brief overview of exemplary systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

As described above, regarding FIGS. 1-20, etc., for example, in exemplary implementations of the disclosed subject matter, a user interface such as a GUI can be provided, for example to facilitate interactions with data safe or user data safe 112 according to various aspects of the disclosed subject matter, among other related functions. In addition, additional embodiments of the disclosed subject matter can provide computer-executable components that can be stored on a tangible computer readable storage medium (e.g., storage component 2020, storage component 2308, memory 2202, etc.), and that, in response to execution by a computing device (e.g., one or more of host processors 2018, processor 2204, etc.), can cause the computing device to display information (e.g., on the computing device, on a remote computing device over a network, etc), for example, such as via a GUI.

For example, FIG. 23 illustrates an exemplary non-limiting block diagram depicting tangible computer readable storage medium, such as storage component 2308 (e.g., storage component 2020, etc.), that can comprise computer-executable components and that, in response to execution by a computing device (e.g., one or more of host processors 1010, processor 1204, etc.), can cause the computing device to display information (e.g., on the computing device, on a remote computing device over a network, etc). As a non-limiting example, the computer-executable components of the tangible computer readable storage medium can comprise an appropriately configured application, or app, (e.g., appropriately configured for a specific device, etc.) such as described above for app 2108 in FIG. 21, for instance. In another non-limiting example, the computer-executable components of the tangible computer readable storage medium can comprise any of the components (e.g., communication components, user interface component 2004, system management layer 2016, and/or portions thereof, etc.) described herein regarding FIGS. 1-20, for instance. In any event, the computer-executable components of the tangible computer readable storage medium can provide a user interface to facilitate interactions with data safe or user data safe 112, as described herein.

Exemplary Networked and Distributed Environments

One of ordinary skill in the art can appreciate that the various embodiments of the disclosed subject matter and related systems, devices, and/or methods described herein can be implemented in connection with any computer or other client or server device, which can be deployed as part of a communications system, a computer network, and/or in a distributed computing environment, and can be connected to any kind of data store. In this regard, the various embodiments described herein can be implemented in any computer system or environment having any number of memory or storage units, and any number of applications and processes occurring across any number of storage units or volumes, which may be used in connection with communication systems using the techniques, systems, and methods in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving, storing, and/or transmitting information in connection with remote or local services and processes.

Distributed computing provides sharing of computer resources and services by communicative exchange among computing devices and systems. These resources and services can include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices can have applications, objects or resources that may utilize disclosed and related systems, devices, and/or methods as described for various embodiments of the subject disclosure.

Figure 24:
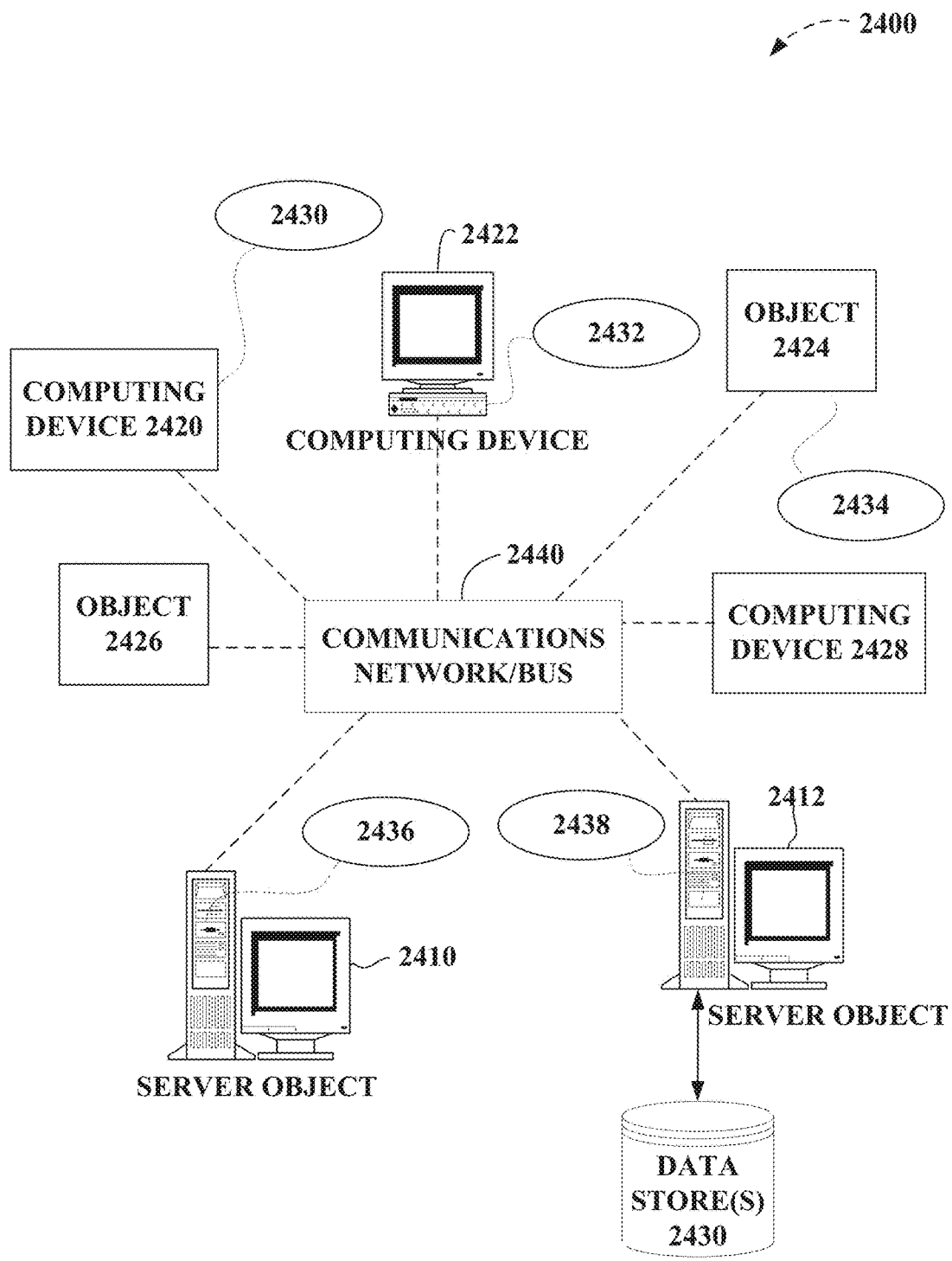
FIG. 24 is a block diagram representing exemplary non-limiting networked environments in which various embodiments described herein can be implemented.

FIG. 24 provides a schematic diagram of an exemplary networked or distributed computing environment. The distributed computing environment comprises computing objects 2410, 2412, etc. and computing objects or devices 2420, 2422, 2424, 2426, 2428, etc., which may include programs, methods, data stores, programmable logic, etc., as represented by applications 2430, 2432, 2434, 2436, 2438. It can be understood that objects 2410, 2412, etc. and computing objects or devices 2420, 2422, 2424, 2426, 2428, etc. may comprise different devices, such as PDAs, audio/video devices, mobile phones, MP3 players, personal computers, laptops, etc.

Each object 2410, 2412, etc. and computing objects or devices 2420, 2422, 2424, 2426, 2428, etc. can communicate with one or more other objects 2410, 2412, etc. and computing objects or devices 2420, 2422, 2424, 2426, 2428, etc. by way of the communications network 2440, either directly or indirectly. Even though illustrated as a single element in FIG. 24, network 2440 may comprise other computing objects and computing devices that provide services to the system of FIG. 24, and/or may represent multiple interconnected networks, which are not shown. Each object 2410, 2412, etc. or 2420, 2422, 2424, 2426, 2428, etc. can also contain an application, such as applications 2430, 2432, 2434, 2436, 2438, that can make use of an API, or other object, software, firmware and/or hardware, suitable for communication with or implementation of disclosed and related systems, devices, methods, and/or functionality provided in accordance with various embodiments of the subject disclosure. Thus, although the physical environment depicted may show the connected devices as computers, such illustration is merely exemplary, and the physical environment may alternatively be depicted or described comprising various digital devices, any of which can employ a variety of wired and/or wireless services, software objects such as interfaces, COM objects, and the like.

There are a variety of systems, components, and network configurations that support distributed computing environments. For example, computing systems can be connected by wired or wireless systems, by local networks or widely distributed networks. Currently, many networks are coupled to the Internet, which can provide an infrastructure for widely distributed computing and can encompass many different networks, though any network infrastructure can be used for exemplary communications made incident to employing disclosed and related systems, devices, and/or methods as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 24, as a non-limiting example, computers 2420, 2422, 2424, 2426, 2428, etc. can be thought of as clients and computers 2410, 2412, etc. can be thought of as servers where servers 2410, 2412, etc. provide data services, such as receiving data from client computers 2420, 2422, 2424, 2426, 2428, etc., storing of data, processing of data, transmitting data to client computers 2420, 2422, 2424, 2426, 2428, etc., although any computer can be considered a client, a server, or both, depending on the circumstances. Any of these computing devices may be processing data, forming metadata, synchronizing data or requesting services or tasks that may implicate disclosed and related systems, devices, and/or methods as described herein for one or more embodiments.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to disclosed and related systems, devices, and/or methods can be provided standalone, or distributed across multiple computing devices or objects.

In a network environment in which the communications network/bus 2440 is the Internet, for example, the servers 2410, 2412, etc. can be Web servers with which the clients 2420, 2422, 2424, 2426, 2428, etc. communicate via any of a number of known protocols, such as the hypertext transfer protocol (HTTP). Servers 2410, 2412, etc. may also serve as clients 2420, 2422, 2424, 2426, 2428, etc., as may be characteristic of a distributed computing environment.

Exemplary Computing Device

Figure 25:
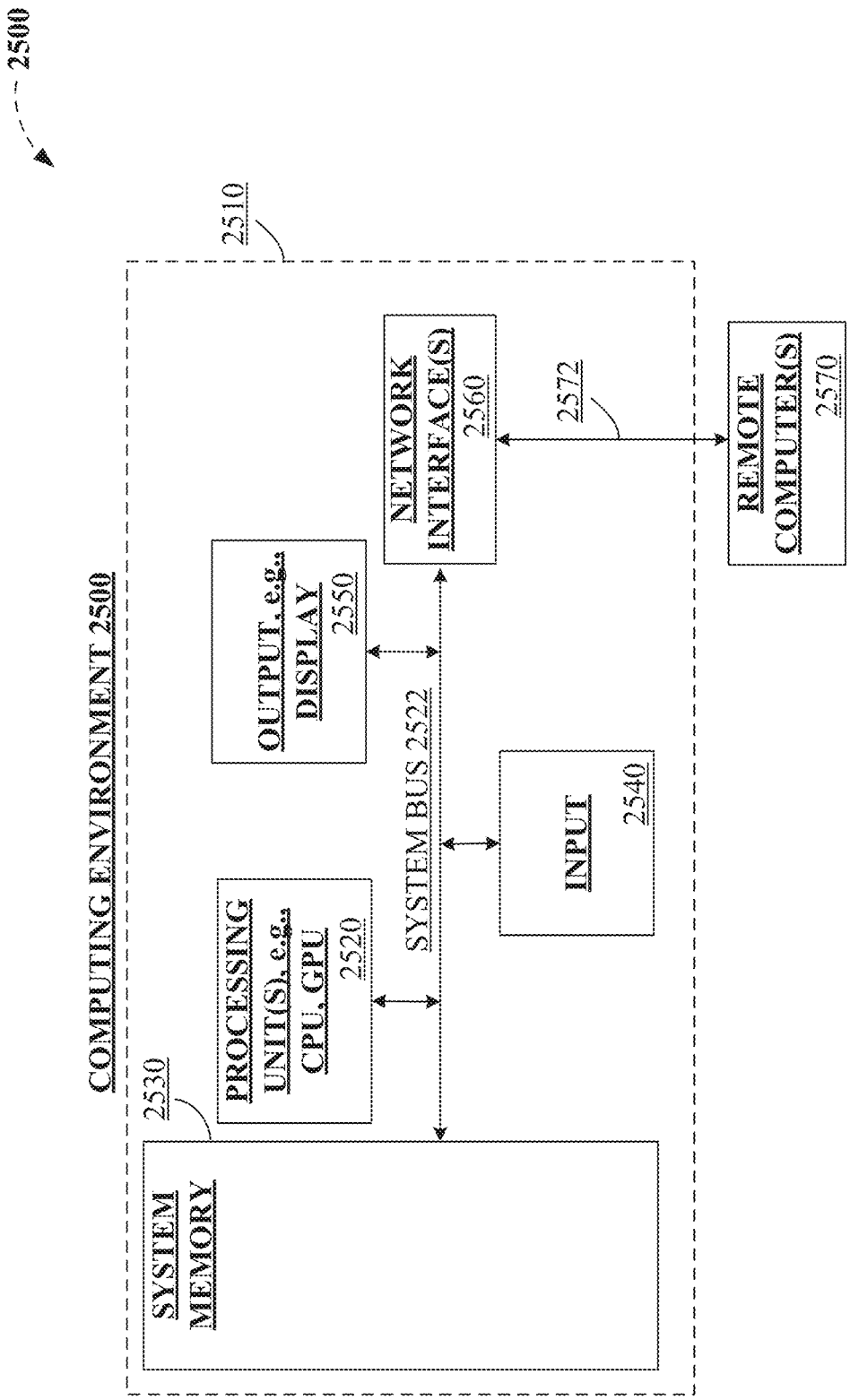
FIG. 25 is a block diagram representing an exemplary non-limiting computing system or operating environment in which one or more aspects of various embodiments described herein can be implemented.

As mentioned, advantageously, the techniques described herein can be applied to devices or systems where it is desirable to employ disclosed and related systems, devices, and/or methods. It should be understood, therefore, that handheld, portable and other computing devices and computing objects of all kinds are contemplated for use in connection with the various disclosed embodiments. Accordingly, the below general purpose remote computer described below in FIG. 25 is but one example of a computing device. Additionally, disclosed and related systems, devices, and/or methods can include one or more aspects of the below general purpose computer, such as display, storage, analysis, control, etc.

Although not required, embodiments can partly be implemented via an operating system, for use by a developer of services for a device or object, and/or included within application software that operates to perform one or more functional aspects of the various embodiments described herein. Software can be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 25 thus illustrates an example of a suitable computing system environment 2500 in which one or aspects of the embodiments described herein can be implemented, although as made clear above, the computing system environment 2500 is only one example of a suitable computing environment and is not intended to suggest any limitation as to scope of use or functionality. Neither should the computing environment 2500 be interpreted as having any dependency or requirement relating to any one or combination of components illustrated in the exemplary operating environment 2500.

With reference to FIG. 25, an exemplary remote device for implementing one or more embodiments includes a general purpose computing device in the form of a computer 2510. Components of computer 2510 can include, but are not limited to, a processing unit 2520, a system memory 2530, and a system bus 2522 that couples various system components including the system memory to the processing unit 2520.

Computer 2510 typically includes a variety of computer readable media and can be any available media that can be accessed by computer 2510. The system memory 2530 can include computer storage media in the form of volatile and/or nonvolatile memory such as read only memory (ROM) and/or random access memory (RAM). By way of example, and not limitation, memory 2530 can also include an operating system, application programs, other program modules, and program data.

A user can enter commands and information into the computer 2510 through input devices 2540. A monitor or other type of display device is also connected to the system bus 2522 via an interface, such as output interface 2550. In addition to a monitor, computers can also include other peripheral output devices such as speakers and a printer, which can be connected through output interface 2550.

The computer 2510 can operate in a networked or distributed environment using logical connections to one or more other remote computers, such as remote computer 2570. The remote computer 2570 can be a personal computer, a server, a router, a network PC, a peer device or other common network node, or any other remote media consumption or transmission device, and can include any or all of the elements described above relative to the computer 2510. The logical connections depicted in FIG. 25 include a network 2572, such local area network (LAN) or a wide area network (WAN), but can also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts can be applied to any network system and any computing device or system in which it is.

Also, there are multiple ways to implement the same or similar functionality, e.g., an appropriate API, tool kit, driver code, operating system, control, standalone or downloadable software object, etc. which enables applications and services to use disclosed and related systems, devices, methods, and/or functionality. Thus, embodiments herein are contemplated from the standpoint of an API (or other software object), as well as from a software or hardware object that implements one or more aspects of disclosed and related systems, devices, and/or methods as described herein. Thus, various embodiments described herein can have aspects that are wholly in hardware, partly in hardware and partly in software, as well as in software.

Exemplary Mobile Device

Figure 26:
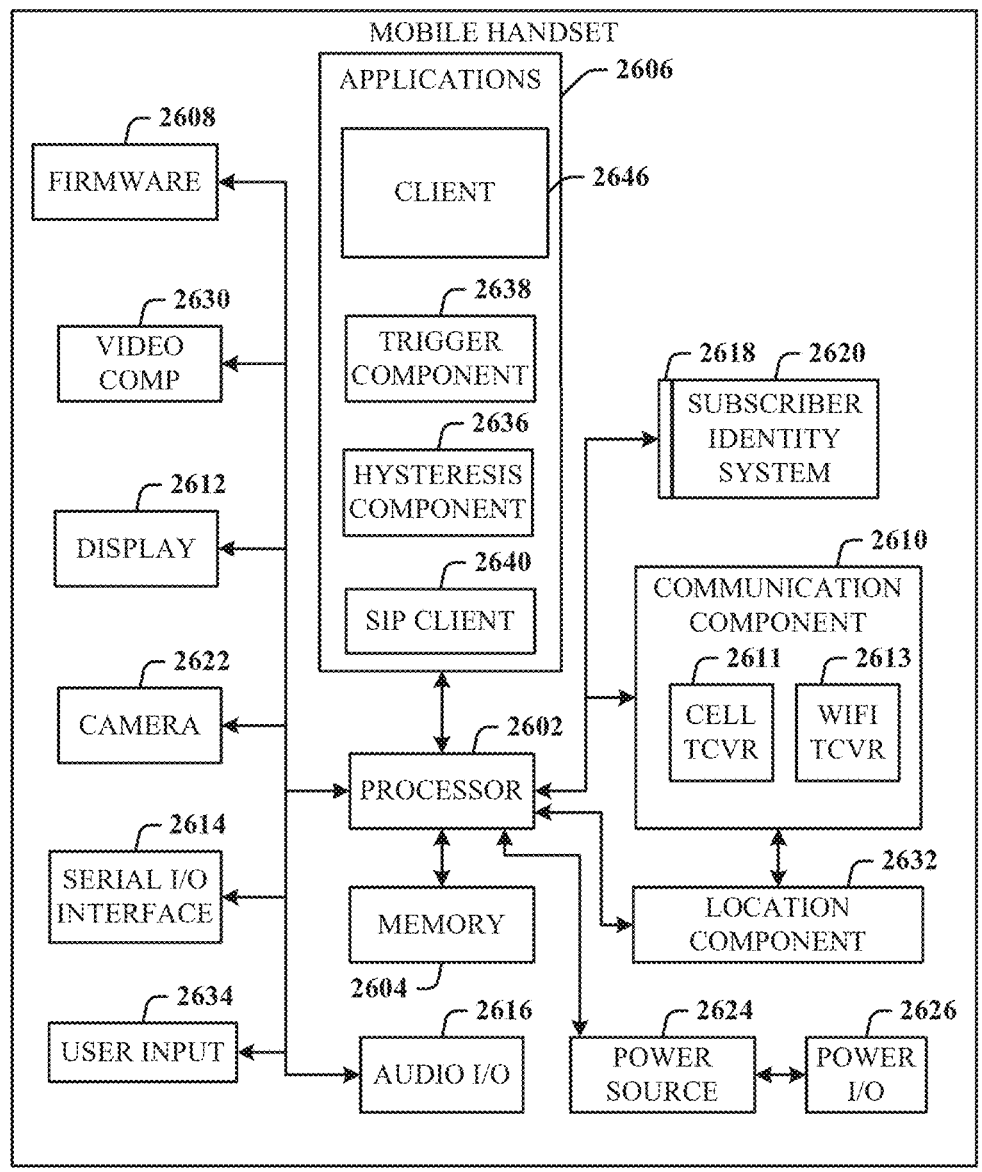
FIG. 26 illustrates a schematic diagram of an exemplary mobile device (e.g., a mobile handset) that can facilitate various non-limiting aspects of the disclosed subject matter in accordance with the embodiments described herein.

FIG. 26 depicts a schematic diagram of an exemplary mobile device 2600 (e.g., a mobile handset) that can facilitate various non-limiting aspects of the disclosed subject matter in accordance with the embodiments described herein. Although mobile handset 2600 is illustrated herein, it will be understood that other devices can be a mobile device, as described above regarding FIGS. 5, 15, 16, 20-24, for instance, and that the mobile handset 2600 is merely illustrated to provide context for the embodiments of the subject matter described herein. The following discussion is intended to provide a brief, general description of an example of a suitable environment 2600 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 2600 can include a processor 2602 for controlling and processing all onboard operations and functions. A memory 2604 interfaces to the processor 2602 for storage of data and one or more applications 2606 (e.g., communications applications such as browsers, apps, etc.). Other applications can support operation of communications and/or financial communications protocols. The applications 2606 can be stored in the memory 2604 and/or in a firmware 2608, and executed by the processor 2602 from either or both the memory 2604 or/and the firmware 2608. The firmware 2608 can also store startup code for execution in initializing the handset 2600. A communications component 2610 interfaces to the processor 2602 to facilitate wired/wireless communication with external systems, e.g., cellular networks, VoIP networks, and so on. Here, the communications component 2610 can also include a suitable cellular transceiver 2611 (e.g., a GSM transceiver) and/or an unlicensed transceiver 2613 (e.g., Wireless Fidelity (WiFi™), Worldwide Interoperability for Microwave Access (WiMax®)) for corresponding signal communications. The handset 2600 can be a device such as a cellular telephone, a PDA with mobile communications capabilities, and messaging-centric devices. The communications component 2610 also facilitates communications reception from terrestrial radio networks (e.g., broadcast), digital satellite radio networks, and Internet-based radio services networks.

The handset 2600 includes a display 2612 for displaying text, images, video, telephony functions (e.g., a Caller ID function), setup functions, and for user input. For example, the display 2612 can also be referred to as a "screen" that can accommodate the presentation of multimedia content (e.g., music metadata, messages, wallpaper, graphics, etc.). The display 2612 can also display videos and can facilitate the generation, editing and sharing of video quotes. A serial I/O interface 2614 is provided in communication with the processor 2602 to facilitate wired and/or wireless serial communications (e.g., Universal Serial Bus (USB), and/or Institute of Electrical and Electronics Engineers (IEEE) 2694) through a hardwire connection, and other serial input devices (e.g., a keyboard, keypad, and mouse). This supports updating and troubleshooting the handset 2600, for example. Audio capabilities are provided with an audio I/O component 2616, which can include a speaker for the output of audio signals related to, for example, indication that the user pressed the proper key or key combination to initiate the user feedback signal. The audio I/O component 2616 also facilitates the input of audio signals through a microphone to record data and/or telephony voice data, and for inputting voice signals for telephone conversations.

The handset 2600 can include a slot interface 2618 for accommodating a SIC (Subscriber Identity Component) in the form factor of a card Subscriber Identity Module (SIM) or universal SIM 2620, and interfacing the SIM card 2620 with the processor 2602. However, it is to be appreciated that the SIM card 2620 can be manufactured into the handset 2600, and updated by downloading data and software.

The handset 2600 can process Internet Protocol (IP) data traffic through the communication component 2610 to accommodate IP traffic from an IP network such as, for example, the Internet, a corporate intranet, a home network, a person area network, etc., through an ISP or broadband cable provider. Thus, VoIP traffic can be utilized by the handset 2600 and IP-based multimedia content can be received in either an encoded or a decoded format.

A video processing component 2622 (e.g., a camera and/or associated hardware, software, etc.) can be provided for decoding encoded multimedia content. The video processing component 2622 can aid in facilitating the generation and/or sharing of video. The handset 2600 also includes a power source 2624 in the form of batteries and/or an alternating current (AC) power subsystem, which power source 2624 can interface to an external power system or charging equipment (not shown) by a power input/output (I/O) component 2626.

The handset 2600 can also include a video component 2630 for processing video content received and, for recording and transmitting video content. For example, the video component 2630 can facilitate the generation, editing and sharing of video. A location-tracking component 2632 facilitates geographically locating the handset 2600. A user input component 2634 facilitates the user inputting data and/or making selections as previously described. The user input component 2634 can also facilitate selecting perspective recipients for fund transfer, entering amounts requested to be transferred, indicating account restrictions and/or limitations, as well as composing messages and other user input tasks as required by the context. The user input component 2634 can include such conventional input device technologies such as a keypad, keyboard, mouse, stylus pen, and/or touch screen, for example.

Referring again to the applications 2606, a hysteresis component 2636 facilitates the analysis and processing of hysteresis data, which is utilized to determine when to associate with an access point. A software trigger component 2638 can be provided that facilitates triggering of the hysteresis component 2638 when a WiFi™ transceiver 2613 detects the beacon of the access point. A SIP client 2640 enables the handset 2600 to support SIP protocols and register the subscriber with the SIP registrar server. The applications 2606 can also include a communications application or client 2646 that, among other possibilities, can facilitate user interface component functionality as described above.

The handset 2600, as indicated above related to the communications component 2610, includes an indoor network radio transceiver 2613 (e.g., WiFi™ transceiver). This function supports the indoor radio link, such as IEEE 802.11, for the dual-mode Global System for Mobile Communications (GSM) handset 2600. The handset 2600 can accommodate at least satellite radio services through a handset that can combine wireless voice and digital radio chipsets into a single handheld device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

In addition, the words "exemplary" and "non-limiting" are used herein to mean serving as an example, instance, or illustration. For the avoidance of doubt, the subject matter disclosed herein is not limited by such examples. Moreover, any aspect or design described herein as "an example," "an illustration," "exemplary" and/or "non-limiting" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements, as described above.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. In addition, one or more components can reside within a process and/or thread of execution and a component can be localized on one computer and/or distributed between two or more computers.

Systems described herein can be described with respect to interaction between several components. It can be understood that such systems and components can include those components or specified sub-components, some of the specified components or sub-components, or portions thereof, and/or additional components, and various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle component layers, such as a management layer, can be provided to communicatively couple to such sub-components in order to provide integrated functionality, as mentioned. Any components described herein can also interact with one or more other components not specifically described herein but generally known by those of skill in the art.

As mentioned, in view of the exemplary systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. Still further, multiple processing chips or multiple devices can share the performance of one or more functions described herein, and similarly, storage can be effected across a plurality of devices. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the systems, structures and/or devices, as well as the associated methods described herein have many applications in various aspects of the disclosed subject matter, and so on. Accordingly, the invention should not be limited to any single embodiment, but rather should be construed in breadth, spirit and scope in accordance with the appended claims.

What is claimed is:

1. A method, comprising:
    storing, by a device comprising a processor, personal information associated with a user in a distributed file system (DFS);
    creating, by the device, a plurality of block chains of personal information, based at least in part on a determined category of use of each of the plurality of block chains;
    wherein creating each of the plurality of block chains of personal information comprises creating a root block for each of the plurality of block chains of personal information;
    wherein the storing the personal information comprises encrypting, via the device, the personal information with supplemental information to facilitate at least one of creation of at least one block chain of the plurality of block chains or determining an applicability status of a request for authorization,
    wherein the encrypting the personal information with supplemental information comprises encrypting, via the device, either a cryptographic hash of a prior block of personal information in the at least one block chain or a link to the prior block of personal information in the at least one block chain stored in the DFS; and
    transmitting an authorization, by the device, to access a set of the plurality of block chains based on the determined category of use associated with a request for authorization.

2. The method of claim 1, wherein the storing the personal information in DFS comprises storing, via the device, the personal information in inter-planetary file system (IPFS).

3. The method of claim 1, wherein the encrypting the personal information with supplemental information further comprises encrypting, via the device, at least one of a verifying entity associated with the personal information, a digital signature associated with the verifying entity, information associated with an encryption key or decryption key, or other authorization information associated with the set of the plurality of block chains.

4. The method of claim 1, wherein the encrypting the link to the prior block of personal information in the at least one block chain comprises encrypting, via the device, an encrypted link to the prior block of personal information in the at least one block chain.

5. The method of claim 4, wherein the encrypting the other authorization information associated with the set of the plurality of block chains comprises encrypting, via the device, at least one term of use determined by the user.

6. The method of claim 1, wherein the creating the plurality of block chains of personal information comprises determining, via the device, whether the personal information is personally identifying information or other personal information, wherein the personally identifying information is defined as information or combinations of information that resolve to a unique user, meeting or exceeding a predetermined threshold confidence level, and wherein the other personal information is defined as other information or combinations of other information that does not resolve to the unique user, by failing to meet or exceed the predetermined threshold confidence level, and creating the plurality of block chains based on at least the personally identifying information.

7. The method of claim 1, further comprising:
receiving, via the device, the request for authorization;
determining, via the device, from the request for authorization the determined category of use;
determining, via the device, whether at least one responsive block chain exists that is responsive to the determined category of use and the request for authorization in the set of the plurality of block chains;
creating, via the device, the at least one responsive block chain if the at least one responsive block chain does not exist; and
transmitting the authorization comprising transmitting, via the device, at least one cryptographic hash associated with a last block of the at least one responsive block chain and a link to the last block of the at least one responsive block chain stored in the DFS.

8. A system, comprising a processor and a memory that stores computer executable components that, when executed by the processor, facilitate performance of operations, the computer executable components comprising:
a storage component configured to store personal information associated with a user in a distributed file system (DFS);
a data management component configured to create a plurality of block chains of personal information, based at least in part on a determined category of use of each of the plurality of block chains;
wherein creating each of the plurality of block chains of personal information comprises creating a root block for each of the plurality of block chains of personal information;
wherein the storage component is further configured to store the personal information with supplemental information encrypted to facilitate at least one of creation of at least one block chain of the plurality of block chains or determining an applicability status of a request for authorization;
wherein the data management component is associated with a cryptographic component configured to encrypt either a cryptographic hash of a prior block of personal information in the at least one block chain or a link to the prior block of personal information in the at least one block chain stored in the DFS; and
an authorization component configured to transmit an authorization to access a set of the plurality of block chains based on the determined category of use associated with the request for authorization.

9. The system of claim 8, wherein the storage component is further configured to store the personal information in the DFS comprising inter-planetary file system (IPFS).

10. The system of claim 8, wherein the data management component is associated with a cryptographic component configured to encrypt at least one of a verifying entity associated with the personal information, a digital signature associated with the verifying entity, information associated with an encryption key or decryption key, or other authorization information associated with the set of the plurality of block chains.

11. The system of claim 10, wherein the link to the prior block of personal information in the at least one block chain comprises an encrypted link to the prior block of personal information in the at least one block chain.

12. The system of claim 10, wherein the other authorization information associated with the set of the plurality of block chains comprises at least one term of use determined by the user, wherein the at least one term of use comprises an expiration term for at least one of the authorization or the personal information.

13. The system of claim 12, wherein the data management component is further configured to determine the at least one term of use, further comprising at least one of a validity term associated with the personal information, at least one of a payee or a requested fee associated with the at least one of the authorization or the personal information, at least one of a transmission limit or a storage limit associated with the at least one of the authorization or the personal information, or a restriction associated with the at least one of the authorization or the personal information on a third party.

14. The system of claim 8, wherein the data management component is further configured to determine whether the personal information is personally identifying information or other personal information, wherein the personally identifying information is defined as information or combinations of information that resolve to a unique user, meeting or exceeding a predetermined threshold confidence level, and wherein the other personal information is defined as other information or combinations of other information that does not resolve to the unique user, by failing to meet or exceed the predetermined threshold confidence level, and is further configured to create the plurality of block chains based on at least the personally identifying information.

15. A non-transitory machine-readable storage medium, comprising executable instructions that, when executed by a device comprising processor, facilitate performance of operations, comprising:
storing, by the device, personal information associated with a user in a distributed file system (DFS);
creating, by the device, a plurality of block chains of personal information, based at least in part on a determined category of use of each of the plurality of block chains;
wherein creating each of the plurality of block chains of personal information comprises creating a root block for each of the plurality of block chains of personal information;
encrypting, via the device, the personal information with supplemental information to facilitate at least one of creation of at least one block chain of the plurality of block chains or determining an applicability status of the request for authorization, wherein the supplemental information comprises at least one of a cryptographic hash of a prior block of personal information in the at least one block chain or a link to the prior block of personal information in the at least one block chain stored in the DFS; and
transmitting an authorization, by the device, to access a set of the plurality of block chains based on the determined category of use associated with a request for authorization.

16. The non-transitory machine-readable storage medium of claim 15, the operations further comprising:
  storing, via the device, the personal information in interplanetary file system (IPFS).

17. The non-transitory machine-readable storage medium of claim 15, the operations further comprising:
  encrypting, via the device, at least one of a verifying entity associated with the personal information, a digital signature associated with the verifying entity, information associated with an encryption key or decryption key, or other authorization information associated with the set of the plurality of block chains.

* * * * *